(12) United States Patent
Dayal et al.

(10) Patent No.: US 11,086,545 B1
(45) Date of Patent: Aug. 10, 2021

(54) OPTIMIZING A STORAGE SYSTEM SNAPSHOT RESTORE BY EFFICIENTLY FINDING DUPLICATE DATA

(71) Applicant: Tintri by DDN, Inc., Chatsworth, CA (US)

(72) Inventors: Shobhit Dayal, San Francisco, CA (US); Nishant Agrawal, Santa Clara, CA (US); Karthik Ravichandra, Newark, CA (US); Gauresh Datta Rane, San Jose, CA (US); Anish Jain, Sunnyvale, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 167 days.

(21) Appl. No.: 16/361,014

(22) Filed: Mar. 21, 2019

Related U.S. Application Data

(60) Provisional application No. 62/647,073, filed on Mar. 23, 2018.

(51) Int. Cl.
*G06F 12/00* (2006.01)
*G06F 3/06* (2006.01)

(52) U.S. Cl.
CPC ............ *G06F 3/0647* (2013.01); *G06F 3/065* (2013.01); *G06F 3/067* (2013.01); *G06F 3/0619* (2013.01); *G06F 3/0641* (2013.01)

(58) Field of Classification Search
CPC ........ G06F 3/0647; G06F 3/067; G06F 3/065; G06F 3/0619; G06F 3/0641
USPC ........................................................ 711/165
See application file for complete search history.

(56) References Cited

U.S. PATENT DOCUMENTS

| | | | |
|---|---|---|---|
| 2016/0085575 A1* | 3/2016 | Dornemann | G06F 11/2094 718/1 |
| 2016/0266980 A1* | 9/2016 | Muller | G06F 11/1458 |
| 2017/0262347 A1* | 9/2017 | Dornemann | G06F 9/45558 |

* cited by examiner

*Primary Examiner* — Mardochee Chery
(74) *Attorney, Agent, or Firm* — Van Pelt, Yi & James LLP

(57) ABSTRACT

Efficient snapshot restore is disclosed. An indication to restore a snapshot from a replication destination to a storage system is received. At least a subset of data associated with the snapshot that is already present at the storage system is determined. A restore operation of the snapshot is performed by obtaining the at least subset of the data associated with the snapshot that is already present at the storage system locally from the storage system and by obtaining the remaining data associated with the snapshot from the replication destination.

23 Claims, 27 Drawing Sheets

| VM ID | Snapshot Global ID | Job ID | Base Snapshot for Dedup | Base VM ID | Cloud Storage State |
|---|---|---|---|---|---|
| VM A | S0 | 26 | -- | -- | Live |
| VM A | S1 | 27 | S0 | VM A | Live |
| VM A | S2 | 28 | S1 | VM A | Live |
| VM B | S4 | 40 | S2 | VM A | Live |
| ... | ... | ... | ... | ... | ... |
| VM M | | | | | |

FIG. 7

OPTIMIZING A STORAGE SYSTEM SNAPSHOT RESTORE BY EFFICIENTLY FINDING DUPLICATE DATA

CROSS REFERENCE TO OTHER APPLICATIONS

This application claims priority to U.S. Provisional Patent Application No. 62/647,073 entitled OPTIMIZING A STORAGE SYSTEM SNAPSHOT RESTORE BY EFFICIENTLY FINDING DUPLICATE DATA filed Mar. 23, 2018 which is incorporated herein by reference for all purposes.

BACKGROUND OF THE INVENTION

Typically, a copy of a primary storage snapshot is created at a third party storage or cloud by a backup software or a combination of backup software and hardware, which can be called a backup system. The backup system could stage the snapshot in a local hardware and then optionally move it to the cloud.

Typically, the format in which the cloud copy of the snapshot is created is specific to the backup system product. Often, the technology to replicate snapshots to the cloud is available at the volume level. Sometimes, when the technology is available at the virtual machine level, then the snapshot that is being copied is the hypervisor snapshot and not the native storage array snapshot, which leads to inefficiencies. Usually, the management interface for the cloud snapshots that are created by the backup systems are independent of the management interface for the primary storage snapshots, which restricts management functionality. For example, the policies for managing the cloud snapshots and the primary storage snapshots cannot be integrated into a single management framework or a single implementation. The metadata for the cloud snapshot is also independent of the metadata for the local snapshot which deprives the ability to manage the primary storage and the cloud snapshot in a similar way, even though they represent the same copy of data. The lack of native integration between the primary storage snapshot and the cloud snapshot can also cause inefficient use of network for replication and inefficient use of space for storing the first snapshot as well as the incremental snapshots.

These constraints place severe restrictions on management simplicity, end-to-end data verification, and efficiency of replicating and storing cloud snapshots.

Furthermore, the lack of native integration between the primary storage snapshot and the cloud snapshot may lead to inefficiencies in restoring the cloud snapshot back to a primary storage. It would be desirable to improve the speed of restoring a cloud snapshot to a primary storage and also the amount of bandwidth that is used to complete the restore operation.

BRIEF DESCRIPTION OF THE DRAWINGS

Various embodiments of the invention are disclosed in the following detailed description and the accompanying drawings.

FIG. 7 is a diagram showing an example cloud replication snapshot table.

DETAILED DESCRIPTION

Figure 1:
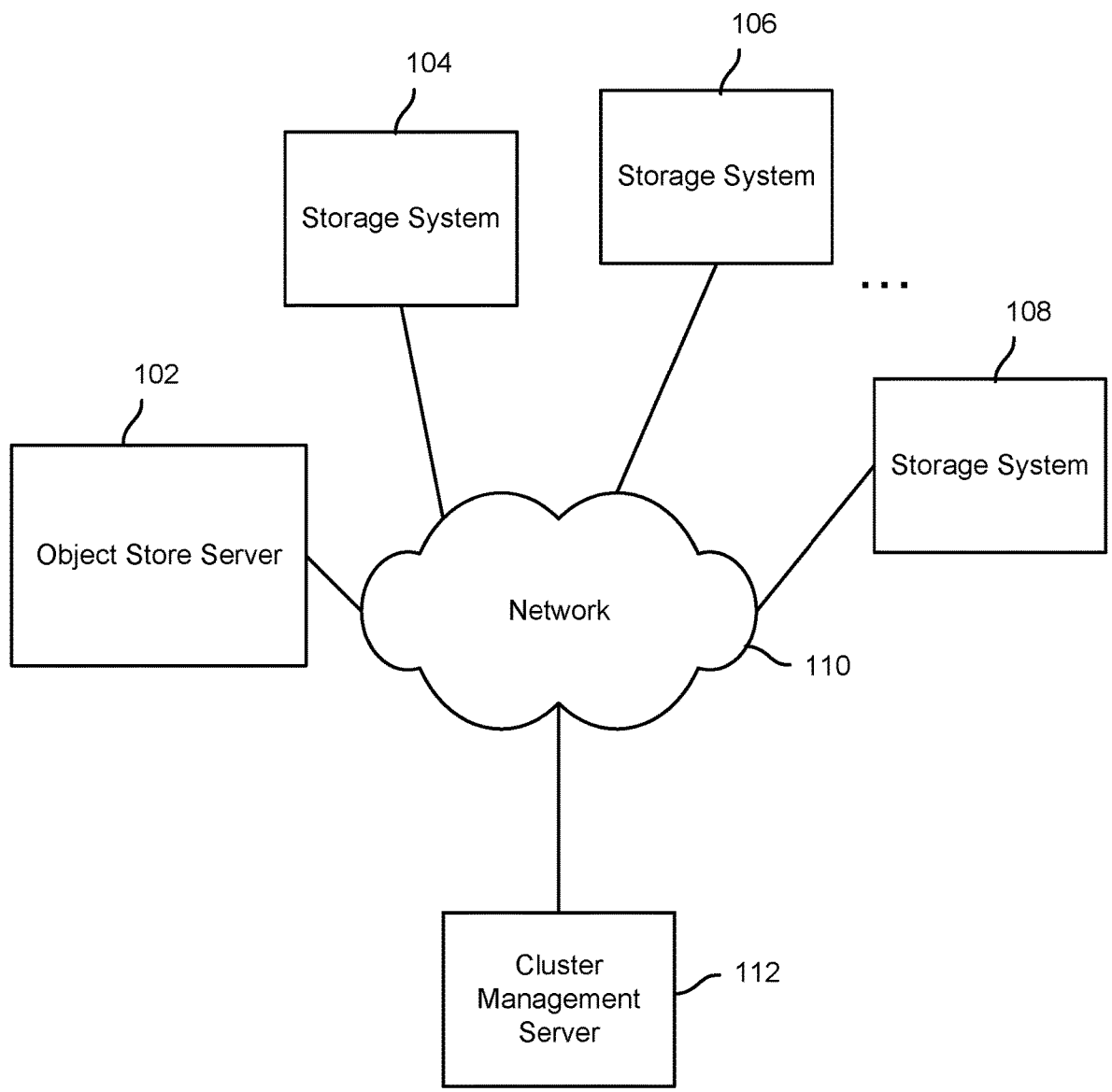
FIG. 1 is a diagram showing a cluster of storage systems that are managed by a cluster management server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of efficiently replicating a snapshot to an object store. In various embodiments, it is determined that a subset of data associated with a snapshot that is not already stored at a replication destination. In various embodiments, the replication destination comprises an object store. The "object store" is sometimes referred to as a "cloud," "cloud store," "cloud server," or "cloud object store." Examples of a cloud object store comprise Amazon AWS®, Microsoft Azure®, Google Cloud®, and IBM Cloud®. The subset of data is at a granularity at which the replication destination stores data. In various embodiments, the source storage system stores data at a different granularity from the one used by the replication destination to store data. In various embodiments, the source storage system uses a smaller granularity (e.g., 8 KB) to store data than the granularity (e.g., 1 MB) used by the replication destination. In various embodiments, the snapshot is replicated at the replication destination by storing at the replication destination the subset of data associated with the snapshot and associated metadata as a hierarchical set of objects.

FIG. 1 is a diagram showing a cluster of storage systems that are managed by a cluster management server. In the example of FIG. 1, the cluster includes storage systems 104, 106, and 108, in addition to potentially one or more other storage systems. In some embodiments, storage systems 104, 106, and 108 is a system of loosely coupled nodes. Loosely coupled nodes do not share a single namespace and they do not need to communicate with each other for most normal operations, like serving IO. In various embodiments, the cluster of storage systems is a federated system under management by cluster management server 112.

Each of storage systems 104, 106, and 108 stores virtual machine (which is hereinafter sometimes referred to as a "VM") data and creates local per-VM snapshots. Each of storage systems 104, 106, and 108 replicates/uploads the snapshots to a cloud object store, such as object store server 102, sometimes without requiring explicit co-ordination or communication between the storage systems of the cluster. Replicating a snapshot to object store server 102 may be thought of as backing up the snapshot to object store server 102. Each of storage systems 104, 106, and 108 includes a system management (not shown) software that is configured to help manage (e.g., reclaim) snapshots stored at object store server 102 that were uploaded by the respective storage system and also communicate with cluster management server 112 over network 110. Each of storage systems 104, 106, and 108 also includes a filesystem that is configured to manage local snapshots and their associated policies and dependencies. In various embodiments, a "snapshot" comprises a point-in-time copy of the set of data. In various embodiments, snapshots are generated as delta representations such that a subsequently generated snapshot only includes mappings to data that was modified since the previous snapshot was created. In various embodiments, the cluster storage systems may natively replicate the local storage snapshots to object store server 102. The metadata of the local storage snapshot may be preserved in the cloud as well, thereby providing a consistent image of the local snapshots and the cloud snapshots to a management entity such as cloud management server 112.

Each of storage systems 104, 106, and 108 is configured to replicate (e.g., upload) data and metadata associated with locally generated VM snapshots to object store server 102 based on locally stored policies. The process of replicating a local storage snapshot to the cloud is also sometimes referred to as "backup." A snapshot that has been successfully uploaded to object store server 102 is sometimes hereinafter referred to as a "cloud snapshot." One reason to replicate VM snapshots to object store server 102 is because object store server 102 may act as a convenient secondary/backup storage location. A requestor may provide the name of each object to be stored at object store server 102. In various embodiments as will be described in further detail below, metadata and data associated with each snapshot that is stored at object store server 102 are stored as objects with given names that are usable to identify other objects belonging to the same snapshot at object store server 102 and furthermore, names that are prevent collision among objects uploaded by different storage systems, uploaded by the same storage system, and files between the same snapshot, for example. Each storage system is assigned a unique universal identifier (which is sometimes hereinafter referred to as a "FSUUID") (e.g., a 64-bit value) that is included in the name of each object that is stored at object store server 102 by that storage system, as will be described in further detail below. Because snapshots are stored as delta representations, in various embodiments, a storage system is configured to use an older snapshot that was previously uploaded by the storage system to object store server 102 as a base against which to deduplicate a subsequently generated snapshot during the upload of the data of the subsequently generated snapshot to object store server 102. As will be described in detail further below, a storage system is configured to upload snapshot data to object store server 102 with names/headers and content that can be used to identify data and the metadata of the snapshots to which they belong. Snapshot data that is uploaded by a particular storage to object store server 102 may be obtained/downloaded/restored by the same or a different storage system.

In various embodiments, object store server 102 may be a single system or a cluster of systems. Object store server 102 may reside on the same premises as any of storage systems 104, 106, and 108 or be remote to them. Object store server 102 may be provided as a cloud service and may be accessible through an object store protocol. In some embodiments, object store server 102 comprises an eventually consistent object store, meaning that certain operations (e.g., deletion) are performed immediately but are rather completed eventually. In various embodiments, object store server 102 stores objects in one or more "buckets," where each bucket comprises a namespace. In various embodiments, a "replication destination" is sometimes referred to as a bucket of an object store. In various embodiments, to efficiently transfer data over network 110 and also to reduce the number of operations performed at object store server 112 (e.g., because each operation at the object store incurs a cost), data is transferred to object store server 102 at a granularity that is larger than the granularity at which each of storage systems 104, 106, and 108 stores data. For example, storage systems 104, 106, and 108 stores data at 8 KB units while data is stored at object store server 112 at 1 MB units. It is not suitable to store a large VM snapshot as a single object or a blob at object store server 102, since it may be too large, so a logical block size, which is sometimes referred to as a "chunk size," must be selected for the object store. On the other hand, a local storage system usually stores data in fixed sized logical blocks that are small enough to enable efficient local deduplication. It also may not be suitable to use the same block size for the cloud as for the local storage since cloud operations are expensive. For example, the block size used locally at a storage system is typically small (e.g., 8 KB) while the chunk size used at an object store is larger (e.g., 1 MB).

In some embodiments, snapshot metadata is not deduplicated. Since the snapshots are replicated fully collapsed, their data structures (e.g., indices) are not deltas. The reason this is acceptable is because of the high chunk size that is used, which reduces the cost of metadata. This also makes handling snapshot deletion and restores simpler.

In various embodiments, a snapshot that is stored at object store server 102 is desired to be restored to either the storage system from which the snapshot had been replicated from or to another storage system. As will be described in further detail below, the restore operation of a cloud snapshot can be made more efficient by identifying at least a subset of the data from the cloud snapshot that is already present at the target storage system. As such, the subset of the data from the cloud snapshot that is already present at the target storage system can be read locally during the restore operation and the remaining data of the cloud snapshot can be downloaded from object store server 102. By identifying at least a subset of data associated with a cloud snapshot that is to be restored (e.g., downloaded) from object store server 102 to the target storage system that is already present at the target storage system, fewer operations need to be performed to download data related to the cloud snapshot from store server 102, which improves both the time and cost of the restore operation.

Figure 2:
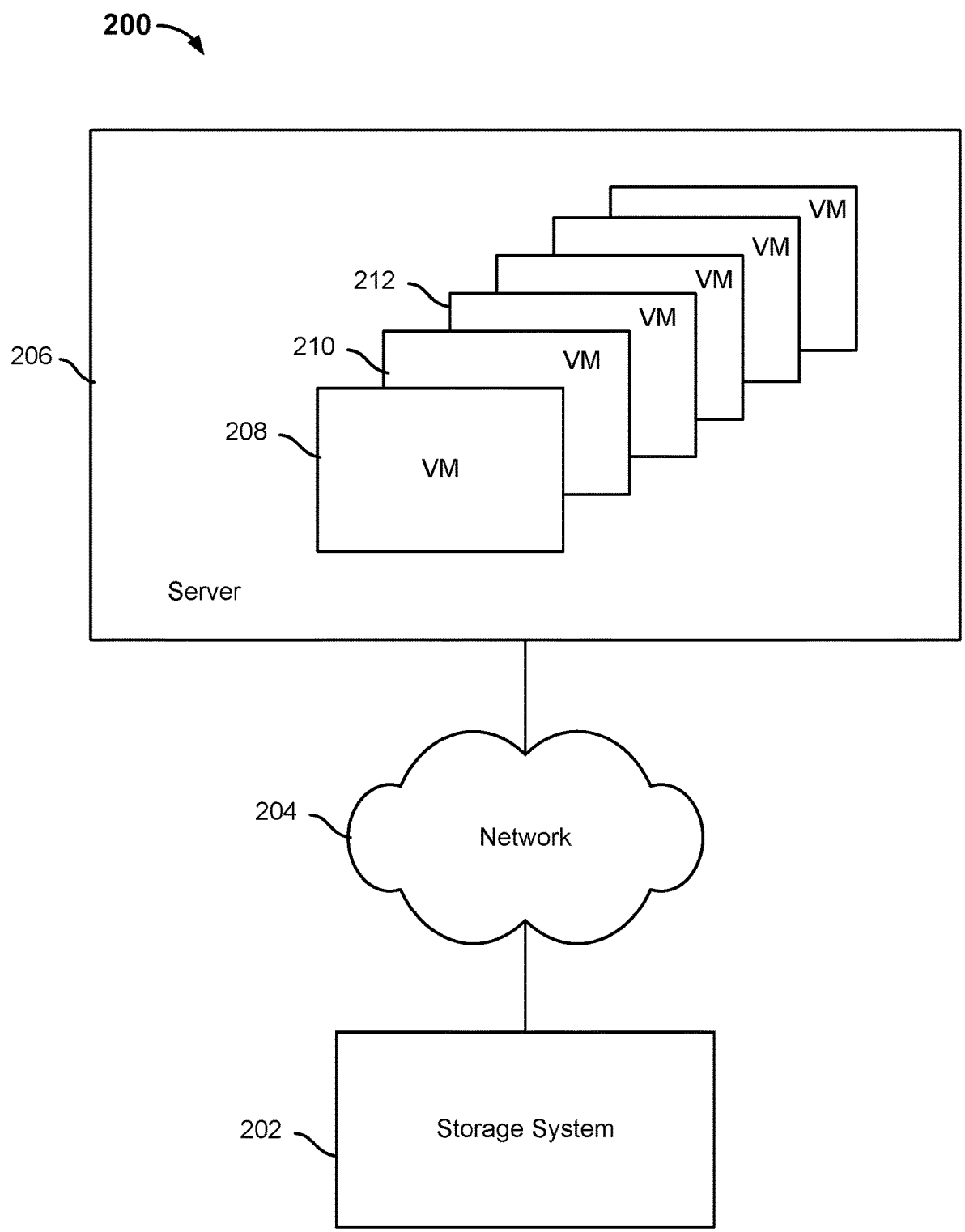
FIG. 2 is a diagram showing an embodiment of a storage system.

FIG. 2 is a diagram showing an embodiment of a storage system. In the example shown, system 200 includes server 206, network 204, and storage system 202. In various embodiments, network 204 includes various high-speed data networks and/or telecommunications networks. In some embodiments, storage system 202 communicates with server 206 via network 204. In some embodiments, the file system for the storage of VMs using VM storage abstractions does not include network 204, and storage system 202 is a component of server 206. In some embodiments, server 206 is configured to communicate with more storage systems other than storage system 202. Each of storage systems 104, 106, and 108 of FIG. 1 may be implemented using a storage system such as storage system 202 of system 200.

In various embodiments, server 206 runs several VMs. In the example shown, VMs 208, 210, and 212 (and other VMs) are running on server 206. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (which is sometimes hereinafter referred to as "vdisks") and other data related to the specific VM (e.g., configuration files and utility files for implementing functionality, such as snapshots, that are supported by the VM management infrastructure). A vdisk appears to be an ordinary physical disk drive to the guest operating the system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of VM storage abstractions. In some embodiments, the respective files associated with (at least) VMs 208, 210, and 212 running on server 206 are stored on storage system 202.

In various embodiments, storage system 202 is configured to store meta-information identifying which stored data objects, such as files or other VM storage abstractions, are associated with which VM or vdisk. In various embodiments, storage system 202 stores the data of VMs running on server 206 and also stores the metadata that provides mapping or other identification of which data objects are associated with which specific VMs. In various embodiments, mapping or identification of specific VMs includes mapping to the files on the storage that are associated with each specific VM. In various embodiments, storage system 202 also stores at least a portion of the files associated with the specific VMs in addition to the mappings to those files. In various embodiments, storage system 202 refers to one or more physical systems and/or associated hardware and/or software components configured to work together to store and manage stored data, such as files or other stored data objects. In some embodiments, a hardware component that is used to (at least in part) implement the storage system may be comprised of one or a combination of multiple tiers of storage types.

Figure 3:
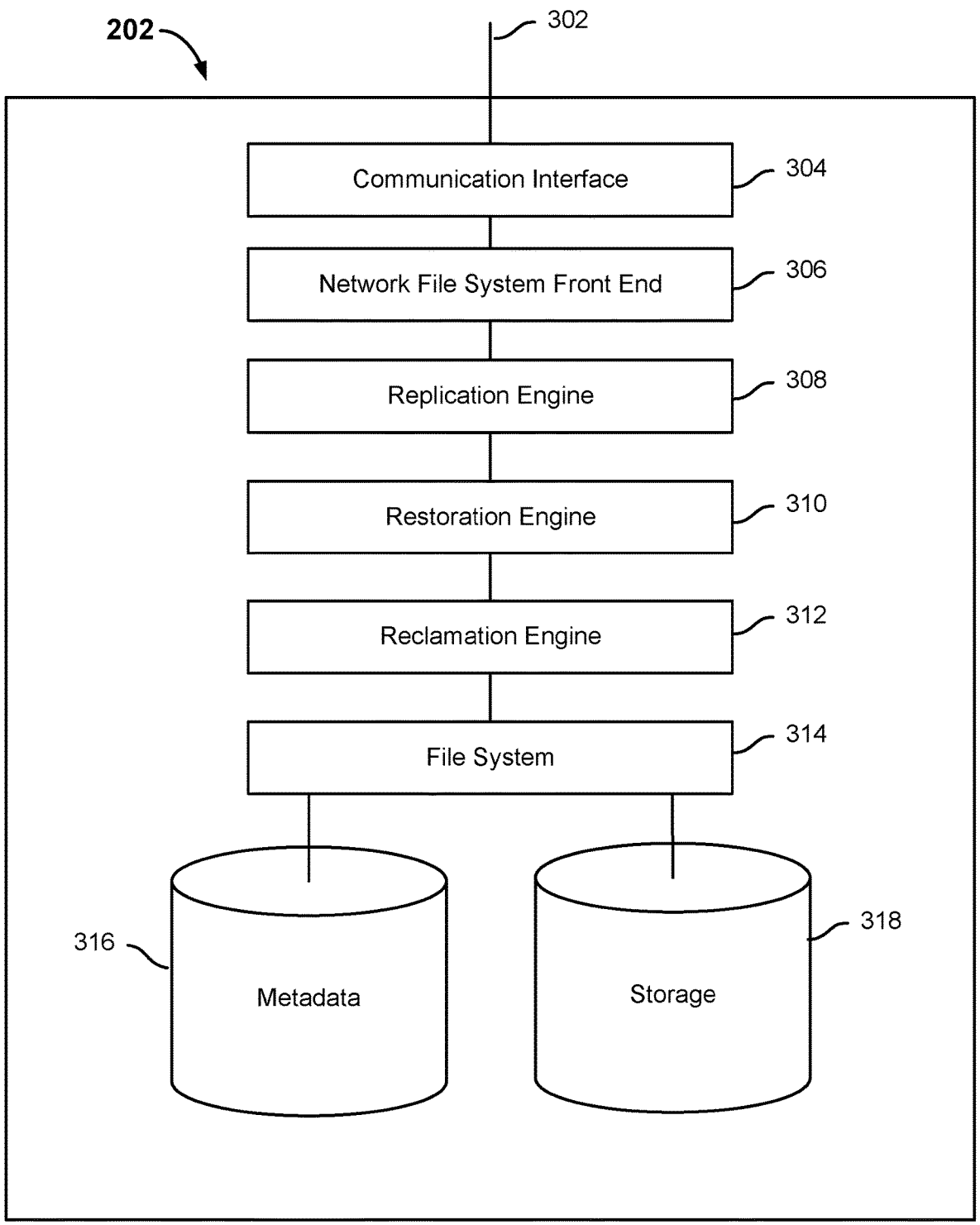
FIG. 3 is a block diagram illustrating an embodiment of a storage system including data and metadata.

FIG. 3 is a block diagram illustrating an embodiment of a storage system including data and metadata. Storage 202 of FIG. 2 may be implemented using the example storage system of FIG. 3. In the example shown, the storage system includes a network connection 302 and a communication interface 304, such as a network interface card or other interface, which enable the storage system to be connected to and communicate via a network such as network 204 of FIG. 3. The storage system further includes a network file system front end 306 configured to handle NFS requests from virtual machines running on systems such as server 206 of FIG. 2. In various embodiments, the network file system front end is configured to associate NFS requests as received and processed with a corresponding virtual machine and/or vdisk with which the request is associated, for example, using meta-information stored on the storage system or elsewhere. The storage system includes a file system 314 configured and optimized to store VM data. In the example shown, metadata 316 is configured to store sets of metadata associated with various sets of data. For example, a set of metadata may be associated with a VM, a vdisk, or a file. Storage 318 may comprise at least one tier of storage. In some embodiments, storage 314 may comprise at least two tiers of storage, where the first tier of storage comprises flash or other solid state disk (SSD) and the second tier of storage comprises a hard disk drive (HDD) or other disk storage. In various embodiments, a set of metadata stored at metadata 316 includes at least one index that includes mappings to locations in storage 318 at which a set of data (e.g., VM, vdisk, or file) associated with the set of metadata is stored. In some embodiments, a set of metadata stored at metadata 316 includes at least an index (e.g., a b-tree, an array, a radix) that is a snapshot associated with a set of data stored in storage 318. Metadata 316 may store a set of indices (e.g., b-trees, arrays, or radixes) corresponding to snapshots of a VM at different points-in-time. In some embodiments, a snapshot in metadata 316 stores a mapping at each offset at a storage granularity associated with the storage system (e.g., 8 KB) to a location in storage 314 at which a data block associated with the offset is stored.

In some embodiments, storage 318 may also store policies associated with VMs. For example, policies associated with VMs include policies for when to create snapshots for the VM, when to replicate the VM's snapshots and to which bucket of an object store, and when to expire the VM snapshots in the bucket of the object store. In some embodiments, storage 318 stores various data structures associated with managing the replication of VM snapshots to one or more replication destinations (e.g., buckets within one or more object stores). For example, one such data structure comprises a replication destination record (which is sometimes hereinafter referred to as a "bucket" record) for each replication destination to which the storage system uploads snapshot data. The bucket record comprises a root that is used to locate various information about the corresponding bucket (e.g., name, the URL of the bucket, security keys associated with encrypting data uploaded to the bucket). A bucket record includes or can be used to locate a current snapshot replication job identifier value (which is sometimes hereinafter referred to as a "jobID" value), which is used to uniquely identify each instance of snapshot replication to the bucket from the storage system. A bucket record includes or can be used to locate a cloud replication snapshot table, which includes information regarding which snapshots of which VMs have been uploaded from the storage system to the bucket and also the storage state of each snapshot at the bucket. An example of a cloud replication snapshot table is shown in FIG. 7 below. In some embodiments, storage 318 stores a destination record corresponding to each bucket record. For example, the destination record points to a corresponding bucket record, stores information regarding the storage system's connection to the bucket, and is maintained as long as there is at least one replication configuration that points to the destination record. In some embodiments, storage 318 stores one or more replication configurations, where each replication configuration stores information regarding the replication of a particular VM to a particular bucket. Each replication configuration points to the destination record that points to the bucket record of the bucket to which snapshots of the VM of the replication configuration are to replicate. As will be described in further detail below, as VMs snapshots are replicated to buckets, values in at least replication configurations and bucket records are updated to reflect the snapshots that have been uploaded to the buckets.

Storage system includes replication engine 308. Replication engine 308 is configured to determine whether a base snapshot already exists in a bucket for a VM snapshot that is to be replicated/uploaded to that bucket can deduplicate against. If such a base snapshot exists in the bucket, replication engine 308 is configured to send, over a network, only new data (which is sometimes hereinafter referred to as "dirty" data or the "difference" data) of the snapshot that is not already stored at the bucket for the base snapshot, to the bucket. Otherwise, if a base snapshot does not already exist in the bucket, replication engine 308 is configured to send all the data associated with the snapshot (the "collapsed" snapshot) to the bucket. If the storage system stores data at a different granularity than the granularity at which data is stored at the bucket, then replication engine 308 is configured to send the dirty data at the bucket's storage granularity. As will be described in further detail below, replication engine 308 is configured to store snapshot data and metadata at the bucket as objects with headers/names that can be used to identify the VMs and files thereof to which they belong. In some embodiments, replication engine 308 is configured to update data structures (e.g., replication configurations, bucket records, etc.) stored at storage 318 during the process of and also after a snapshot replication to a bucket so that the content of the data structures reflect the current state of snapshots that have been uploaded to the bucket.

Storage system includes restoration engine 310. Restoration engine 310 is configured to restore a snapshot from a bucket of an object store to the storage system. Restoration engine 310 is configured to restore any snapshot a bucket to the storage system and not necessarily a snapshot that the storage system itself had previously uploaded to the bucket. As will be described in further detail below, restoration engine 310 is configured to download objects pertaining to a particular VM snapshot from a bucket and store the data and metadata included in such objects as a local copy of the VM snapshot. In some embodiments, restoration engine 310 is configured to download only those portions of the VM snapshot from the bucket that are not already present at the storage system to reduce the number of operations at the object store and also reduce the amount of data that is transferred over the network.

Storage system includes reclamation engine 312. Reclamation engine 312 is configured to reclaim snapshot data at a bucket of an object store in response to determining that a snapshot has expired. In some embodiments, reclamation engine 312 is configured to determine whether a snapshot in the bucket has expired and should be reclaimed (i.e., deleted) at the bucket. In some embodiments, information regarding when a snapshot in the bucket has expired is stored locally at the storage system. Reclamation engine 312 is configured to determine data in a snapshot that is not shared with any other (e.g., adjacent) snapshots and cause such data to be deleted from a bucket. Deleting data from a bucket may include, at least, reclamation engine 312 sending a request to the bucket using a protocol used by the bucket to delete the relevant objects. In some embodiments, a storage system that uploads a particular snapshot is the default manager and owner of that snapshot. One of the responsibilities with respect to an owner of a snapshot at an object store is to reclaim that snapshot when the snapshot expires.

Figure 4:
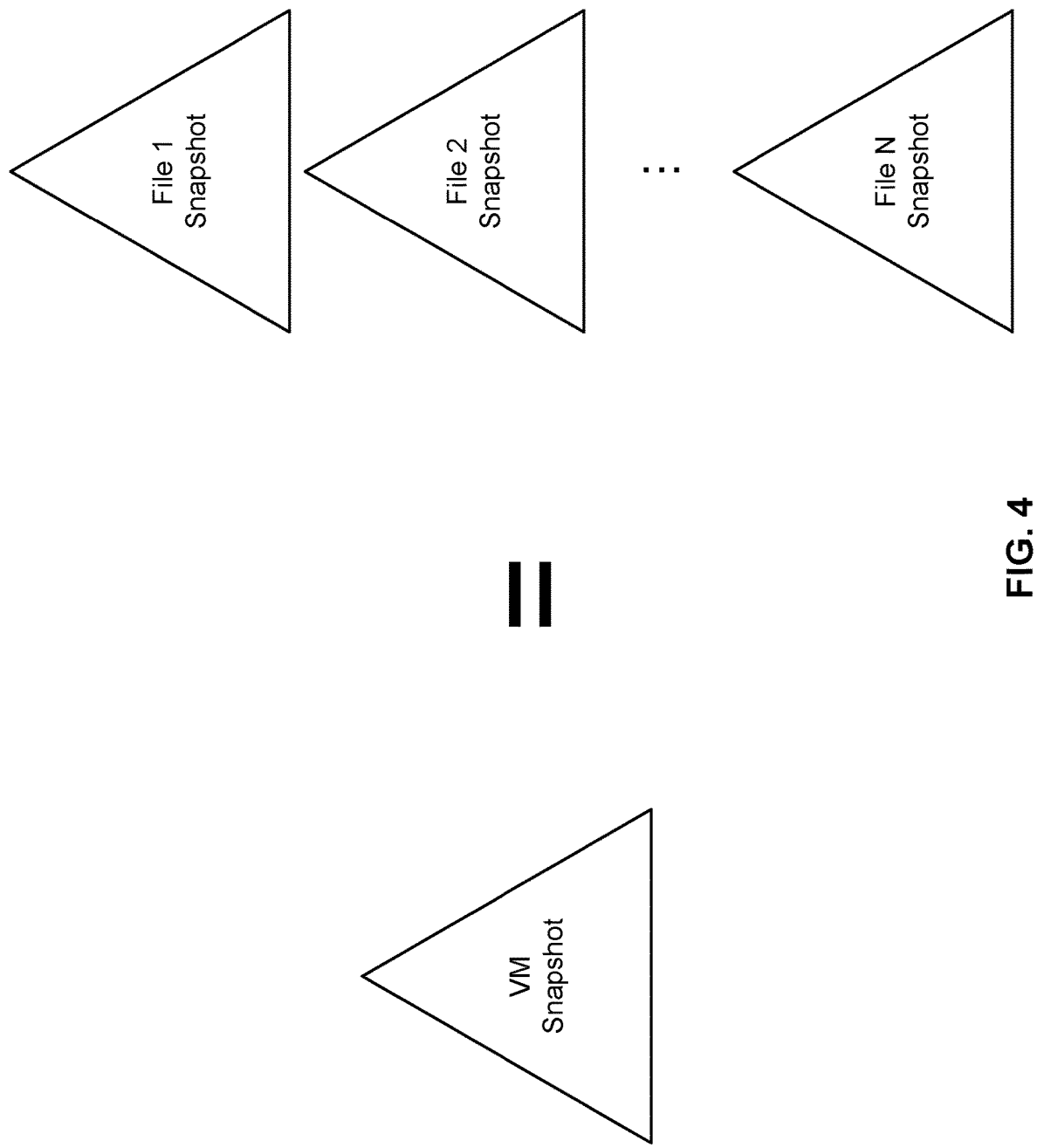
FIG. 4 is a diagram showing that a VM snapshot comprises a set of file snapshots. A VM comprise a set of vdisks, which are sometimes referred to as files.

FIG. 4 is a diagram showing that a VM snapshot comprises a set of file snapshots. A VM comprise a set of vdisks, which are sometimes referred to as files. Because a VM comprises a set of files, a snapshot of a VM at a point-in-time is a set of snapshots at that point-in-time of files that make that VM. The diagram of FIG. 4 is an illustration that a snapshot of a VM comprising N files can also be thought of as a set of N snapshots of the respective N files.

Storage systems typically price their service based on dollars per gigabyte (GB) of storage used, amongst other metrics. This makes it important to store data as efficiently as possible. Another reason for wanting to store data as efficiently as possible is that a cloud based object store may be on the same premise as the primary storage system or it may be at a remote location. If it the cloud storage is in a remote location, then the network connection between the primary storage system and the cloud object store may not be high in bandwidth and in general needs to be used prudently. Finally, cloud object stores often price their services not just based on space used but also number of operations performed, e.g., GETs, PUTs. As such, reducing operations at the cloud object stores also reduces cost.

A VM snapshot comprises a point-in-time copy of the set of data and in various embodiments, a subsequently generated snapshot for the same VM includes mappings only to data that was modified since the previous snapshot was created. Because snapshots store delta data relative to each previously generated snapshot, as the live data on the VM changes between successive snapshots (i.e., snapshots generated at different points-in-time), the snapshots start to differ in content. The difference is, however, limited to the data blocks that changed between the snapshots. This is often a small fraction of all the data blocks that belong to the VM. For example, a common daily change rate for application data is about 5 percent. In this example, if a daily snapshot is taken then, on an average, only 5 percent of the blocks are changed between the daily snapshots. So the logical data of each snapshot is different but the physical difference between each snapshot is limited to the logical blocks that changed between the two snapshots. Block sharing techniques take advantage of this to share the unchanged blocks between snapshots.

It is usually unlikely that unrelated VMs have a high degree of common data. For this reason, snapshots of different VMs may not be able to share blocks successfully, especially if the block size is relatively large. However, successive incremental snapshots of the same VM can have a lot of common data for the reason described above. So implementing block sharing between snapshots of the same VM is very valuable.

Another case where there can be a high degree of sharing is between a clone VM and a shared snapshot form a source VM from which the clone was created. In various embodiments, a "clone" refers to a copy of an existing set of data (e.g., VM) (or the existing set of data is sometimes referred to as "source data"). In various embodiments, a clone is generated from a snapshot of the source data. This snapshot of the source data is sometimes referred to as the "shared snapshot." To generate the clone, a new set of metadata is created and data (e.g., a pointer) associating the clone's new set of metadata to the source data's set of metadata is stored such that at least some of the metadata associated with the source data is to be shared with the new set of metadata associated with the clone. A clone is a copy of the data as it existed in the shared snapshot when the clone was created. If multiple clones are created from the same shared snapshot, then they all share their data with the clone. As the clones become live, their contents may start diverging from the shared snapshot, at a certain average change rate, but a large part of the data may still be common with the shared snapshot. So an efficient way to store the snapshots of the clone in the cloud would be to replicate the shared snapshot, then the incremental clone snapshots. As a result, the clone snapshots share blocks with the shared snapshot. The higher the number of clones that are generated from the same shared snapshot, the greater efficiency at which data would be shared.

Figure 5:
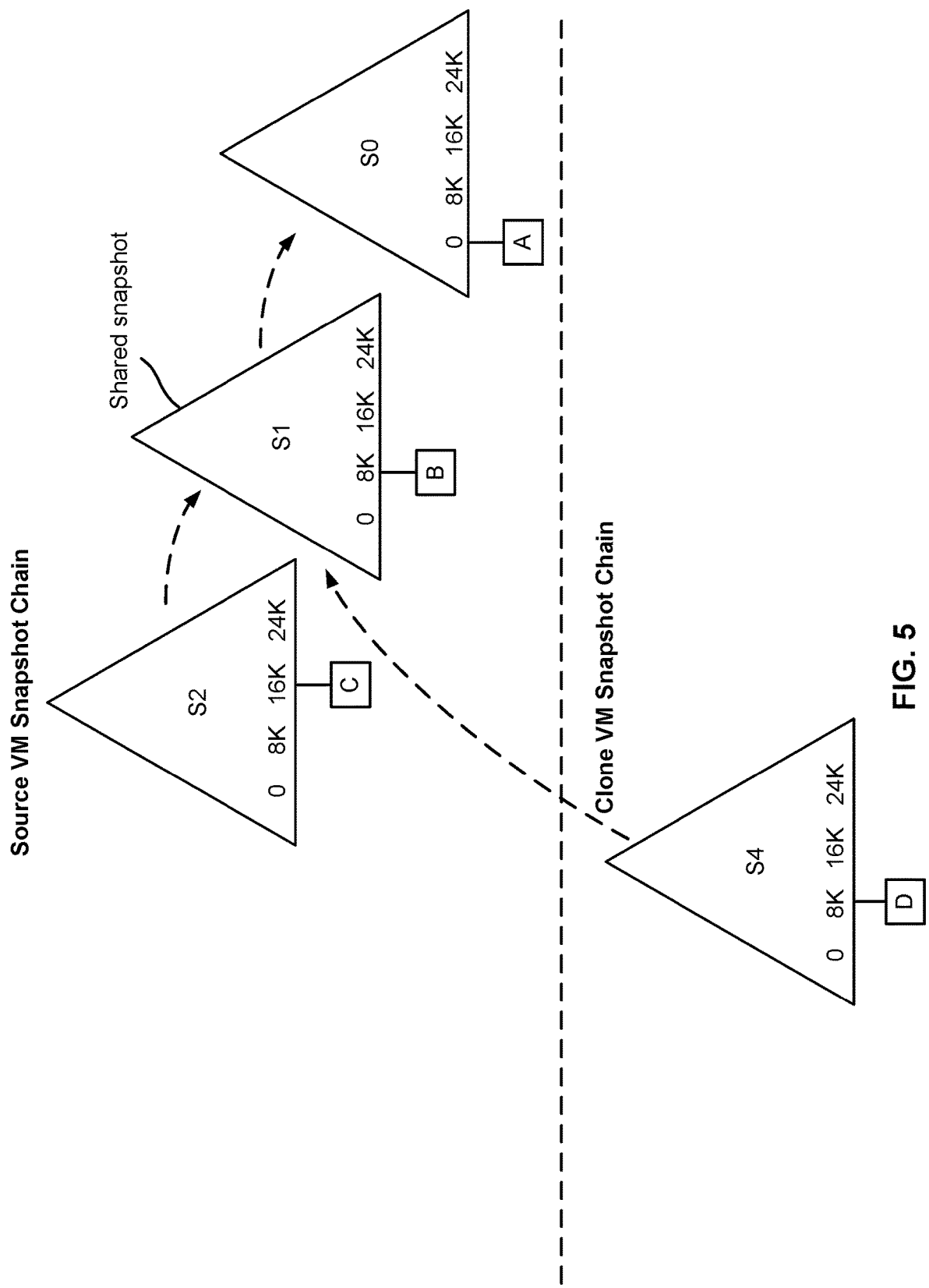
FIG. 5 shows block sharing between snapshots associated with a source VM and a clone VM that is generated from a snapshot of the source VM.

FIG. 5 shows block sharing between snapshots associated with a source VM and a clone VM that is generated from a snapshot of the source VM. As described above, in various embodiments, successive snapshots of a VM are stored as incremental snapshots or delta representations of the immediately older snapshot. An older snapshot is sometimes referred to as an "ancestor" and a younger snapshot is sometimes referred to as a "descendent." As such, each subsequently generated snapshot stores only new or modified data relative to its immediate ancestor snapshot and therefore "depends" upon its immediate ancestor snapshot. Put another way, a descendent snapshot stores data at an offset that overwrites the data at the same offset of its immediate ancestor snapshot. For example, snapshot S1 is generated for the source VM at a point-in-time later than when snapshot S0 was generated for source VM. Snapshot S1 also includes only new or modified data relative to what is stored in snapshot S0. Similarly, snapshot S2 includes only new or modified data relative to what is stored in snapshot S1.

In various embodiments and as shown in the example of FIG. 5, a snapshot is represented as an index (e.g., a b-tree) that stores a mapping at each offset to the physical location on a storage medium for data associated with that offset. In the example of FIG. 5, the storage system stores data as 8 KB data blocks (i.e., the storage system stores data at an 8 KB granularity) and as such, each snapshot index stores mappings at 8 KB increments. Specifically, data value B was written to the source VM at offset 8 KB after snapshot S0 was generated and as such, was included in snapshot S1.

Also, specifically, data value C was written to the source VM at offset 16 KB after snapshot S1 was generated and as such, was included in snapshot S2.

As shown in the example of FIG. 5, a clone VM is generated from snapshot S1 of the source VM. As such, snapshot S1 may be referred to as the "shared snapshot." The clone's snapshot, snapshot S4, stores only new or modified data relative to what is stored in shared snapshot, snapshot S1. Specifically, data value D was written to the clone VM at offset 8 KB (which overwrites data value B that was written to snapshot S1) after the clone was generated.

In various embodiments, a read operation on a specified snapshot for an offset may proceed in the following manner: First, a lookup of the specified snapshot index is performed for the offset of the read operation. If a mapping exists, then data is read from the physical device at the corresponding physical address and returned. Otherwise, if the mapping does not exist within the specified snapshot index, the link to the next older (ancestor) snapshot is traversed and a search of this older snapshot's index is performed. This process continues until a mapping for the offset is found in a snapshot index or the last snapshot in the chain has been examined.

In various embodiments, metadata describing the dependencies between snapshots are stored at a storage system (e.g., by the storage system's file system). In various embodiments, when a snapshot is to be deleted from a chain, the mappings stored by that snapshot is first merged into either the snapshot's immediate descendent or ancestor snapshot before the snapshot can be deleted. Also, in the scenario of a deleted snapshot, metadata is updated to indicate that the immediate descendent of the deleted snapshot becomes the immediate descendent of the deleted snapshot's immediate ancestor.

Figure 6:
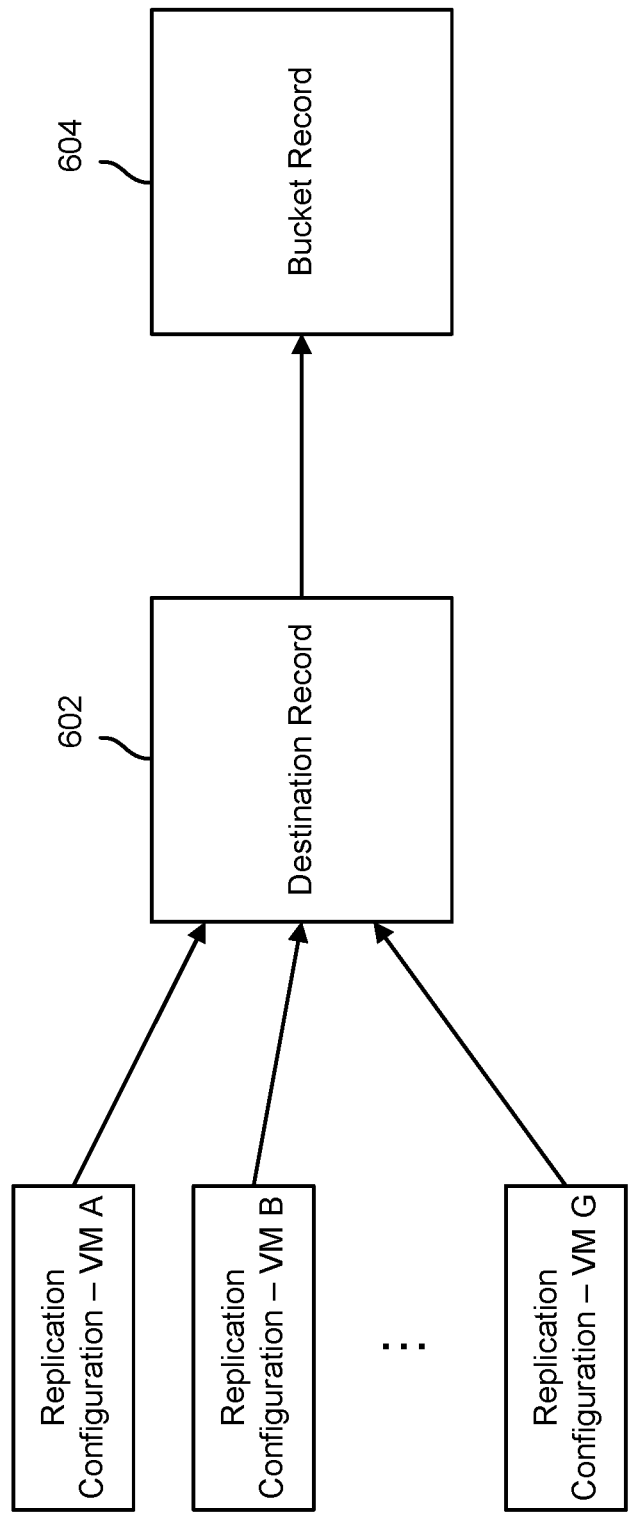
FIG. 6 is a diagram showing an example of data structures stored locally at a storage system that are used to manage replication of VM snapshots to a replication destination.

FIG. 6 is a diagram showing an example of data structures stored locally at a storage system that are used to manage replication of VM snapshots to a replication destination. In the example, multiple replication configurations point to destination record 602, which points to a corresponding bucket record, bucket record 604. Bucket record 604 corresponds to a particular bucket in an object store. Bucket record 604 stores information regarding the bucket and also the state of the storage system's replication of VM snapshots to the bucket. While replication configurations are only shown for destination record 602 and bucket record 604 in this example, replication configuration(s) may be configured for other pairs of destination records and bucket records associated with other buckets to which the storage system replicates to.

A replication configuration stores information used to perform replication of snapshots of a particular VM to the bucket associated with the bucket record to which the destination record pointed to by the replication configuration points. FIG. 6 shows that replication configurations for at least VMs A, B, and G are set to point to destination record 602. A replication configuration stores for example, policies associated with when to replicate a snapshot of a corresponding VM to the bucket associated with bucket record 604. For example, the replication configuration may also store a value (e.g., inProgressSnapshotId) that identifies a snapshot that is currently being uploaded to the bucket and also a value (e.g., lastReplicatedSnapshotId) that identifies the last snapshot that was successfully uploaded to the bucket. In some embodiments, inProgressSnapshotId is used as a deletion hold on the identified snapshot for at least the duration that the snapshot is being uploaded to the bucket. In some embodiments, lastReplicatedSnapshotId is used to identify the last snapshot that was successfully uploaded to the bucket for the VM associated with the replication configuration and this snapshot may be identified as a base snapshot for deduplicating a subsequently generated snapshot that is to be replicated to the bucket. In some embodiments, one or more checkpointing fields in a replication configuration are periodically updated during the replication of a snapshot of the corresponding VM so that in the event that the replication is interrupted (e.g., due to a connection lapse, a crash of the storage system, etc.) the replication of the snapshot may resume on the basis of the checkpointing fields. The following is an example of a replication configuration data structure ("CoudReplVmRep"):

```
struct CloudReplVmRep {
    uint64 creationTimeMs_; // 1: RO after create
    uint64 cloudReplId_; // 2: RO after create
    uint64 cloudReplDestinationId_; // 3: RO after create
    uint8 vmId_[CLOUDREPL_VMID_MAX_LEN]; // 4:
        RO after create
    uint8 enabled_; // 5: RW
    // Stats
    uint64 logicalSentBytes_; // 6: RW
    uint64 postDedupSentBytes_; // 7: RW
    uint64 compressedSentBytes_; // 8: RW
    uint64 physicalSentBytes_; // 9: RW
    uint64 logicalSentBytesThisSnapshot_// 10: RW
    uint64 inProgressSnapshotId_; // 11: RW
    // Last Replicated snapshot for this config
    uint64 lastReplicatedSnapshotId_; // 12: RW
    // ErrorCode value, or 0
    uint32 errorNumber_; // 13: RW
    uint8    vmName_[CLOUDREPL_VM_NAME_MAX_
        LEN]; // 14: RO after create
    uint8    vcenterInstanceUUID_[CLOUDREPL_VCEN-
        TER_UUID_MAX_LEN]; // 15: RO after create
    // Needed for SM (sync time, lastReplicatedSnapshotGlo-
        balId)
    SnapshotGlobalId LastReplicatedSnapshotGlobalId_; //
        16: RW
    uint64 lastReplicatedSnapshotCreationTimeMs_; // 17:
        RW
    // RecordId of the in progress job record
    RecordId inProgressJobRid_; // 18: RW
    // SM Flags passed in by SM at creation time. Not
        interpreted
    // by FS. It helps SM to differentiate cloud configs from
        other
    // async repl configs and also helps to differentiate
        between cloud replicate
    // and restore configs.
    uint64 sMFlags_; // 19: RW
    // For restore, save snapshotId of target snapshot.
    SnapshotGlobalId restoreSnapshotGlobalId_; // 20: RO
        after create
    // True for restore snapshot operation.
    uint8 isRestoreConfig_; // 21: RO after create
    // Rid of the head of the stasis linked list for all
    // backup jobs assigned to this replVm by SM that haven't
    // yet been replicated
    RecordId backupJobListRid_; // 22: RO after create
    UUID uploaderFsuuid_; // 23: RO after create
    uint64 restoreSnapshotLogicalFullSize_; // 24: RO after
        create
    // Fields to checkpoint progress for replicate and restore.
    SnapshotFileGlobalId InProgressFile_; // 25: RW field
    uint64 fileOffsetLastProcessed_; // 26: RW field
    uint16 lastProcessedFileSublist_; // 27: RW field
``` uint32 lastProcessedBaseFileSublist_; // 28: RW field
uint64 retentionMinutes_; // 29: RO after create
uint64 chunkSize_; // 30: RO after create In some embodiments, (while not shown in FIG. 6) each replication configuration points to a queue of snapshot replication jobs associated with replications of snapshots of the replication configuration's VM to the bucket. Each snapshot replication job may comprise a data structure that describes information regarding the snapshot that is to be replicated to the bucket, including, for example, the snapshot replication job identifier value (obID) associated with that particular replication, the identifier of the snapshot that is being backed up, whether the snapshot is being backed up as a collapsed snapshot (i.e., not deduplicated) or as a deduplicated snapshot, retention time associated with the snapshot, and an identifier of the VM (VM ID) to which the snapshot belongs. In some embodiments, a (e.g., backup) thread will eventually select a snapshot replication job (e.g., on a first-in-first-out) from the queue and execute the corresponding snapshot replication job. The following is an example of a snapshot replication job data structure:

struct {
  uint64 jobId_; // 1: jobId associated with the backup job, unique per bucket
  uint64 replId_; // 2: replId of the VM this backup job is associated with
  SnapshotGlobalId snapshotGlobalId_; // 3: snapshotGlobalId of the snapshot being backed up
  SnapshotId snapshotId_; // 4: local snapshotId of the snapshot
  SnapshotGlobalId baseSnapshotGlobalId_; // 5: if the snapshot being backed up is a diff, snapshot
  // globalId of the base snapshot
  uint8 isCollapsed_; // 6: True if the snapshot is being sent as collapsed
  uint64 replicaRetentionMinutes_; // 7: Retention time for the cloud snapshot passed by SM
  uint8 cloudReplInfoTag_[CLOUDREPL_INFO_TAG_MAX_LEN]; // 8: Tag used by SM stored in snapshot attr
  uint8 jobObjectUploaded_; // 9: Status of the L3/job object for this backup job
  uint8 vmId_[CLOUDREPL_VMID_MAX_KEY_LEN];
  // 10: vmId associated with the snapshot to be replicated
  uint64 cloudSnapshotFormatVersion_; // 11: cloud object data format version the snapshot will be replicated with
};

Destination record 602 is configured to store, for example, an identifier associated with the bucket, the throttle associated with replication to the bucket, and a source IP address associated with the storage system. The following is an example of a destination record data structure:

struct {
  uint64 creationTimeMs_; // 1: Readonly after create
  uint64 replDestinationId_; // 2: Readonly after create
  uint32 refCount_; // 3: RW, Number of Cloud ReplVMs using this
  uint8 enabledReplication_; // 4: RW
  uint8 enabledRestore_; // 5: RW
  uint32 throttle_; // 6: RW, Rate limit this group of Cloud ReplVMs
  uint8 sourceIpAddress_[CLOUDREPL_IP_MAX_LEN];
  // 7: RW, Source IP address
  uint64 sMFlags_; // 8: Flags if any passed by SM to be stored.
  uint64 bucketId_; // 9: Readonly after create, The bucket this destination is associated with Bucket record 604 is configured to store, for example, a bucket identifier, a bucket name, a current jobID value associated with snapshot replications by the storage system to the bucket, a destination IP address associated with the bucket, and security keys associated with encrypting data that is uploaded to the bucket. The current jobID value is used for the next snapshot replication job that is be performed (or at least queued) for a VM snapshot replication to the bucket associated with bucket record 604 and then the current jobID value is incremented by one. In some embodiments, no jobID value is skipped or reused for a pair of a storage system and a bucket. Bucket record 604 also stores a cloud replication snapshot table, which stores data identifying which snapshots of which VMs have been uploaded by the storage system to the bucket. An example of a cloud replication snapshot table is shown in FIG. 7, below. The following is an example of a bucket record data structure:

struct {
  uint64 cloudReplBucketId_; // 1: Read only after create
  uint8 bucketName_[CLOUDREPL_BUCKET_MAX_LEN]; // 2: RW, Cloud storage bucket name
  uint32 refCount_; // 3: RW, Number of Cloud ReplDestinations using this
  uint64 currentJobId_; // 4: monotonically increasing jobId counter the given bucket
  TINTRI_IPC_GENERATED::CloudStorageType::type cloudStorageType_; // 5: Readonly after create
  uint8 protocolEndPoint_[CLOUDREPL_URL_MAX_LEN]; // 6: RW, Cloud storage protocol endpoint
  uint8 accessKey_[CLOUDREPL_KEY_MAX_LEN]; //
  7: RW, AWS, Cleversafe Cred Access Key
  uint8 secretKey_[CLOUDREPL_KEY_MAX_LEN]; //
  8: RW, AWS, Cleversafe Cred Secret Key
  RecordId inFlightJobObjectRid_; // 9: Rw, rid of the backup job record whose job object hasn't been uploaded
  char mekAlgorithm_[CLOUDREPL_KEY_MAX_LEN]; // 10: RW, Media encryption algorithm.
  char aek_[CLOUDREPL_KEY_MAX_LEN]; // 11: RW, Auth encryption key. Rotated periodically.
  char mekPrefix_[CLOUDREPL_KEY_MAX_LEN]; // 12: Read only after create.
  uint64 mekVersion_; // 13: RW, Current MEK version.
  uint64 aekVersion_; // 14: RW, Current AEK version.
  char encryptedMek_[CLOUDREPL_KEY_MAX_LEN]; // 15: RW, Encrypted MEK, storing it has a backup copy.
  RecordId managedVMStoreList_; // 16: Stasis array list describing fsuuid information for snapshots managed by this vmstore.
  char adminProtocolEndpoint_[CLOUDREPL_URL_MAX_LEN]; // 17: Cloud endpoint for administrative tasks. Used by higher level entities like TGC
  // in order to reach bucket and run cloud operations.
  uint32 aekLen_; // 18: RW, aek length.
  uint32 encryptedMekLen_; // 19: RW, encrypted mek length.
};

In various embodiments, at least some of the information stored in bucket record 604 (e.g., the cloud replication snapshot table) may be presented at a user interface to indicate which snapshots of which VMs belong in the bucket. In some embodiments, at least some of the information stored in bucket records stored by one or more storage systems of a cluster may be presented at a user interface to indicate which snapshots of which VMs belong across multiple buckets.

In some embodiments, if all replication configurations associated with destination record 602 are deleted, then destination record 602 is also deleted but bucket record 604 is maintained. This is because in the event that new replication configurations are subsequently configured to be associated with the bucket to which bucket record 604 corresponds, bucket record 604 (or the cloud replication snapshot table thereof) can be used to identify which snapshots the storage system has already stored at the bucket and such snapshots can be prevented from being replicated again and/or used as base snapshots for deduplication purposes.

FIG. 7 is a diagram showing an example cloud replication snapshot table. In some embodiments, a bucket record stored at a storage system stores a cloud replication snapshot table or at least points to a cloud replication snapshot table such as the example shown in FIG. 7. A cloud replication snapshot table is sometimes hereinafter referred to as a "persistent list." In various embodiments, a cloud replication snapshot table is stored by a storage system for a particular bucket and stores information regarding VM snapshots that have been successfully uploaded by that storage system to that bucket.

The example cloud replication snapshot table shown in FIG. 7 groups snapshots that have been uploaded to the bucket by their respective VM IDs. Three snapshots (S0, S1, and S2) of VM A have been uploaded to the bucket. For snapshot S0, the cloud replication snapshot table shows that S0 is its snapshot global ID, that the instance of replication of snapshot S0 to the bucket was associated with job ID=26, that snapshot S0 was not deduplicated against an existing snapshot in the bucket (and therefore was sent as a collapsed, not deduplicated snapshot), and that its current storage state at the bucket is live (meaning that the snapshot is to be reclaimed or already reclaimed). For snapshot S1, the cloud replication snapshot table shows that S1 is its snapshot global ID, that the instance of replication of snapshot S1 to the bucket was associated with job ID=27, that snapshot S1 was deduplicated against snapshot S0 of VM A that was already in the bucket (because it was uploaded previously), and that its current storage state at the bucket is live (meaning that the snapshot is not yet reclaimed). For snapshot S3, the cloud replication snapshot table shows that S3 is its snapshot global ID, that the instance of replication of snapshot S3 to the bucket was associated with job ID=28, that snapshot S2 was deduplicated against snapshot S1 of VM A that was already in the bucket (because it was uploaded previously), and that its current storage state at the bucket is live (meaning that the snapshot is not yet reclaimed). One snapshot (S4) of VM B has been uploaded to the bucket. For snapshot S4, the cloud replication snapshot table shows that S4 is its snapshot global ID, that the instance of replication of snapshot S4 to the bucket was associated with job ID=40, that snapshot S4 was deduplicated against snapshot S2 of VM A that was already in the bucket (because it was uploaded previously), and that its current storage state at the bucket is live (meaning that the snapshot is not yet reclaimed). Because snapshot S4, belonging to VM B, was deduplicated against snapshot S2 of VM A during its replication, it is implied that VM B is a clone that was generated from snapshot S2 of VM A, which makes snapshot S2 the shared snapshot and also the base snapshot for snapshot S4 for deduplication purposes.

In some embodiments, the storage system stores a data structure associated with each VM for which snapshots are included in the cloud replication snapshot table. The following is an example of such a data structure:

struct {
RecordId nextRecord_; // 1: Common members for stasis unordered map rep
FingerprintSHA1 sha1_; // 2: FingerPrint sha that is key into this table.
char vmId_[TINTRI_VM_ID_LEN_MAX]; // 3: vmId of VM with which these snapshots are associated.
uint64 numLiveSnapshots_; // 4: Number of live snapshots associated to this VM in cloud.
RecordId cloudSnapshotListRid_; // 5: Stasis array list of the snapshots of this vm uploaded in cloud.
};

In some embodiments, the storage system stores a data structure associated with each snapshot included in the cloud replication snapshot table, which stores snapshot-level information, at least some of which is included in the example cloud replication snapshot table of FIG. 7. The following is an example of such a data structure:

struct {
uint8 version_; // 1: Rep version.
SnapshotGlobalId snapshotGlobalId_; // 2: Snapshot global Id of the snapshot uploaded to the cloud.
uint32 jobId_; // 3: JobId of the replication job number that replicated this snapshot to the bucket.
RecordId baseVMRid_; // 4: CloudSnapshotRep against which this snapshot was diffed when
// backing up to the cloud.
SnapshotGlobalId baseSnapshotGlobalId_; // 5: snapshot-GlobalId of the base snapshot
bool isLive_; // 6: Flag to indicate whether the snapshot was deleted or not and
// a deletion marker was uploaded.
};

As mentioned above, certain object stores offer an eventually consistent data model. Other than new object PUT operations and GET operations, all other operations are eventually consistent. New object PUTs and GETs have read-after-write consistency. The eventually consistent data model can create some problems. Consider the following sequence of events:

At time T1, an object with name O1 and content V1 is created.

At a later time T2, another object with name O1 and content V2 is created on the same bucket.

For a data storage platform providing read-after-write consistency, all reads to object O1 after time T2 will return the content V2. On an eventually consistent system, either V2 or V1 may be returned for an undefined period of time. More generally, read-after-write consistency implies that a read after a write always returns the content stored by the most recent write. Eventual consistency semantics does not provide this guarantee and may return the old content or the new content for an undefined period. Some operations that have eventual consistency properties are object overwrites, read of overwritten objects, deletes, and list, etc.

The example difference in the consistency models outlined above serves to describe challenges in building a consistent snapshot storage platform using an eventually consistent data storage platform. It is especially challenging to design a snapshot replication system with a cloud storage as a replication destination where independent cluster nodes can concurrently upload objects (related to the snapshot) as well as observe and coordinate with object creation and deletion from other cluster nodes.

In various embodiments, replication destinations to which storage systems upload VM snapshots comprise key-value based object stores. As such, it is up to a user of the object store to organize the flat namespace. The object store usually supports a prefix based search and delimiter based search. Using these properties, objects may be grouped together in a single list operation.

As objects are created, in various embodiments, they are assigned a name before they can be put in the object store. These object names can collide with other object names. There are two sources of collision: they can collide with other objects created by the same storage system of a cluster and they can collide with other objects created by other storage systems of the cluster.

A storage system can better control the names of an object that it creates and avoid name collision with a greater control for objects generated within the storage system, as compared with collision between objects created by a different storage system. To resolve name collision between objects of two or more independent storage systems, in various embodiments, all objects uploaded by a given storage system are to include a unique UUID associated with the storage system. In various embodiments, the unique UUID associated with each storage system is referred as the FS (file-system) UUID (universally unique identifier), FSUUID. It is easy for a storage system to generate and assign itself a one-time 64 bit (or other size) UUID with an extremely low probability of collision with a UUID independently generated by another storage system, using a high quality random number generator. In various embodiments, once created, the FSUUID associated with a storage system does not change.

The presence of an FSUUID within the name of an object in a bucket of the object store also serves as an indicator of ownership by the storage system associated with the FSUUID. In various embodiments, objects may be read by any storage system of a cluster but objects with a given FSUUID may be created or deleted by only one storage system; the one that owns the FSUUID. In some embodiments, object ownership may be delegated to another storage system of the cluster if the original owner is lost or failed. The deletion operation is an explicit transfer of ownership. After delegation, the new ownership can work the same way as the original ownership: the delegated storage system now has two FSUUIDs assigned to it and it controls objects with either of those FSUUID's. The delegation process of management of cloud snapshots from one storage system owner of such cloud snapshots to a second storage system owner is also referred to as "adoption."

Object creation is not limited to the storage systems. A cluster management server can also create objects with contents it needs to manage the cloud snapshots created from the cluster. These objects will contain a TGC UUID (TGC-UUID) in their name, for example.

Figure 8:
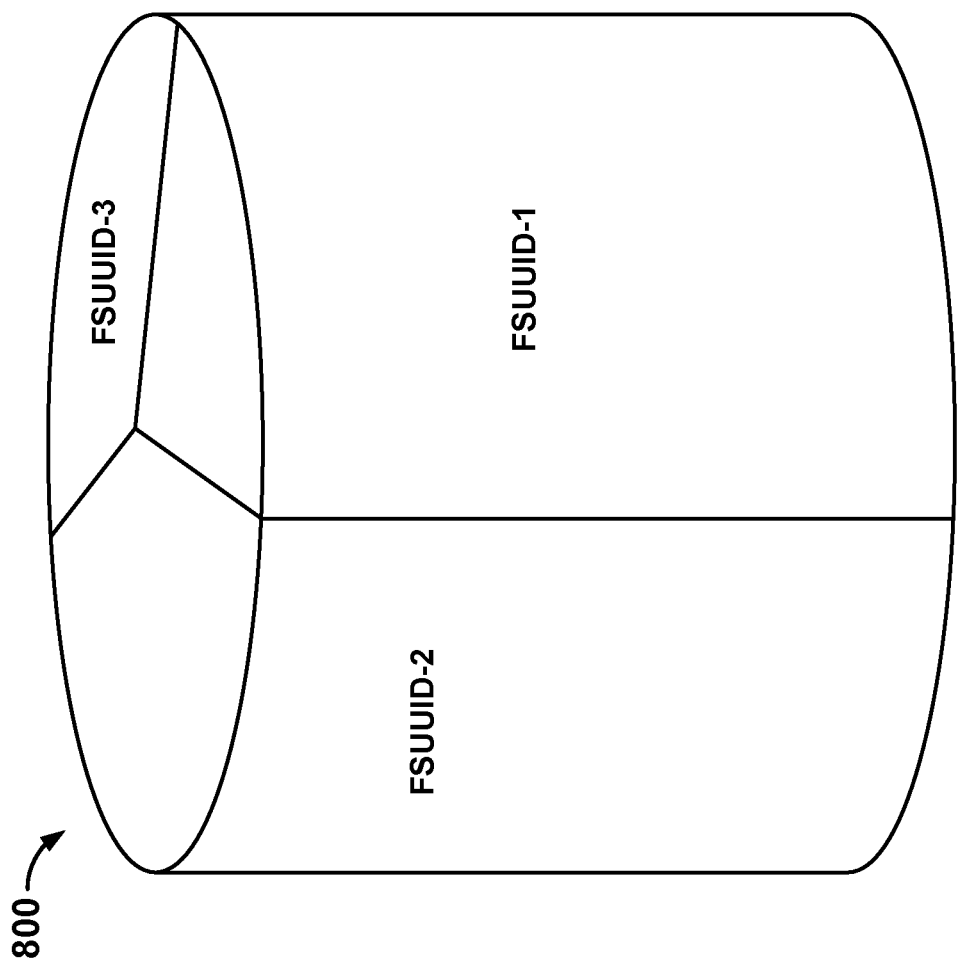
FIG. 8 is a diagram showing a bucket in an object store that stores VM snapshots that have been uploaded by three different storage systems.

FIG. 8 is a diagram showing a bucket in an object store that stores VM snapshots that have been uploaded by three different storage systems. At an object store, objects can be organized in containers called buckets. Buckets are similar to directories on a file-system. In some instances, bucket names are globally unique. As described above, in various embodiments, objects uploaded by a storage system to a bucket include in their names the FSUUID of that storage system. As such, name collision is avoided between objects uploaded by different storage systems to the same bucket based on the distinct FSUUIDs of the storage systems. The diagram of FIG. 8 illustrates that bucket 800 can store objects uploaded by three different storage systems with respective FSUUID-1, FSUUID-2, and FSUUID-3 values in their names such that the namespaces of objects uploaded by different storage systems will not collide.

As mentioned above, objects uploaded to bucket 800 by a particular storage system are, by default, owned and managed by that particular storage system. A set of VM snapshots that have been uploaded to bucket 800 by a particular storage system is sometimes referred to as that storage system's "partition." Because bucket 800 stores objects associated with sets of VM snapshots uploaded by three different storage systems, it could be said that bucket 800 stores three partitions.

To resolve name collision between objects uploaded to a bucket by the same storage system, in various embodiments, all objects uploaded by a given storage system are subject to a set of hierarchical naming conventions, as will be described below:

In various embodiments, data of a logical snapshot, prior to being replicated to a bucket, is split into data chunks of, defined by a pre-determined and configurable, cloud block size, e.g., 1 MB. These data chunks or cloud blocks are also referred to as L0 data chunk objects, which will be described in further detail below, a name derived from their place in the logical hierarchy of objects of a cloud snapshot.

Data chunks may be explicitly shared between copies of cloud snapshots but they should not be accidently shared. An example of explicit sharing is when two cloud snapshots reference the same chunk object in their chunk list (L1 object), which will be described in further detail below. But only one of them uploads the actual chunk object; the first one to do so. An example of accidental sharing would be when two cloud snapshots independently upload a data chunk with the same name and the same content for its data payload portion. This can have multiple undesirable consequences:

The second upload will overwrite the first upload. Even though their data payload is the same, their object headers may have different contents like creation time or information about the creator snapshot.

The two copies of the object will now become eventually consistent for read operations. A read operation could return either the old or the new object.

It can lead to corruption: since the two creator snapshots are unaware that they are sharing the data chunk, the deletion of any one of them from a snapshot would remove the data chunk permanently and the second snapshot will not have a dangling reference to a data chunk.

This can occur if the chunk name of the data chunk is in part derived from the data chunk's content. This is a common practice in storage systems because it simplifies explicit chunk sharing. For example, the name of the chunk could be, in part, the 160 bit SHA fingerprint or 256 bit SHA fingerprint of the data chunk. This practice makes it easy to assign a unique name to an object and it makes it easy to lookup whether an object already exists. Consequently, if two cloud data chunks have the same content, they will get the same SHA fingerprint value. If they are uploaded from the same storage system, then they will also have the same FSUUID in their name. This leads to an accidental name collision.

To prevent the name collision between objects uploaded by the same storage system, in various embodiments, a snapshot replication job identifier value (jobID) is added to the name of objects. To further group the chunk objects by their creator snapshot, in various embodiments, a jobID (a snapshot replication job identifier value) can be added to their name. In various embodiments, each snapshot replication job is assigned a unique and monotonically increasing identifier value. This ID can be generated from a single allocator within the storage. The allocator needs to persist the highest jobID allocated thus far so that ID's are not repeated. In various embodiments, the highest jobID allocated thus far is the current snapshot replication job identifier value that is stored by a bucket record (such as bucket record 604 of FIG. 6). Now all data chunks with a given fingerprint (e.g., SHA value) will have a unique name across snapshot replication jobs. This will prevent accidental sharing of data chunks between snapshot replication jobs but will permit explicit sharing, if desired. A new data chunk uploaded by a snapshot replication job will never have name collision with another chunk in the entire cluster due to the presence of jobID and FSUUID in its name, even though the rest of its name is based on its content. The jobID serves also serves the purpose of sequencing snapshot replication jobs and helping to iterate over them.

To prevent the name collision between objects uploaded by the same storage system with the same jobID but are part of different files in the same VM snapshot, in various embodiments, a file identifier value (FiledID) is added to the name of objects. In this case, as each file is chunked and uploaded, the duplicate data chunks will get the same name and overwrite each other. To avoid this, in various embodiments, the FileID of the original file is also added to the data chunk name. The presence of FileID also helps to list all the chunks of a file by using it as part of a prefix search. This addition still permits explicit data chunk sharing between files of the same VM snapshot, if desired and enables grouping of chunk objects of the same file within a VM snapshot.

To prevent the name collision between objects uploaded by the same storage system, the same jobID, the same FileID, but at different locations (e.g., offsets) of the same file, a file offset value (fileOffset) in added to the name of objects. Finally, the last remaining source of collision is if two data chunks with the same content occur at two different locations of the same file. Adding the file offset to each data chunk name object removes the last source of name collision for chunk objects but still permits explicit sharing of data chunks between snapshots.

With the above described naming sequence, a cluster of storage systems can freely generate data chunks and upload them without resulting in name collisions. In addition, by performing a prefix search, a cluster of storage systems can continue to search for the presence of an existing data chunk. For example, to determine whether a base snapshot is a good candidate for sharing blocks with a snapshot that is to be replicated to the bucket: the chunk list (L1 object) of the target snapshot can be retrieved from the cloud and searched for the presence of fingerprints (e.g., SHA) of the candidate data chunks from the snapshot that is to be replicated.

Figure 9:
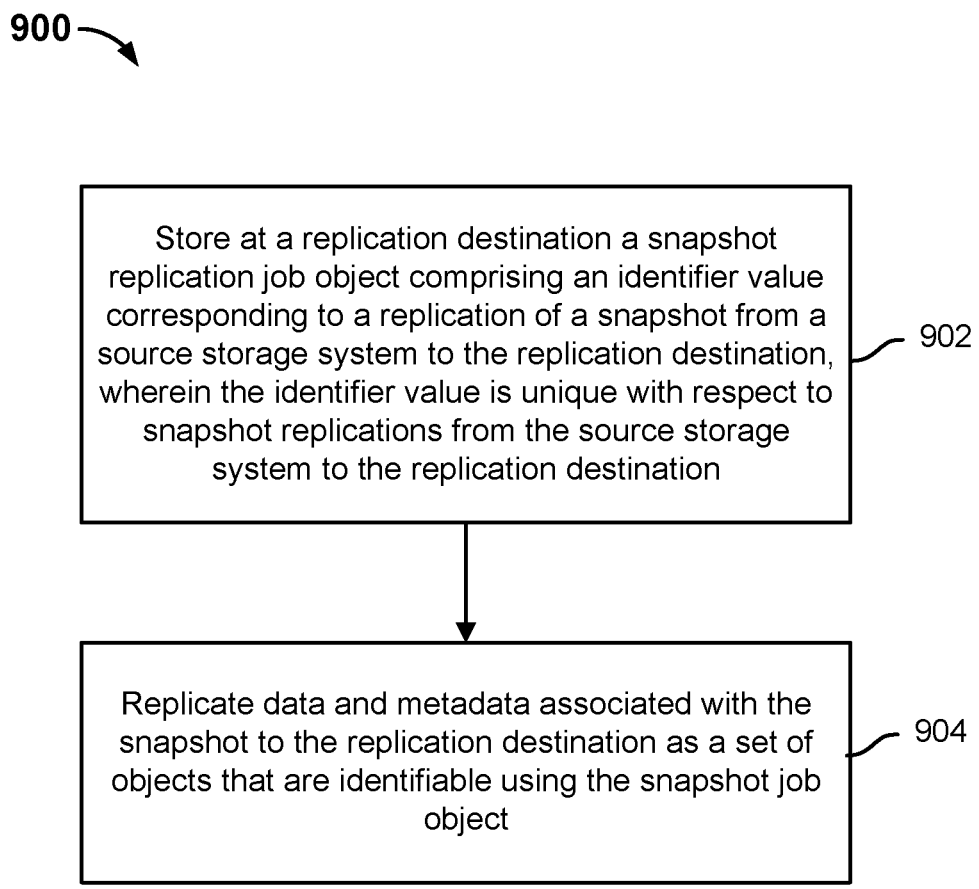
FIG. 9 is a flow diagram showing an embodiment of a process for performing a snapshot replication using a snapshot replication job object.

FIG. 9 is a flow diagram showing an embodiment of a process for performing a snapshot replication using a snapshot replication job object. In some embodiments, process 900 is implemented at a storage system such as one of storage systems 104, 106, and 108 of FIG. 1.

At 902, a snapshot replication job object comprising a job identifier value corresponding to a replication of a snapshot from a source storage system to a replication destination at the replication destination, wherein the identifier value is unique with respect to snapshot replications from the source storage system to the replication destination. As mentioned above, each instance of replicating a snapshot from a storage system to a replication destination (e.g., a bucket of an object store) is assigned a jobID. In various embodiments, the jobID that is assigned to each subsequent instance of a snapshot replication from the storage system to the replication destination is a monotonically increasing value. In some embodiments, for each instance of replicating a snapshot from the storage system to the replication destination, an object that includes the assigned jobID and also the FSUUID of the storage in the object's name is uploaded to the replication destination. As will be described below, in some embodiments, where objects associated with a snapshot replication form a hierarchy, the object whose name includes the FSUUID and the jobID is the L3 jobID object, where objects are each associated with a hierarchy from L0 through L4.

At 904, data and metadata associated with the snapshot are replicated to the replication destination as a set of objects that are identifiable using the snapshot job object. In some embodiments, the uploading of the L3 job object to the replication destination occurs at the start of the replication of a snapshot to the replication destination. In some embodiments, the L3 jobID object also includes the VM ID and the snapshot global ID of the snapshot that is associated with the jobID. As will be described in further detail below, in a restore process, for example, the VM ID and the snapshot global ID values included in the L3 jobID object can be used to locate other objects at the replication destination that store data and metadata pertaining to the snapshot associated with the jobID. In some embodiments, the other objects at the replication destination that store data and metadata pertaining to the snapshot associated with the jobID also include that jobID value.

As mentioned above, in various embodiments, the names assigned to objects storing snapshot data at a replication destination (e.g., a bucket of an object store) are logically hierarchical, even though the bucket namespace is flat. As will be described in further detail below, the hierarchical names of the objects are used to identify data chunks and metadata at the replication destination that belong to a VM snapshot that is uploaded by a particular storage system. Furthermore, the hierarchical names of the objects comprise a lightweight mechanism that enables data chunks at the replication destination to be shared among multiple snapshots.

Figure 10:
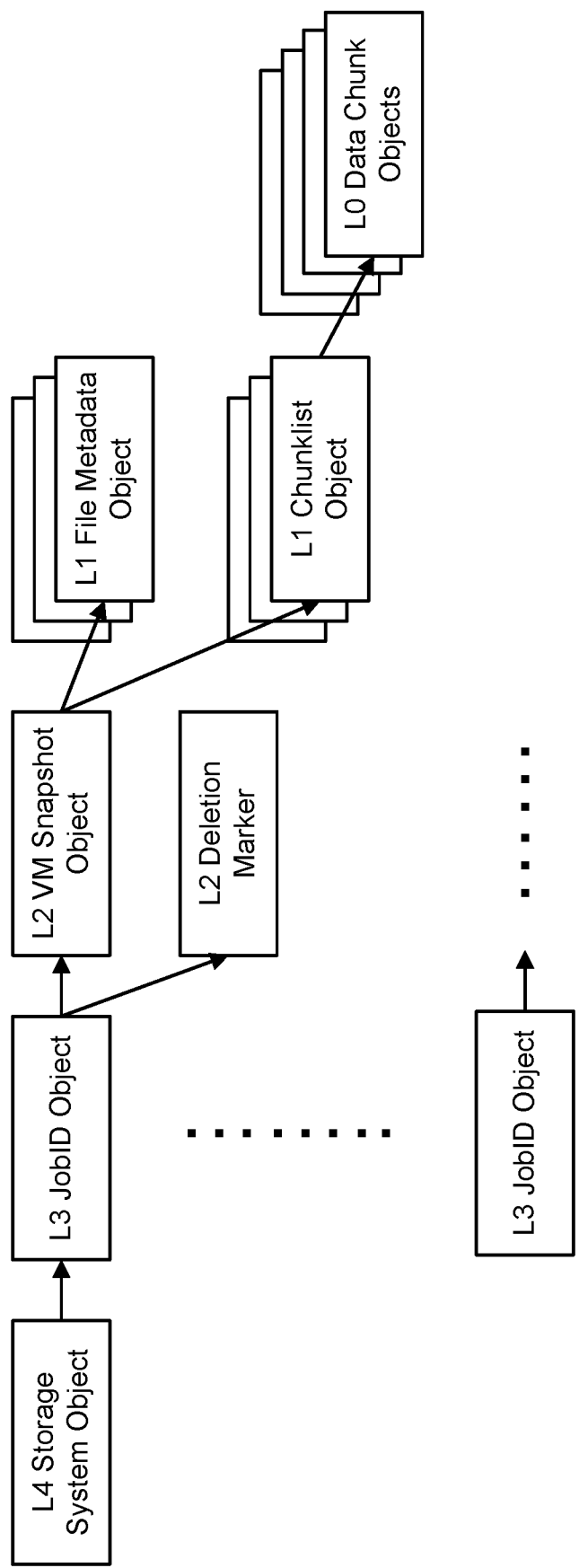
FIG. 10 is a diagram showing the relationships between objects at a replication destination that are associated with different hierarchies.

FIG. 10 is a diagram showing the relationships between objects at a replication destination that are associated with different hierarchies. In various embodiments, all the objects in the replication destination (e.g., bucket) will have a common header/name (a header/name with a common format). This header/name will help with versioning objects and with consistency checking. Note that, in some embodiments, this header will not be compressed or encrypted. dataChecksum is over encrypted data payload and does not cover the header itself. The following is an example of the common header:

+ - - - +
|objectName |
|objectType |
|objectVersion |
|objectSize |
|uploaderFsUUID |
|createTimestamp |
|dataChecksum |
+ - - - +

The object in each subsequently lower level in the L4 through L0 hierarchy that is shown in FIG. 10 may be obtained using information that is included in the objects of the hierarchy. In some embodiments, the object in each subsequently higher level in the L4 through L0 hierarchy that is shown in FIG. 10 may be obtained using information that is included in the objects of the hierarchy. For example, the FSUUID value of the L4 storage system object may be used to locate all other L3, L2, L1, and L0 objects that also include the FSUUID value. The following are example descriptions of the L0, L1, L2, L3, and L4 objects that are depicted in FIG. 10:

L4 Storage System Object

The L4 storage system object is in the highest level of the hierarchy and is used to associate objects that have been uploaded by the same storage system. Also, in the event that a FSUUID is lost or forgotten, there should be a way to recover FSUUID that replicated to the bucket and all snapshots that the storage system replicated to the bucket. The L4 storage system object may be used for that scenario. In some embodiments, the L4 storage system object does not have any contents but just the generic object header (VMSTORE_<FSUUID>). In some embodiments, the L4 storage system object stores an ID associated with the current version of a snapshot table object (CloudSnapshotTableObjectd) and some fields that are copied over from the snapshot table object (e.g., numLiveSnapshots, numSnapshotUploaded, numVMs, maxjobIDUploaded, and minjobIDReclaimed). The snapshot table object comprises an object that is periodically created at the bucket and includes the current content of the cloud replication snapshot table (e.g., such as the cloud replication snapshot table that is shown in FIG. 7). On listing VMSTORE_* on the bucket, a lost or FSUUID can be retrieved. Once a FSUUID is known, the L3 jobID objects need to be iterated to retrieve all the snapshots uploaded by the storage system associated with that FSUUID. The following is an example of the contents of a L4 storage system object:

```
+ - - - +
|VMSTORE_<FSUUID>_<CloudSnapshotTableObjectId>|
| - - - |
|numLiveSnapshots |
|numSnapshotUploaded |
|numVMs |
|maxjobIDUploaded |
|minjobIDReclaimed |
| |
+ - - - +
```

L3 jobID Object

The L3 jobID object is in the second highest level of the hierarchy and is used to associate objects that are part of the same instance of replication of a VM snapshot from a storage system that is identified by the "<FSUUID>" field. In some embodiments, the jobID that is assigned to each subsequent instance of replication of a VM snapshot to one replication destination (bucket) from a particular storage system is a monotonically increasing value. In some embodiments, no jobID value is skipped and no jobID value is reused. As such, in some embodiments, the L3 jobID objects associated with the same storage system may be obtained from a replication destination to determine all the snapshots that were uploaded by that storage system to that replication destination. In some embodiments, the content of the L3 jobID object includes a VM ID (VmId) and snapshot global ID (SnapshotGid) that are used to identify the VM and the snapshot, respectively, associated with the snapshot replication job. In some embodiments, each L3 jobID object includes the same prefix ("J_") associated with L3 jobID objects so that L3 jobID objects may be easily identified/ searched for using this prefix. The following is an example of the contents of a L3 jobID object:

```
+ - - - +
|J_<FSUUID>_<jobId> |
| - - - |
|VmId |
|SnapshotGid |
+ - - - +
```

The diagram of FIG. 10 shows a L4 storage system object points to only two L3 jobID objects for illustrative purposes and in practice, a L4 storage system may point to as many snapshot replication jobs that have been performed for that combination of storage system and replication destination (bucket). As shown in the diagram of FIG. 10, each L3 jobID object may point to a series of objects at lower levels of the hierarchy (L2, L1, and L0) that represent the data and metadata of the VM snapshot associated with that particular instance of snapshot replication, as will be described below.

L2 VM Snapshot Object

The L2 VM snapshot is in the third highest level of the hierarchy and is used to associate objects that are part of the same VM snapshot from a storage system that is identified by the "<FSUUID>" field. Each snapshot that has been replicated to the replication destination will have an L2 snapshot object. In some embodiments, an L2 VM snapshot is in the form "S_<FSUUID>_<vmId>_<snapshotGid>," where "S_" is the prefix that denotes an L2 VM snapshot object. The content of these objects is the snapshot attributes and files (fileGlobalIds) that make up this VM-level snapshot. Examples of the VM-level snapshot attributes include job ID, VM ID, snapshot global ID, retention time (the VM-level snapshot is to be reclaimed from the replication destination at the end of the retention time), the number of files in the snapshot, and the number of total data chunks that are part of the snapshot. In some embodiments, the L2 VM snapshot stores VM ID (previousVMIdDiffedAgainst) and also a snapshot global ID (previousSnapshotIdDiffedAgainst) associated with a base snapshot against it was deduplicated, if any. In some embodiments, the L2 VM snapshot also stores the security keys (e.g., AEK and MEK) (and versions thereof) and the encryption key that were used to encrypt the data associated with the VM snapshot. In some embodiments, the L2 VM snapshot does not have a jobId appended to its name so as to enable easy cross storage system snapshot restores. This means that, in some embodiments, a given storage system should never try to upload the same snapshot more than once. The following is an example of the contents of an L2 VM snapshot object:

```
+ - - - +
|S_<FSUUID>_<vmId>_<snapshotGid> |
| - - - |
|jobId |
|vmId |
|snapshotGid |
|retentionTime |
|numFiles |
|numTotalDataChunks |
|(vm snapshot attributes) |
|numChunkListsForFgid1 |
|<fileGlobalId1> |
| . . . |
|numChunkListsForFgid2 |
|<fileGlobalId2> |
|previousVMIdDiffedAgainst |
|previousSnapshotIdDiffedAgainst |
| |
+ - - - +
```

L2 Deletion Marker Object

The L2 deletion marker object is also in the third level of the hierarchy and is uploaded to the replication destination to mark the corresponding VM snapshot as deleted at a replication destination for expired snapshots (e.g., snapshots for which the retention time is up). This helps an adoption process (in which one storage system "adopts" the management of the snapshots that had been uploaded to a replication destination by another storage) to figure out deleted snapshots in the replication destination and also helps reclamation (e.g., garbage collection) to build snapshot links. Because some object stores provide an eventually consistent model and an issued DELETE operation on snapshot data at the replication destination may not be executed immediately but a PUT (e.g., a create/store) operation has read-after-write consistency (i.e., is immediately executed), storing an L2 deletion marker object that identifies a VM snapshot that had been uploaded to the replication destination is a technique by which to immediately mark a VM snapshot as being one that will be reclaimed off the replication destination, even if it has not been (completely) reclaimed yet. In some embodiments, an L2 deletion marker object is in the form "DEL_S_<FSUUID>_<vmId>_<snapshotGid>," where "DEL_" is the prefix that denotes an L2 deletion marker object. In some embodiments, an L2 deletion marker object stores the same content that its corresponding L2 VM snapshot object stores. The following is an example of the contents of an L2 deletion marker object:

L1 File Metadata Object

The L1 file metadata object is in the second to last lowest level of the hierarchy and is used to store file-level attributes. A corresponding L1 file metadata object is uploaded for each file that is included in a VM snapshot. In some embodiments, the L1 file metadata object includes various file attributes for the file snapshot like the space stats, permissions, checksums, etc. This is a lightweight object which helps a storage system get most of the information about the file without downloading any of the sub lists or data chunks for the file. In some embodiments, an L1 file metadata object is in the form "F_<fileSnapshotGlobalId>_<FSUUID>," where "F_" is the prefix that denotes an L1 file metadata object. The following is an example of the contents of an L file metadata object:

```
+ - - - +
|F_<fileSnapshotGlobalId>_<fsUuid> |
+ - - - +
|snapshotGid |
|snapshotFileGlobalId |
|<space stats>|
|<permissions>|
|contentChecksum (20 bytes) |
|numChunks |
|chunkSize |
+ - - - +
```

L1 Chunk List Object

The L1 chunk list object is also in the second to last lowest level of the hierarchy and is used to store the names (which are hereinafter sometimes referred to as "chunk names") of L0 data chunk objects at respective file offsets (at the replication destination granularity (e.g., 1 MB) that contain data related to a file of a VM snapshot. There will be at least one L1 chunk list object for every file in the VM snapshot. In some embodiments, the L1 chunk list objects are divided into multiple "sub lists" if an L1 chunk list object goes beyond a particular threshold (e.g., includes the names of more than 12,000 L0 data chunk objects) to manage memory requirement when building the object. In various embodiments, an L1 chunk list object includes only names of (e.g., pointers to) L0 data chunk objects for which an L0 data chunk objects exists in the replication destination. Since, in various embodiments, sparse regions as well zero data chunks are not uploaded to the replication destination, their names are not included in the L1 chunk list objects. The L1 chunk list object is in the form "F_<fileSnapshotGlobalId>_<FSUUID>_<subListId>," where "F_" is the prefix that denotes an L1 chunk list object. The "<fileSnapshotGlobalId>" field stores the file snapshot global ID (this fields helps in achieving better distribution of objects within the replication destination because this field may be used by the replication destination to determine where to store the L1 chunk list object). The "<subListId>" field starts from 0 and is a monotonically increasing number for every chunk list uploaded to the replication destination for this file as part of this replication job. The following is an example of the contents of an L1 chunk list object:

```
|+ - - - +
|F_<fileSnapshotGlobalId>_<fsUuid>_<subListId> |
|+ - - - +
|snapshotGid |
|fileGid |
|numChunks |
|contentChecksum (20 bytes) |
| |
|(file snapshot attributes) |
| |
|offset: <SHA1>-<jobId> |
| . . . |
|offset: <SHAn>-<jobId> |
+ - - - +
If subListId>1,
+ - - - +
|F_<fileSnapshotGlobalId>_<fsUuid>_<subListId> |
+ - - - +
|snapshotGid |
|fileGid |
|numChunks |
|offset: <SHA1>-<jobId> |
| . . . |
|offset: <SHAn>-<jobId> |
+ - - - +
```

The size computation for each data chunk pointer is as follows in accordance to some embodiments:

4 bytes (offset)—Assuming that the data chunk size is 1 MB, this can address a 4 petabyte range.

20 bytes (SHA1)

4 bytes (jobId)—This places a limit that in the lifetime of a storage system, (only) 4 billion snapshots can ever be uploaded.

- - -

=28 bytes for every 1 MB data chunk.

For a 64 TB VM, the largest supported by a storage system in some embodiments, that has no zero/sparse blocks, the size of per-block metadata for a file level snapshot is 64 TB/1 MB*28 bytes=1.75 GB.

L0 Data Chunk Objects

The L0 data chunk object stores underlying data associated with an identified offset of an identified file of an identified snapshot of an identified VM at a replication destination granularity (e.g., 1 MB) and metadata thereof for a VM snapshot. The L0 data chunk object is in the form "C_<1 byte of SHA >_<FSUUID>_<jobId>_<fileId >_<sublistId >_<fileOffset>_<SHA1>," where "C" is the prefix that denotes an L0 data chunk object. The "<SHA1>" field stores the 20 byte SHA over the uncompressed and unencrypted data and serves as an unique identifier of chunk of data. The "<1 byte of SHA >" field stores the first byte of SHA to help limit the list search space to look for leaked data chunks. The inclusion of the "<jobId>" prevents cross VM deduplication for snapshots uploaded by same storage system and also prevents deduplication if same snapshot is replicated twice from the same storage system. The inclusion of the "<fileId>" prevents deduplication at same offset between files of the same snapshot. The inclusion of the "<fileOffset>" identifies a logical offset of the file and prevents deduplication across files in the snapshot and within the file. Because VM snapshots may share data chunks at the replication destination (after a deduplication process), an L0 data chunk object may be shared by two different snapshots but only include the jobID of the earlier performed snapshot replication job (because that snapshot replication job had uploaded the base snapshot relative to the later uploaded snapshot). The following is an example of the contents of an L0 data chunk object:

```
+ - - - +
|C_<1 byte of SHA>_<fsuuid>_<jobId>_<fileId>_ <sub-
listId>_ <fileOffset>_ <SHA1>|
+ - - - +
|compressionAlgo |
|uncompressedDataSize |
|< . . . compressed data follows> |
+ - - - +
```

Figure 11:
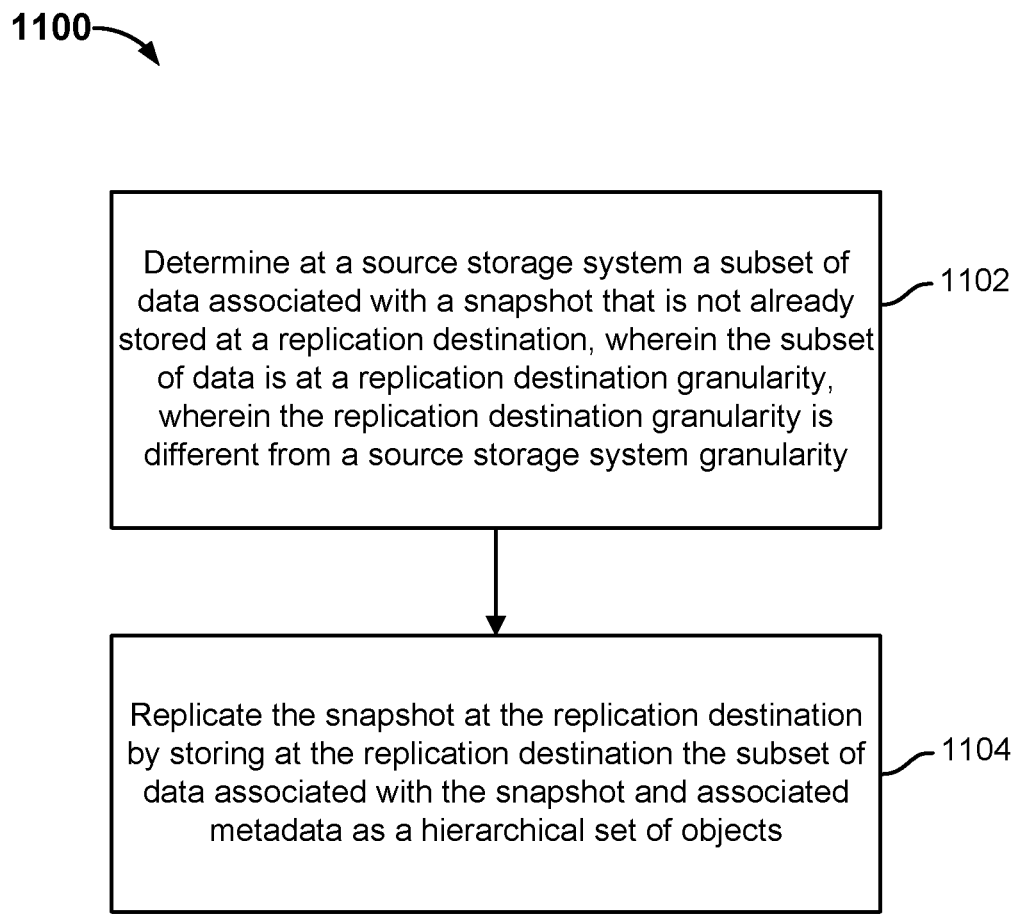
FIG. 11 is a flow diagram showing an embodiment of a process for efficiently replicating snapshots to a replication destination.

FIG. 11 is a flow diagram showing an embodiment of a process for efficiently replicating snapshots to a replication destination. In some embodiments, process 1100 is implemented at a storage system such as one of storage systems 104, 106, and 108 of FIG. 1.

At 1102, a subset of data associated with a snapshot that is not already stored at a replication destination is determined at a source storage system, wherein the subset of data is at a replication destination granularity, wherein the replication destination granularity is different from a source storage system granularity. For a snapshot that is to be replicated/uploaded from a storage system to a replication destination (e.g., a bucket or other namespace at an object store), a base snapshot that already exists at the replication destination is determined. In various embodiments, a base snapshot comprises a snapshot with which the snapshot to be replicated share data. In various embodiments, a base snapshot comprises an older (ancestor) snapshot in the same chain of the snapshots with the snapshot to be replicated. For example, the chain of snapshots may pertain to one VM. Once the base snapshot at the replication destination is identified, it is determined at the source storage system which data chunks (i.e., data in units that are stored at the replication destination) are included in the snapshot to be replicated but are already included in the base snapshot in the replication destination. These identified data chunks ("dirty" data/deduplicated data/set of difference data) are then uploaded to the replication destination and stored as objects (e.g., L0 data chunk objects). If the source storage system stores data at a different sized unit/granularity than the sized unit/granularity at which the replication destination stores data, then the dirty data identified at the source system is translated from the granularity used by the source storage system (e.g., 8 KB) into the granularity used by the replication destination (e.g., 1 MB) before the dirty data is uploaded to the replication destination.

At 1104, the snapshot at the replication destination is replicated by storing at the replication destination the subset of data associated with the snapshot and associated metadata as a hierarchical set of objects. The deduplicated data of the snapshot to be replicated are stored at the replication destination as objects and metadata that comprises attributes of the snapshot and its files are stored at the replication destination as well. Furthermore, metadata that identify all the data of the same instance of snapshot replication as a single snapshot replication job and which data chunks (e.g., L0 data chunk objects) of the base snapshot with which the snapshot to be replicated shares are uploaded to the replication destination (e.g., as L3, L2, and L1 objects).

Figure 12:
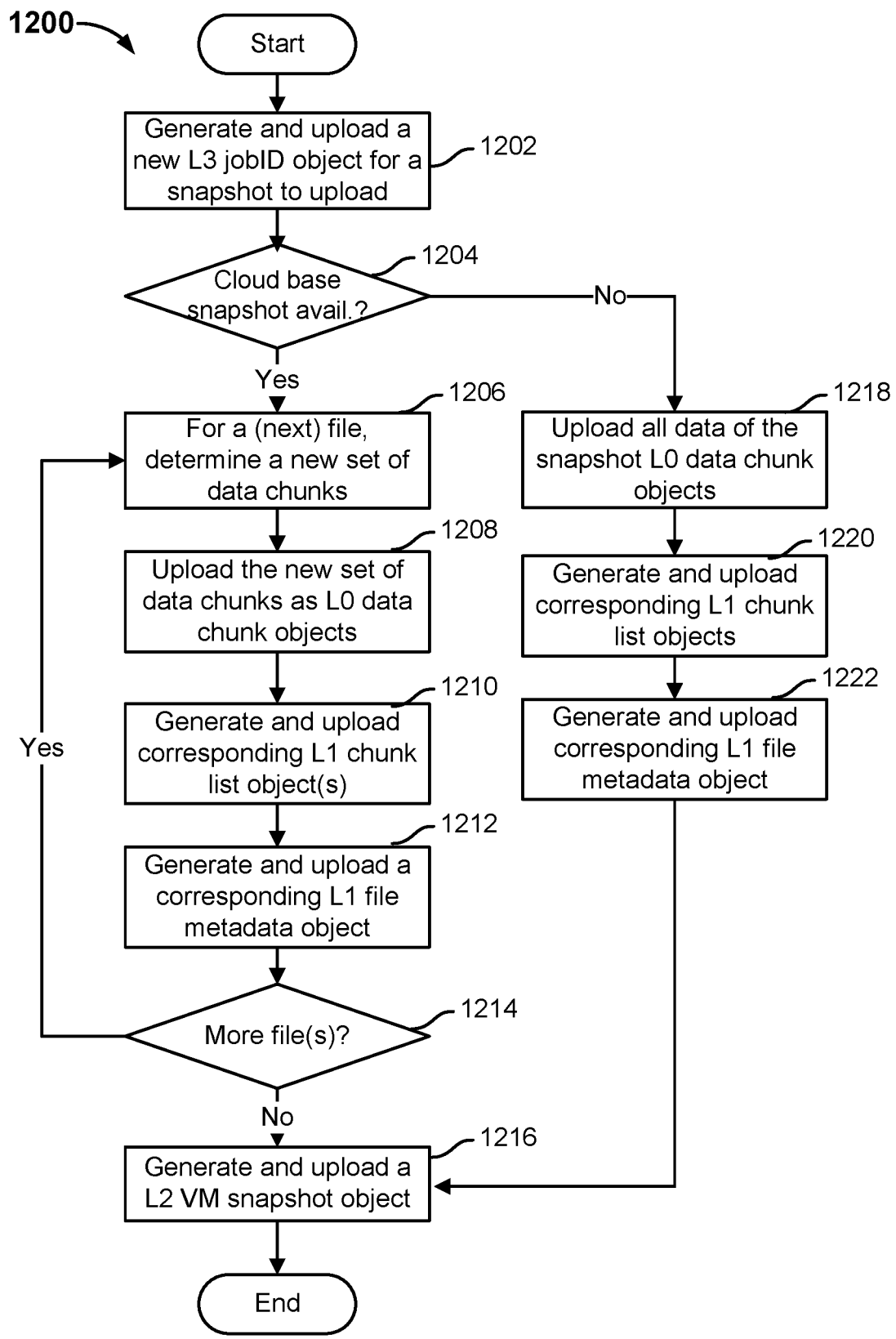
FIG. 12 is a flow diagram showing an example of a process for efficiently replicating snapshots to a replication destination.

FIG. 12 is a flow diagram showing an example of a process for efficiently replicating snapshots to a replication destination. In some embodiments, process 1200 is implemented at a storage system such as one of storage systems 104, 106, and 108 of FIG. 1. In some embodiments, process 1100 of FIG. 11 may be implemented using process 1200.

Process 1200 describes an example process of replicating/uploading snapshot data from a storage system to a replication destination and generating L3, L2, L1, and L0 objects at the replication destination in association with the replication process.

At 1202, a new L3 jobID object is generated and uploaded for a snapshot to upload. A replication job associated with a snapshot for a particular VM is selected to be performed and a new L3 jobID object is generated and then uploaded to the replication destination (bucket). In various embodiments, a new jobID value for the job is determined from the current jobID value/counter that is stored by/pointed to by the bucket record that is stored at the storage system corresponding to the particular bucket. For example, the new L3 jobID object is stored at the bucket using the cloud API call that is in the form of PUT(identifier, data). For example, the identifier for the new L3 jobID object is "J_<FSUUID>_<jobId>" and the data is the VM ID and the snapshot global ID (as described above with FIG. 10).

The following is an example process of creating a snapshot replication job: With cloud replication, not every snapshot is replicated for a given VM configured for replication. In some embodiments, a system management (SM) program and/or server explicitly sends a request to replicate a snapshot to the bucket based on the backup schedule. In response to the request, a unique jobID is allocated for the backup job and the job is persistently remembered. There is a background scanner thread which iterates all replication configurations on a per destination record basis and picks up snapshot jobs from the replication configurations and enqueues them to a worker pool of threads which work on backup/restore.

At 1204, it is determined whether a cloud base snapshot is available. In the event that the cloud base snapshot is available, control is transferred to 1206. Otherwise, in the event that the cloud base snapshot is not available, control is transferred to 1218.

Whether a base snapshot with which the snapshot to upload shares data is already present/stored at the bucket is determined. If such a base snapshot existed at the bucket, then the snapshot to be uploaded is deduplicated against the base snapshot and only those data chunks of the snapshot to upload that are new relative to those stored for the base snapshot (the set of difference data) need to be uploaded. Otherwise, if such a base snapshot did not exist at the bucket, then the snapshot to be uploaded is uploaded as a collapsed snapshot, meaning that all of the snapshot data would be uploaded.

In some embodiments, whether a base snapshot with which the snapshot to upload shares data is already present/stored at the bucket is determined is determined by checking the lastReplicatedSnapshotID value included in the replication configuration for which the replication job of the snapshot to upload is associated. The lastReplicatedSnapshotID value identifies the last snapshot that is associated with the VM of the replication configuration that was replicated to the bucket. It is determined whether the lastReplicatedSnapshotID value identifies a snapshot on which the snapshot to upload depended (i.e., shared data with) and if so, then the snapshot identified by the lastReplicatedSnapshotID is the base snapshot that is to be used for deduplication. Whether the snapshot to be uploaded depended upon the snapshot identified by the lastReplicatedSnapshotID may be determined by checking the metadata stored by the storage system's file system that describes dependencies among snapshots (e.g., which snapshots form a chain for a particular VM and/or which snapshot of a clone VM depends on a shared snapshot of a source VM).

In some embodiments, in the event that the snapshot to upload belongs to a clone VM and none of the clone VM's snapshots are yet in the bucket, the VM ID of the source VM ID is looked up (e.g., in metadata stored by the filesystem) and the lastReplicatedSnapshotID value that is included in the replication configuration of the of the source VM and the cloud replication snapshot table are checked to determine whether any of the source VM's snapshots with which the snapshot to upload shares data already exists at the bucket. For example, using the determined source VM ID information, all the cloud snapshots of the source VM can be listed. From this list, the most recent cloud snapshot of the source VM that is older than the snapshot of the clone VM that is to be uploaded may be identified as the base snapshot of the clone VM. If so, then the snapshot in the bucket with which the snapshot to upload already shares data is determined as the base snapshot.

At 1206, for a (next) file, a new set of data chunks included in the snapshot to upload but are not included in the cloud base snapshot is determined. If it is determined that a base snapshot for the snapshot to upload does exist in the bucket, then deduplication of data is available for the snapshot to upload. For each file of the snapshot to upload, it is determined which data chunks (the granularity of storage that is used at the bucket e.g., 1 MB) that is stored in the snapshot to upload but not in the base snapshot and this each data chunk of this new set is stored at the bucket as an L0 data chunk object. This involves constructing a list of dirty offsets (e.g., at 1 MB boundaries) against the base snapshot. A snapshot comprises a point-in-time copy of the set of data and in various embodiments, a subsequently generated snapshot includes mappings to data that was modified since the previous snapshot was created. Because snapshots store delta data relative to each previously generated snapshot, data for any offsets in the base snapshot which haven't been overwritten in the series of snapshots after the base snapshot need not be uploaded to the bucket again. In some embodiments, the list of offsets with valid data in the base/last replicated snapshot is sometimes maintained locally in a file to avoid cloud costs. This list is merged with the list of dirty offsets constructed before to get a fully collapsed view of the snapshot that is currently being replicated.

In some embodiments, an in-memory chunk map is created for each file that is to be uploaded to the bucket that describes the chunks associated with the file. The following is an example of the chunk map data structure:
    struct chunkMetadata {
    char chunkName[CLOUDREPL_OBJ_LEN];
    uint64 offset;
    bool dirty;
    bool uploadToCloud;
    };

At 1208, the new set of data chunks is uploaded as L0 data chunk objects. Each data chunk is uploaded to the cloud using the cloud API for upload, e.g., PUT(identifier, data). An example for identifier for each L0 data chunk object can be "<SHA1>_<FSUUID>_<jobId>_<fileOffset>." The corresponding data chunk is the compressed and encrypted results of the original data chunk that was read from the snapshot.

In some embodiments, a snapshot undergoing replication needs to be protected from snapshot deletion at the source storage system. To do this, in various embodiments, a global multi-set of snapshotIds is maintained to serve as local deletion holds. The global multi-set of snasphotIds identify snapshot that are currently being replicated to the cloud to prevent snapshot deletion from acting on them. The set needs to be a multi-set because the same VM can be configured to replicate to different destinations under independent replication configurations, which would require two instances of the same snapshotId to be present in the set. Apart from the currently replicating snapshot, in various embodiments, cloud replication also requires the last replicated snapshot for a particular replication configuration of a given VM to be protected from snapshot deletion for performance reasons. In some embodiments, the snapshot associated with the lastReplicatedSnapshotID field of the replication configuration is prevented from being deleted locally from the storage system.

Consider the scenario for a file foo.vmdk having a snapshot chain of the form:

Sy→S2→S1, where Sy is the youngest snapshot and S1 is the oldest snapshot. S1 will be sent to the cloud as collapsed as there is no base to deduplicate against. When S2 is being replicated, S's chunk lists (L1 chunk list objects) are downloaded from the cloud and all the chunks in the L1 chunk list objects are marked as non-dirty for deduplication. If the offsets present in S1's chunk list are not overwritten in S2, the same chunk object names are used for S2, thereby avoiding reading and uploading the data to the cloud. If S1 gets deleted locally before S2 starts replicating, all of its chunks will be merged into S1 and will now count as dirty chunks as there is no way of knowing if the data in S2 is an overwrite or a result of merging S1 until the data is read and its fingerprint is computed. Reading data that does not need to be transferred is unnecessary and slow. To avoid this, a deletion hold is locally placed on S1 until S2 is successfully replicated to the cloud.

Note that an efficient replication can be created even if S1 was deleted locally. The S1 snapshot can be downloaded from cloud if it does not exist locally and for every offset in S2, before uploading the chunk to the cloud, its fingerprint can be compared against the one present in the S1's L1 chunk list object(s) at that offset to avoid sending duplicate data over the network and using up extra storage in the cloud. The performance improvement that is achieved by protecting S1 locally is avoiding the need to read for its data chunks.

If a cloud snapshot is being used as a base snapshot for replication, it needs to be protected from deletion to prevent the free space reclamation process (e.g., garbage collection) from potentially reclaiming chunks which can be shared by the snapshot undergoing replication. Cloud snapshot deletion holds are implemented in a similar fashion. In some embodiments, there is an in-memory set of snapshot globalIds for snapshots that are needed as base snapshots (e.g., for deduplication purposes) and cloud snapshot deletion requests are prevented by looking up this set. The set is repopulated on recovery in case of crashes from local persistent metadata stored inside replication configurations.

In some examples, SHA1 fingerprint is used for deduplication. Below are two example options for fingerprinting a chunk:

1. Compress, then encrypt, then perform SHA:
   Every buffer has to be compressed and encrypted before it can be determined if it is a duplicate. With gzip, compression is really expensive and so is encryption.
   Object header has to be encrypted separately.
   Need a separate checksum to verify object header for a scrub process running in the cloud.
   Does not provide a method to scrub non-chunk objects since their object IDs are not their SHA.
   Snapshots replicated to on premise cloud object stores will likely not be encrypted. So, in some embodiments, there are two different mechanisms for generating fingerprints.
2. Perform SHA, then compress, then encrypt (either SHA is over the object buffer with key appended to it or the object IDs are also encrypted):
   Encryption and compression steps are eliminated if the object is found to be a duplicate, which saves CPU and potentially simplifies local storage operations.
   Object and header can be compressed and encrypted as a single unit.
   Provides a uniform way for handling encrypted and non-encrypted data.
   No relationship between the objectId and the object data (plain or encrypted) can be inferred. In other words, an attacker cannot deduce or copy the method for generating object IDs.

At 1210, L1 chunk list objects corresponding to the L0 data chunk objects are generated and uploaded. As mentioned above, each L1 chunk list object includes the names (e.g., combinations of the corresponding data chunk's SHA and the jobID of the snapshot replication job) of the corresponding data chunks at their respective offsets. Because a base snapshot exists in the bucket for the snapshot to be uploaded, an L1 chunk list object for the snapshot to be uploaded may include names of data chunks that are dirty and uploaded to the bucket and also names of data chunks that are already stored at the bucket for the base snapshot. The names of data chunks that are dirty and uploaded to the bucket for step 1208 may be computed (e.g., the SHA1 portion thereof) based on the contents of the data chunks. The names of data chunks that are not dirty and therefore are not uploaded to the bucket may be copied from corresponding offsets of the L1 chunk list object that is stored for the base snapshot. Therefore, the final chunk list to be uploaded for the file of the snapshot to be uploaded comprises a merge of computed data chunk names of the uploaded data chunks as well as the chunk names copied over from corresponding L1 chunk list objects that are stored for the base snapshot (in some embodiments, the L1 chunk list objects that are stored for the base snapshot may be downloaded to the storage system). In some embodiments, each L1 chunk list object is limited to a predetermined (e.g., 12,000) number of data chunk names. If multiple L1 chunk list objects are stored at the replication destination for a particular file, then each chunk list is sometimes referred to as a "sub list." An L1 chunk/sub list object may be uploaded to the cloud with the following identifier "F_<fileSnapshotGlobalId>_<fsUuid>_<subListId>," where the value of the "<subListId>" is incremented for each subsequent sub list that is uploaded for the file (if there are more than one sub list to be uploaded for the file).

At 1212, an L1 file metadata object corresponding to the L1 chunk list objects is generated and uploaded. After all the sub list(s) for the file had been uploaded, an L1 file metadata object that includes attributes associated with the file is uploaded to the bucket. An L1 file metadata object may be uploaded to the cloud with the following identifier "F_<fileSnapshotGlobalId>_<FSUUID>."

At 1214, it is determined whether there is at least one more file included in the snapshot to upload. In the event that there is at least one more file included in the snapshot to upload, control is returned to 1206. Otherwise, in the event that there is not at least one more file included in the snapshot to upload, process 1200 ends.

At 1218, all data of the snapshot to upload are uploaded as L0 data chunk objects. If it is determined that a base snapshot for the snapshot to upload does not exist in the bucket, then deduplication of data is not available for the snapshot to upload. As such, all of the data (unless the data was zero) is read for the snapshot and uploaded to the bucket at the bucket granularity (e.g., 1 MB) as L0 data chunk objects.

At 1220, L1 chunk list objects corresponding to the L0 data chunks objects are generated and uploaded. As many sub lists are generated and uploaded as L1 chunk list objects to the bucket to correspond to the number of L0 data chunk objects that were uploaded.

At 1222, an L1 file metadata object corresponding to the L1 chunk list objects is generated and uploaded. After all the sub list(s) for the file had been uploaded, an L1 file metadata object that includes attributes associated with the file is uploaded to the bucket.

At 1216, an L2 VM snapshot object is generated and uploaded. After all the files had been uploaded, an L2 VM snapshot object that includes attributes associated with the snapshot is uploaded to the bucket. An L2 VM snapshot object may be uploaded to the cloud with the following identifier "S_<FSUUID>_<vmId>_<snapshotGid>."

In some embodiments, after process 1200 is completed, the lastReplicatedSnapshotID value included in the replication configuration for which the replication job of the snapshot to upload is associated, is updated with the snapshot identifier of the snapshot that was just replicated.

In some embodiments, after process 1200 is completed, a deletion hold of the local snapshot that was just replicated may be released. In some embodiments, after process 1200 is completed, a deletion hold of the base snapshot in the bucket may also be released.

In some embodiments, after process 1200 is completed, the cloud replication snapshot table (e.g., such as the example cloud replication snapshot table of FIG. 7) is updated to indicate that the snapshot has been replicated to the cloud. If the newly replicated snapshot shares data chunks with a base snapshot that is also presented at the cloud, then this dependency relationship is also added to the cloud replication snapshot table.

In some embodiments, a replication/upload process is checkpointed by periodically uploading checkpoint fields within the replication configuration associated with the replication. Example checkpointing fields include the ID of the snapshot to upload that is being replicated, the current file of the snapshot that is in progress (files of a snapshot are replicated in a deterministic process, e.g., alphabetical), the current offset that is in progress, the last completed sub list that was uploaded, and the last sub list that was used from the base snapshot. For example, the relevant checkpointing fields of the replication configuration are dynamically updated during the snapshot replication of a snapshot belonging to the replication configuration as data associated with each subsequent file, offset, and sub list are uploaded to the bucket.

In some embodiments, once the snapshot replication job is complete, the checkpointing fields belonging to the replication configuration are invalidated to indicate the completion of the job. If the local file system crashes at any point during replication or replication fails due to the cloud network errors, a background scanner thread will re-enqueue the snapshot for replication on recovery. In the event of a crash, it is possible that at least some data and metadata of a snapshot has been completed uploaded. Since, in various embodiments, all object names are unique for a given snapshot file combination, simple GETs may be performed on the cloud to check which objects have already been uploaded to bring the system back to where it was. The highest granularity with this approach is one sub list worth of data as the crash might have occurred in the middle of a sub list upload. As such, the checkpointing fields of the replication configuration can be used to point to which sub list was last uploaded for a snapshot replication job to save the number of GET requests that are needed to be performed at the bucket. Since objects cannot be caused to be overwritten on the cloud, a GET is to be made for every data chunk of the first sub list that was uploaded after crashing.

Almost all storage systems, in part, price their product based on the amount of storage available or used on the system. This is also true of cloud based object stores. In addition, a cloud based object store may also charge for access requests to the object store. For example, if a primary storage system is seeking to store a 500 MB snapshot in the cloud, then the user may be charged for using 500 MB of space in the cloud. Further, if the snapshot is divided in independent objects of size 100 MB each and then transferred to the cloud, then the user may also incur a charge for five access (PUT) requests instead of just one access request.

A second cost that is incurred by a user is due to the use of a network to access the cloud object store. The available network to the cloud object store may also be priced based on the bandwidth needed and so it is obviously beneficial to be efficient on the network when transferring data. This is especially true when accessing a cloud object store that is remote to the data center where the source of data is being copied from.

Finally, a third cost is the use of local resources such as CPU and memory. Generally, the amount of CPU and memory that are used as local resources in creating cloud snapshots is proportional to the bytes that must be processed. And so, reducing the total bytes that must be processed helps with reducing cost.

In various embodiments, the act of determining the logical difference in content between two snapshots is referred to as "differencing" and the set of data that represents the difference in content between two snapshots is sometimes referred to as "a set of difference data." The logical content of two snapshots may have a lot of common data and the concept of differencing is to determine what is not common. For example, consider snapshot S1 has logical size 100 MB and snapshot S2 also has logical size 100 MB. Then, snapshot S1 and S2 may have the same content for the byte range starting at offset 50 MB and ending at offset 100 MB but different content for the byte range starting at offset 0 and ending at offset 49 MB. Now, if the logical content of the snapshots is divided in logical data chunks of 1 MB each, then the two snapshots can potentially share blocks 50 to 99 but not data chunks 0 to 49. In this context, the concept of determining the difference is the process of identifying the range of data chunks that cannot be shared (0 to 49) and the range of data chunks that can be shared (50 to 99). The advantage is that when replicating S2, data chunks can be shared between S1 and S2 whenever possible and only the data chunks that are different need to be replicated to the cloud object store. This sharing leads to storage efficiency, network usage efficiency and computational efficiency.

A set of difference data can be generated with respect to a single previous snapshot or a set of previous snapshots. For example, snapshot S2 may share five data chunks with snapshot S1 and two data chunks with snapshot S0.

In some embodiments, determining a set of difference data between snapshots, and particularly between a snapshot to replicate from a storage system and a base snapshot that is already stored at a cloud object store generally includes the following steps:

1. Computing the local-difference: The exact difference between the snapshot to replicate and the base snapshot can be determined by comparing the primary storage data structures/indices (e.g., b-trees) of the snapshot to replicate with the base snapshot. Offsets that have changed in the snapshot to replicate become part of the difference data. In some embodiments, the snapshot to replicate b-tree may itself be stored as a delta of the base snapshot b-tree, on the primary storage, in which case, the difference can be determined by simply recording the offsets mentioned in the snapshot to replicate b-tree, observing the read-limit. In various embodiments, the "read-limit" is the last valid offset in a snapshot. The read-limit may differ for different snapshots within the same chain of snapshots. One example scenario in which a snapshot may have a smaller read limit than its base snapshot is if part of the file associated with the snapshot had been deleted after the base snapshot had been generated.

2. Computing the cloud-difference: The second step is translating the difference to the cloud data chunk size/granularity. Note that local-difference is at the file system data block size. For computing the cloud-difference, the chunk lists (L1 objects) of the target and record offsets in the chunk lists that are affected due to offsets mentioned in the local-difference are retrieved. For the affected offsets, new data chunks names may be prepared by reading data for those offsets at the cloud data chunk size and deriving the chunk names, in part, based on the read contents (e.g., computing SHA over the read data). This yields the cloud-difference.

3. Once the cloud-difference has been determined, a new chunk list for the snapshot to replicate can be prepared by preserving/copying the data chunks names from the base snapshot that were not affected and using the new data chunk names when they were affected. Note that when the data chunk names are common between the snapshot to replicate's chunk list and the base snapshot's chunk list, then they can share the cloud data chunks. Otherwise, new data chunks have to be created and uploaded to the cloud as new L0 objects.

Further examples regarding determining a set of difference data between snapshots, and particularly between a snapshot to replicate from a storage system and a base snapshot that is already stored at a cloud object store are described below.

Figure 13:
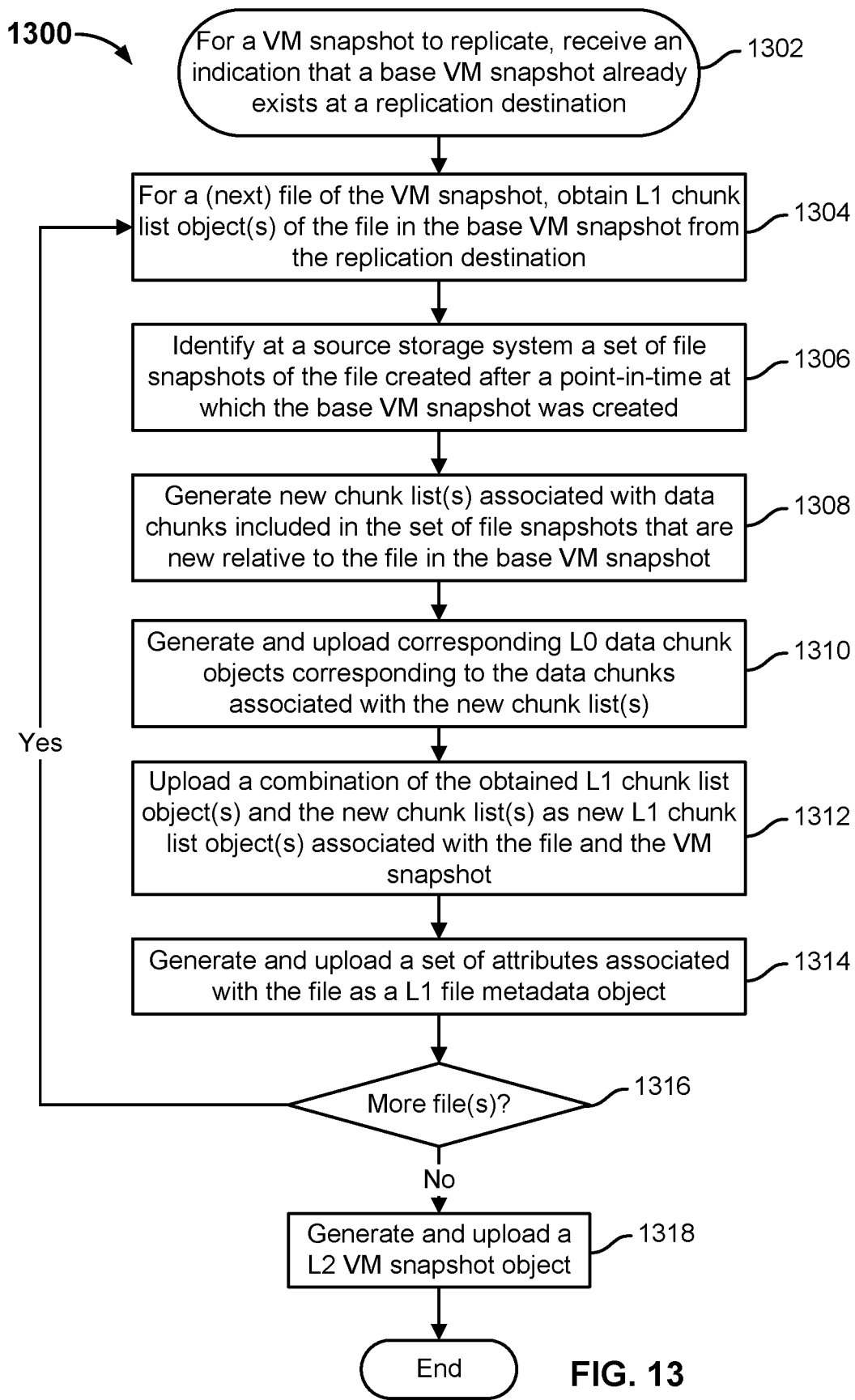
FIG. 13 is a flow diagram showing an example process of determining a set of difference data between a snapshot to replicate to a replication destination and a base snapshot that already exists at the replication destination.

FIG. 13 is a flow diagram showing an example process of determining a set of difference data between a snapshot to replicate to a replication destination and a base snapshot that already exists at the replication destination. In some embodiments, process 1300 is implemented at a storage system such as one of storage systems 104, 106, and 108 of FIG. 1. In some embodiments, steps 1206, 1208, 1210, 1212, 1214, and 1216 of process 1200 may be implemented using process 1300.

Process 1300 describes an example process of determining the difference data (e.g., dirty data in the snapshot to upload but not in the cloud base snapshot) between the snapshot to upload and the cloud base snapshot and uploading L2, L1, and L0 objects accordingly.

At 1302, for a VM snapshot to replicate, an indication that a base VM snapshot already exists at a replication destination is received. In various embodiments, a copy of the base VM snapshot also exists at the source storage system. Because a copy of the base VM snapshot also exists at the source storage system and given that in various embodiments, successive snapshots store only mappings to data have been changed or newly written since an immediately previous snapshot, the snapshot to replicate that depends from the base snapshot stores mappings to data that do not exist in the local copy of the base snapshot.

At 1304, for a (next) file of the VM snapshot, L1 chunk list object(s) of the file in the base VM snapshot are obtained from the replication destination. To determine what is included in the base snapshot at the bucket, the one or more L1 chunk list objects associated with a file of the base VM snapshot are downloaded (e.g., using the GET API call) from the bucket (if such information is not already stored locally). As described above, each L1 chunk list object of a file included in the base VM snapshot comprises the name (e.g., an SHA or other fingerprint) of the data chunk at each offset (at the bucket's granularity) for that file of the base VM snapshot.

At 1306, a set of file snapshots of the file that is created after a point-in-time at which the base VM snapshot was created is identified. The VM snapshot to replicate may be an immediate descendent of the base VM snapshot but the VM snapshot to replicate may also not be an immediate descendent of the base VM snapshot (i.e., there could be one or more intervening/intermediate snapshots between the snapshot to replicate in a chain of snapshots) at the storage system. The "intervening/intermediate" snapshots are older than the snapshot to replicate but younger than the base snapshot and reside only at the storage system and not the cloud object store. In various embodiments, each snapshot stores only new or modified data relative to the immediate ancestor snapshot.

At 1308, new chunk list(s) associated with data chunks included in the set of file snapshots that are new relative to the file in the base VM snapshot are generated. As mentioned above, each VM snapshot at a point-in-time is actually a collection of snapshots of the files of the VM at that point-in-time. For the file under consideration, a snapshot of that file associated with each descendent snapshot at the storage system including the VM snapshot to replicate and each snapshot in between the VM snapshot to replicate and the base VM snapshot is determined and for each range of offsets at the bucket granularity (e.g., 1 MB), it is determined whether any of the snapshots of the file stores data. If so, the newest file snapshot (i.e., the file snapshot that was generated at the latest point-in-time) that stores content in that range of offsets is identified and a new chunk name is generated by reading data associated with that range of offsets from that file snapshot. The new chunk name is also inserted into the entry corresponding to that range of offsets in a new chunk list to be uploaded for the file of the VM snapshot to replicate. That a file snapshot at the source system stores data at that range of offsets indicates that new or modified (dirty) data has been stored for the file since the snapshot of that file was made at the point-in-time of the base VM snapshot and that therefore, a new data chunk needs to be uploaded for that range of offsets. If none of the snapshots of the files include any data at a particular range of offsets, then the name of the chunk data corresponding to that range of offsets is copied over from the corresponding range of offsets included in the L1 chunk list object that was downloaded for the base VM snapshot. That no file snapshot at the source system stores data at that range of offsets indicates that no new or modified (dirty) data has been stored for the file since the snapshot of that file was made at the point-in-time of the base VM snapshot and that therefore, no new data chunk needs to be uploaded for that range of offsets.

At 1310, corresponding L0 data chunk objects corresponding to the data chunks associated with the new chunk list(s) are generated and uploaded. The dirty data chunks at the storage system from either the VMs snapshot to replicate or another intervening VM snapshot between the VM snapshot to replicate and the local copy of the base VM snapshot are uploaded as L0 data chunk objects.

At 1312, a combination of the obtained chunk list object(s) and the new chunk list(s) are uploaded as new L1 chunk list object(s) associated with the file and the VM snapshot. The new chunk lists comprises a combination of ranges of offsets with new chunk names associated with new data chunks that were uploaded at 1310 and also ranges of offsets with chunk names associated with unchanged data chunks that were copied from the downloaded L1 chunk list object(s) associated with the base VM snapshot.

At 1314, a set of attributes associated with the file is generated and uploaded as an L1 file metadata object. After the L0 data chunk objects and L1 chunk list object(s) have been uploaded for the file, an L1 file metadata object is uploaded for the file.

At 1316, it is determined if there is at least one more file included in the VM snapshot to replicate. In the event that there is at least one more file included in the VM snapshot to replicate, control is transferred to 1304. Otherwise, in the event that there is not at least one more file included in the VM snapshot to replicate, control is transferred to 1318.

At 1318, an L2 VM snapshot object is generated and uploaded. Once all the files are uploaded to the bucket, an L2 VM snapshot object is uploaded as well.

Figure 14:
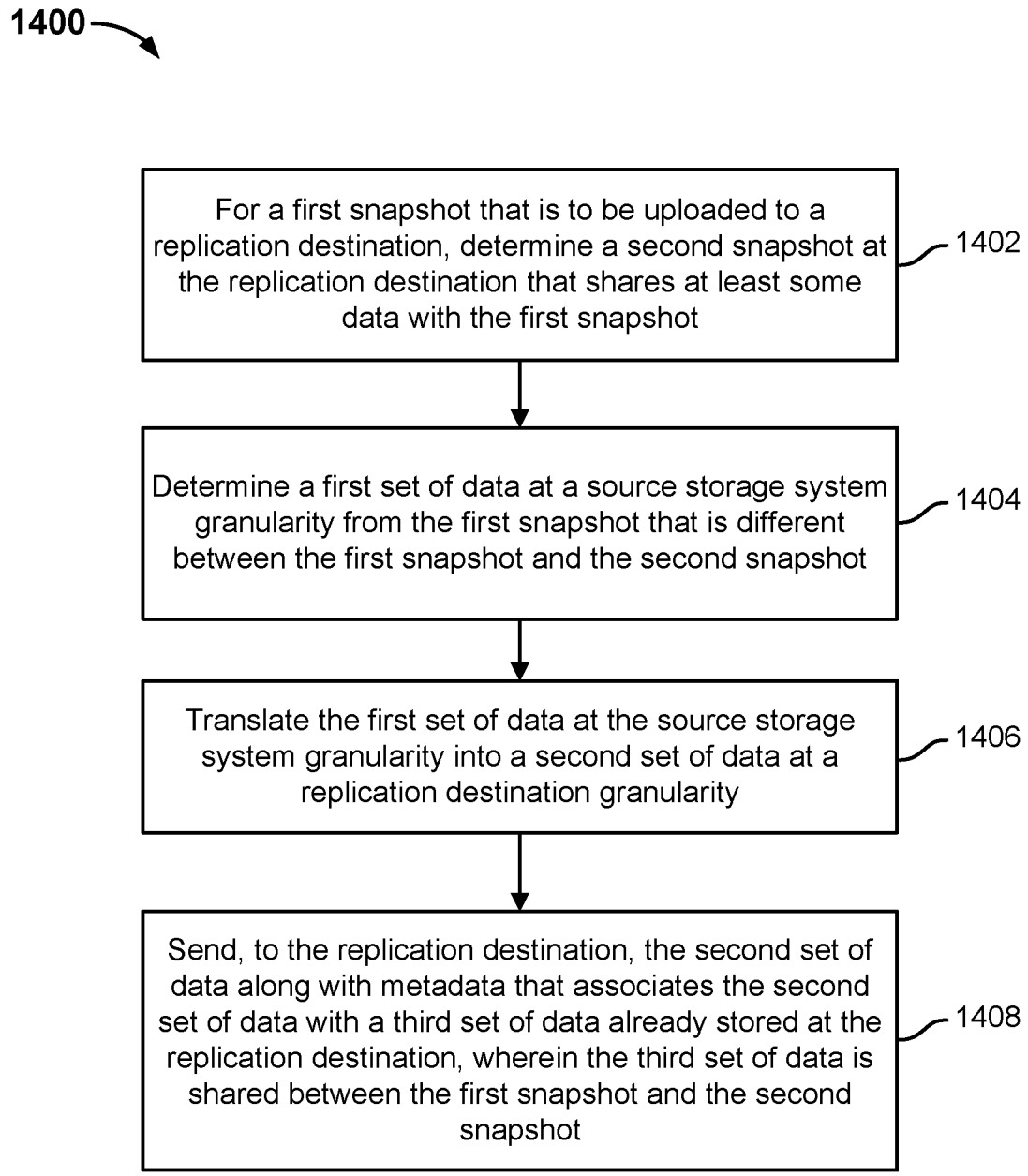
FIG. 14 is a flow diagram showing an embodiment process of determining a set of difference data between a snapshot to replicate to a replication destination and a base snapshot that already exists at the replication destination.

FIG. 14 is a flow diagram showing an embodiment process of determining a set of difference data between a snapshot to replicate to a replication destination and a base snapshot that already exists at the replication destination. In some embodiments, process 1400 is implemented at a storage system such as one of storage systems 104, 106, and 108 of FIG. 1.

Process 1400 describes an embodiment of a process of determining the set of difference data (e.g., dirty data in the snapshot to upload but not in the cloud base snapshot) between the snapshot to upload and the cloud base snapshot and uploading the set of difference data in the context in which the storage system and the replication destination store data at different granularities.

At 1402, for a first snapshot that is to be uploaded to a replication destination, a second snapshot at the replication destination that shares at least some data with the first snapshot is determined. In some embodiments, metadata stored by the storage system's file system that describes dependency relationships between snapshots in a chain of snapshots may be checked to determine the ancestor snapshots of the first snapshot (a snapshot to replicate). Then, other metadata stored by the storage system may be checked to determine whether any of the ancestor snapshots have already been replicated to the replication destination (e.g., bucket) and can therefore be available as a base snapshot (the "second snapshot") against which the data of the snapshot to replicate can be deduplicated during the uploading process.

At 1404, a first set of data at a source storage system granularity from the first snapshot that is different between the first snapshot and the second snapshot is determined. In various embodiments, a copy of the base snapshot is also maintained locally at the storage system (e.g., the base snapshot has not yet been deleted from the storage system). In various embodiments, each subsequently generated snapshot includes only new or modified data relative to its immediate ancestor snapshot. Put another way, the snapshots are stored as delta representations. As such, given that the snapshot to replicate is a descendent of the base snapshot and that a copy of the base snapshot is still present at the storage system (instead of the local copy of the base snapshot having been deleted from the storage system and its mappings merged into an immediate neighbor snapshot), each descendent snapshot of the base snapshot at the storage system up to and including the snapshot to replicate stores mappings/data that is presumably not already stored in the base snapshot. Therefore, to determine a set of difference data between the snapshot to replicate and the base snapshot comprises to find the newest (latest point-in-time) mapping to data stored at each offset across each descendent snapshot of the base snapshot up to and including the snapshot to replicate (because given the delta representation of the snapshots, any mapping that appears in a descendent snapshot is presumed to store different (i.e., new or modified) data relative to an ancestor snapshot).

At 1406, the first set of data at the source storage system is translated into a second set of data at a replication destination granularity. In various embodiments, data is stored at a first storage granularity at the storage system and stored at a second storage granularity at the replication destination. In some embodiments, data is stored at a smaller granularity (e.g., 8 KB) at the storage system, for example, because a smaller block size increases the likelihood of data sharing and storage deduplication at the storage system. In some embodiments, data is stored at a larger granularity (e.g., 1 MB) at the replication destination, for example, because a larger block size may reduce the number of operations performed at the replication destination and is therefore more efficient.

However, given the discrepancy between the storage system and replication destination storage granularities, the set of difference data determined between the snapshot to replicate and the base snapshot at the storage system in the storage system's storage granularity (e.g., 8 KB) needs to be translated into a set of difference data at the replication destination's storage granularity (e.g., 1 MB) before the set of difference data can be stored (e.g., via PUT API calls) at the replication destination. Translating a set of difference data from the storage system granularity to the replication destination storage granularity includes determining chunks of data at offset ranges/boundaries associated with the replication destination storage granularity that each includes determined difference data at the offset ranges/boundaries associated with the storage system granularity.

An example process of translating a set of difference data from a first storage granularity to a second storage granularity is described with FIG. 15, below.

At 1408, the second set of data is sent to the replication destination along with metadata that associates the second set of data with a third set of data already stored at the replication destination, wherein the third set of data is shared between the first snapshot and the second snapshot. In addition to uploading the set of difference data associated with the replication destination storage granularity to the replication destination as objects (e.g., L0 data chunk objects), metadata that associates the uploaded set of difference data with already existing replication destination objects that are shared between the snapshot to replicate and the base snapshot are also stored at objects (e.g., L1 chunk list objects) at the replication destination.

Figure 15:
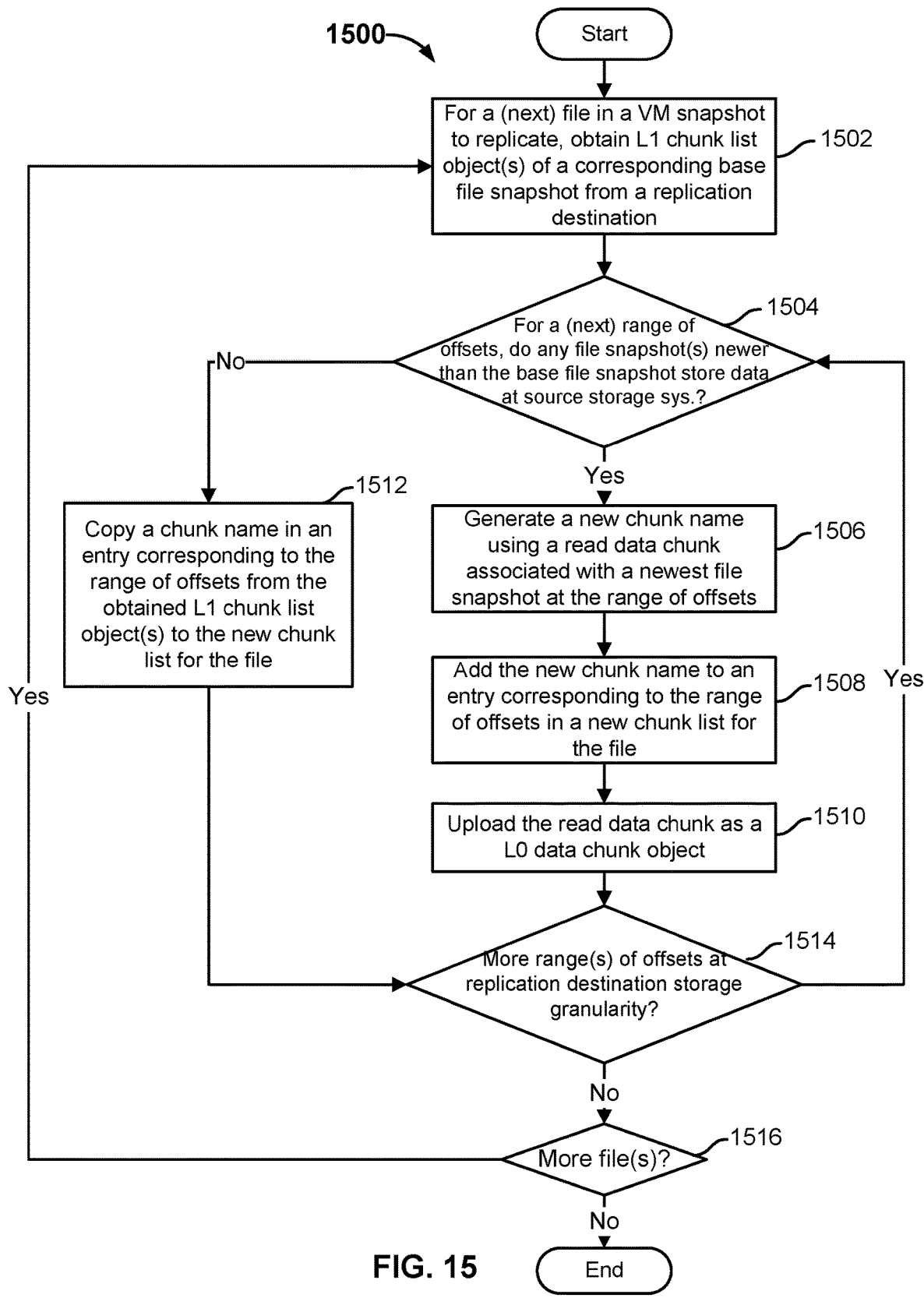
FIG. 15 is a flow diagram showing an example process of translating difference data between a snapshot to replicate and a base snapshot in a replication destination from a storage system granularity to a replication destination granularity.

FIG. 15 is a flow diagram showing an example process of translating difference data between a snapshot to replicate and a base snapshot in a replication destination from a storage system granularity to a replication destination granularity. In some embodiments, process 1500 is implemented at a storage system such as one of storage systems 104, 106, and 108 of FIG. 1. In some embodiments, steps 1404 and 1406 of process 1400 of FIG. 14 may be implemented using process 1500.

In various embodiments, deduplication is performed across snapshots of the same VM (or across a clone VM and the shared snapshot of the source VM from which it was created) and across the same offsets of the same file. Put another way, if data associated with the same offset of the same files were the same between a snapshot to replicate and its base snapshot in the cloud, then the data at that offset of the snapshot to replicate would not need to be re-uploaded to the replication destination. Instead, the chunk name of the data chunk at the offset would be copied for that offset to the new chunk list that is being generated for the file in the snapshot to replicate, as will be described in detail below.

In process 1500, a copy of the base snapshot is also maintained locally at the storage system (e.g., the base snapshot has not yet been deleted from the storage system). Furthermore, each subsequently generated snapshot includes only new or modified data relative to its immediate ancestor snapshot. Put another way, the snapshots are stored as delta representations. As such, given that the snapshot to replicate is a descendent of the base snapshot and that a copy of the base snapshot is still present at the storage system (instead of the local copy of the base snapshot having been deleted from the storage system and its mappings merged into an immediate neighbor snapshot), each descendent snapshot of the base snapshot at the storage system up to and including the snapshot to replicate stores mappings/data that is presumably not already stored in the base snapshot.

At 1502, for a (next) file in a VM snapshot to replicate, L1 chunk list object(s) of a corresponding base file snapshot are obtained from a replication destination. Each file of the base snapshot has one or more L1 chunk list objects in the bucket where each L1 chunk list object includes the chunk names at a predetermined (e.g., 12,000) number of offsets of the file. In various embodiments, a chunk name comprises at least a fingerprint (e.g., an SHA value) of a data chunk that is at a replication destination storage granularity (e.g., 1 MB).

At 1504, for a (next) range of offsets at a replication destination granularity, it is determined whether any file snapshot(s) newer than the base file snapshot store data at the source storage system. In the event that it is determined that no file snapshot(s) newer than the base file snapshot stores data the source storage system, control is transferred to 1512. Otherwise, in the event that it is determined that at least one file snapshot that is newer than the base file snapshot stores data the source storage system, control is transferred to 1506. Whereas the storage system may store data at a smaller granularity (e.g. 8 KB) than at which the replication destination stores data (e.g., 1 MB), it is checked whether any snapshot that is created after the point-in-time the base snapshot was up to and including the snapshot to replicate stores data at a range of offsets included in the file at the replication destination granularity (e.g., the range being 1 MB). Given the delta representations of the snapshots, if any such snapshots stores data in this range, then it indicates the corresponding (e.g., 1 MB) data chunk that had been stored for the base snapshot at the replication destination has been overwritten with new or modified data by a descendent snapshot. Otherwise, if none of such snapshots stores data in this range, then it indicates the corresponding (e.g., 1 MB) data chunk that had been stored for the base snapshot at the replication destination has not been overwritten with new or modified data by a descendent snapshot.

At 1506, a new chunk name is generated using a read data chunk associated with a newest file snapshot at the range of offsets. The newest descendent snapshot of the base snapshot up to and including the snapshot to replicate that stores data at this current (e.g., 1 MB) range of offsets is identified. While more than one descendent snapshot of the base snapshot may store data at this range of offsets, only the data at this range that is written to the most recently generated snapshot is read because such data overwrites data at the same range of offsets from any other snapshot that is created before it but after the base snapshot. The (e.g., 1 MB) data chunk read at this range of offsets from the newest snapshot (that is created no later than the snapshot to replicate) and used to generate the corresponding chunk name (e.g., the chunk name comprises at least of a fingerprint (e.g., SHA1) of the read data chunk).

At 1508, the new chunk name is added to an entry corresponding to the range of offsets in a new chunk list for the file. While not shown in process 1500, in some embodiments, the new chunk name is compared to the corresponding entry of the obtained L1 chunk list object to check whether the new chunk name matches the chunk name at the same range of offsets of the obtained L1 chunk list object and if the chunk names are in fact the same, then the read data chunk is not uploaded to the replication destination (i.e., step 1510 is skipped for this range of offsets). This scenario could happen if the data written to the base snapshot was overwritten more than once but ultimately with the same data chunk that had been stored for the base snapshot. Though not shown in process 1500, and as described above, the new chunk list generated for the file will be eventually uploaded as one or more L1 chunk list objects.

At 1510, the read data chunk is uploaded as an L0 data chunk object.

At 1514, it is determined whether there is at least one more range of offsets at the replication destination storage granularity. In the event that it is determined that there is at least one more range of offsets in the file snapshot of the VM snapshot to replicate at the replication destination storage granularity, control is transferred to 1504. Otherwise, in the event that it is determined that there is not at least one more range of offsets at the replication destination storage granularity, process 1500 ends. For example, it is determined that there is not at least one more range of offsets in the file snapshot of the VM snapshot to replicate if the read-limit of the file snapshot has been met.

At 1512, a chunk name in an entry corresponding to the range of offsets from the obtained L1 chunk list object(s) is copied to the new chunk list for the file. If none of the snapshots that are created after the point-in-time at which the base snapshot was created, up to and including the snapshot to replicate stores data at the current range of offsets, then it means that the corresponding data chunk of the base snapshot is not overwritten and may be shared with the snapshot to replicate at the replication destination. As such, no data chunk needs to be uploaded from the storage system for this range of offsets and instead, only the corresponding chunk name needs to be copied from the L1 chunk list of the file of the base snapshot to the new chunk list that is being generated for the file of the snapshot to replicate. Though not shown in process 1500, and as described above, the new chunk list generated for the file will be eventually uploaded as one or more L1 chunk list objects.

Figure 16:
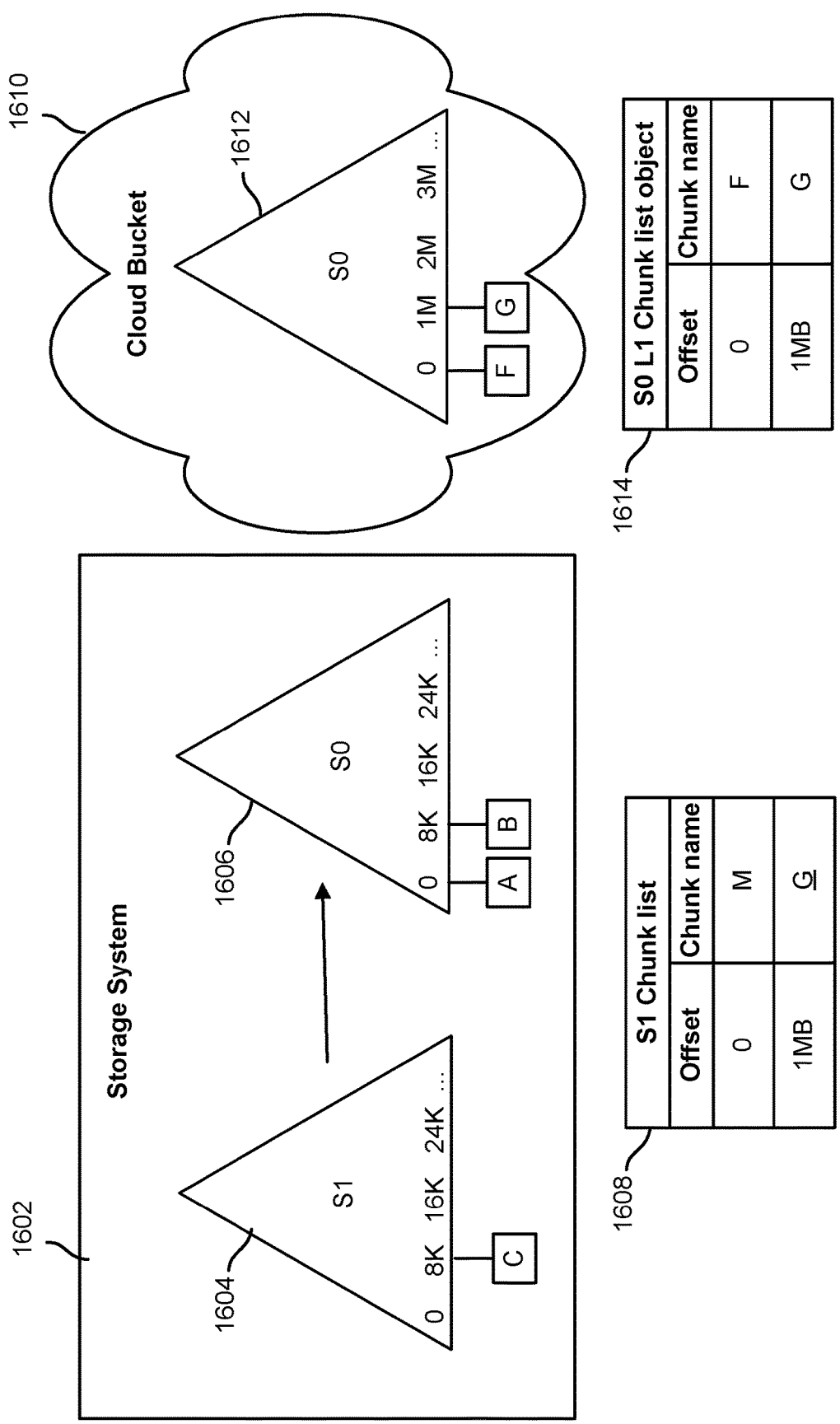
FIG. 16 is a diagram showing a first example of determining a set of difference data between a snapshot to replicate and a base snapshot at a storage system and also uploading the set of difference data to a replication destination as a part of replicating the snapshot.

FIG. 16 is a diagram showing a first example of determining a set of difference data between a snapshot to replicate and a base snapshot at a storage system and also uploading the set of difference data to a replication destination as a part of replicating the snapshot. Storage system 1602 stores snapshot S1 1604 and snapshot S0 1606, where snapshot S1 1604 depends directly from snapshot S0 1606. Put another way, snapshot S1 1604 is an immediate descendent of snapshot S0 1606, snapshot S1 1604 shares data with snapshot S0 1606, and stores only new or modified data that overwrites the data that is associated with snapshot S0 1606. Snapshot S 1604 and snapshot S0 1606 may be snapshots of the same file of the same VM at a later point-in-time and an earlier point-in-time, respectively. As shown in FIG. 16, storage system 1602 stores data at the granularity of 8 KB and as such each of snapshot S1 1604 and snapshot S0 1606 stores a mapping to a data value at each 8 KB offset (0, 8 KB, 16 KB, 24 KB, etc.). A copy of snapshot S0 1606 already exists at the replication destination, cloud bucket 1610 (e.g., because snapshot S0 1606 had been previously replicated from storage system 1602 to cloud bucket 1610). However, cloud bucket 1610 stores data at a larger granularity than storage system 1602. Cloud bucket 1610 stores data in 1 MB units. As such, the copy of snapshot S0 in cloud bucket 1610, snapshot S0 1612, stores data values at each 1 MB offset (0, 1 MB, 2 MB, 3 MB, etc.). A copy of snapshot S1 does not yet exist at cloud bucket 1610 and has been selected to replicate to cloud bucket 1610.

In initiating the replication of snapshot S1 1604 to cloud bucket 1610, according to various embodiments described herein, it is first determined (e.g., using metadata stored at storage system 1602) whether a snapshot from which snapshot S1 1604 depends already existed in cloud bucket 1610 and can therefore be used as a base snapshot against which to deduplicate the data of snapshot S1 1604. It is determined that snapshot S0 1612 that is already stored at cloud bucket 1610 can be used as such a base snapshot for snapshot S1 1604. Once it is determined that snapshot S0 1612 can be used as a base snapshot, L1 chunk list objects that associated with snapshot S0 1612 (e.g., L1 chunk list objects that include the snapshot ID of snapshot S0 1612) are downloaded from cloud bucket 1610 to storage system 1602. S0 L1 chunk list object 1614 is one of potentially multiple L1 chunk list objects associated with snapshot S0 1612 and shows the chunk name (e.g., a fingerprint such as an SHA1) of each 1 MB data chunk that is associated with snapshot S0 1612 at each corresponding 1 MB offset (0, 1 MB, etc.).

Whereas at storage system 1602, snapshot S0 1606 stores mappings to data at 8 KB offsets and snapshot S1 1604 stores mappings to new or modified data relative to snapshot S0 1606 also at 8 KB, snapshot S0 1612 in cloud bucket 1610 stored data at 1 MB offsets. As such, in deduplicating snapshot S1 1604 against snapshot S0 1612, the difference in data stored between snapshot S1 1604 of storage system 1602 needs to be considered at the 1 MB boundaries that are associated with the granularity/unit at which cloud bucket 1610 stores data. Given that snapshot S1 1604 and snapshot S0 1606 are stored as delta representations and are adjacent to each other in the same snapshot chain in the example of FIG. 16, any mappings that are stored by snapshot S1 1604 are known to be different relative to what is stored in snapshot S0 1606. Therefore, for each 1 MB range of offsets, it is determined whether any mappings are stored by the index (or other data structure) of snapshot S1 1604. If any mappings are stored by snapshot S1 1604 for a given 1 MB range of offsets, then data associated with snapshot S1 1604 are read at the physical storage medium at storage system 1602 based on the mappings stored at that 1 MB range of offsets, uploaded to cloud bucket 1610 as an L0 data chunk object, and a corresponding chunk name (e.g., fingerprint such as an SHA1) is computed from the read data. The computed chunk name is then added to S1 chunk list 1608, which will be uploaded to cloud bucket 1610 as one or more L1 chunk list objects, to the corresponding entry associated with that range of offsets. If no mappings are stored by snapshot S1 1604 for a given 1 MB range of offsets, then no data needs to be read from the physical storage medium at storage system 1602 for that 1 MB range of offsets or uploaded to cloud bucket 1610 and instead, a chunk name is copied from the entry associated with that range of offsets from S0 S1 chunk object 1614 that was downloaded from cloud bucket 1610. The copied chunk name is then added to S1 chunk list 1608 to the corresponding entry associated with that range of offsets. In the example of FIG. 16, snapshot S1 1604 did store one or more mappings at 8 KB offsets in the range of offsets from 0 to 1 MB and as such, a new chunk name, M, was computed based on the 1 MB data chunk that was read from snapshot S1 1604 at this range and added to S1 chunk list 1608 for the entry associated with offset 0 and furthermore, the data chunk associated with name M was uploaded to cloud bucket 1610 as a new L0 data chunk object. Also in the example of FIG. 16, snapshot S1 1604 did not store any mappings at 8 KB offsets in the range of offsets from 1 to 2 MB and as such the chunk name, G, was copied from S0 L1 chunk list object 1614's entry associated with offset 1 MB and added to S1 chunk list 1608 for the entry associated with offset 1 MB and moreover, no new data chunk is uploaded to cloud bucket 1610 for this range of offsets.

As shown with the example of FIG. 16, a base snapshot that exists at a replication destination can be leveraged in a snapshot replication process such that as a result of comparing only two snapshot indices stored at a storage system or differences in stored data, the amount of data chunks at the replication destination granularity that needs to be read and uploaded to the replication destination can be reduced.

Figure 17:
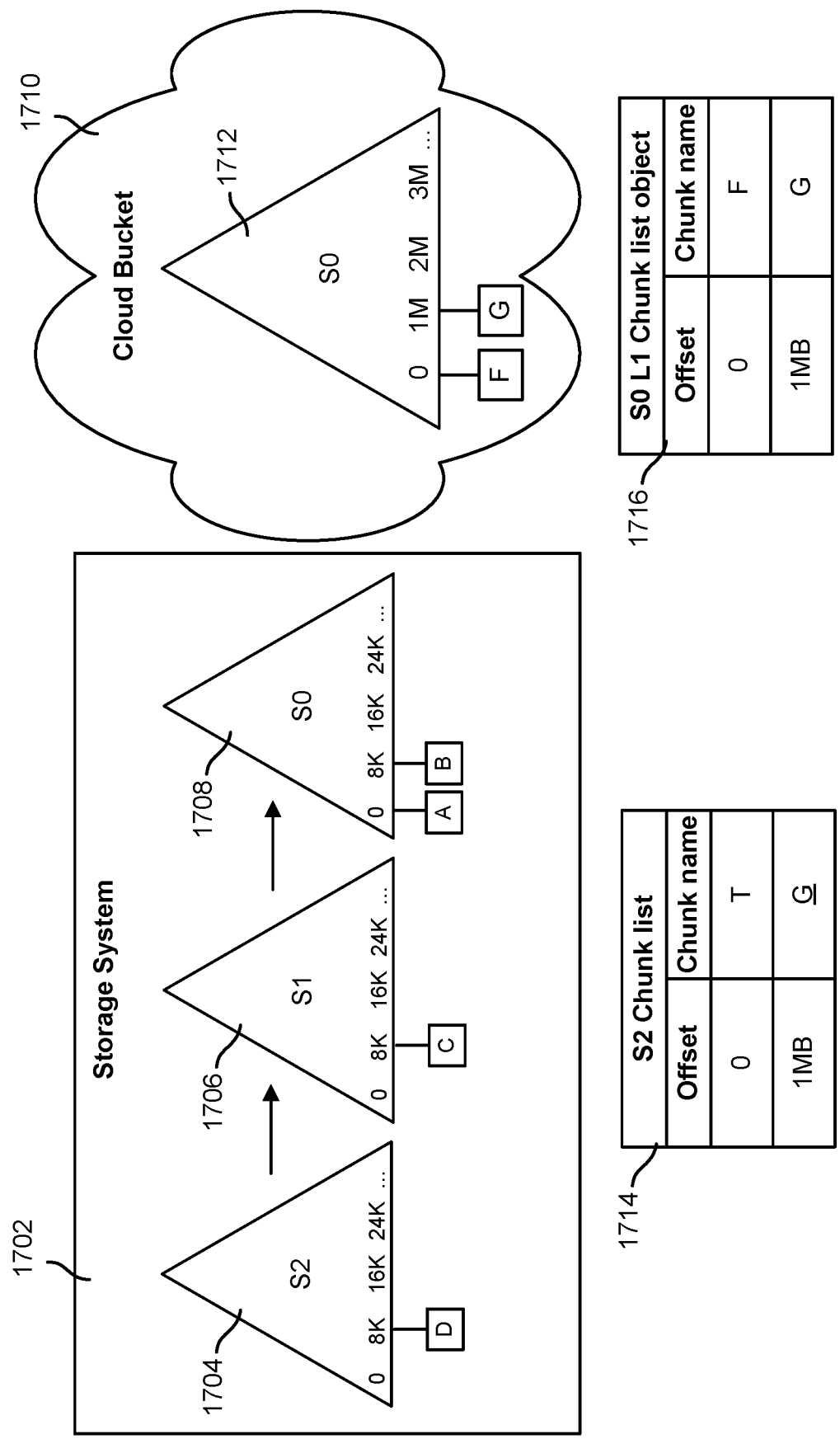
FIG. 17 is a diagram showing a second example of determining a set of difference data between a snapshot to replicate and a base snapshot at a storage system and also uploading the set of difference data to a replication destination as a part of replicating the snapshot.

FIG. 17 is a diagram showing a second example of determining a set of difference data between a snapshot to replicate and a base snapshot at a storage system and also uploading the set of difference data to a replication destination as a part of replicating the snapshot. Unlike the example of FIG. 16, the snapshot to replicate (snapshot S2 1704) and the copy of the base snapshot at the storage system (snapshot S0 1708) are not immediate neighbors but are rather separate by one intervening snapshot (snapshot S1 1706). Storage system 1702 stores snapshot S2 1704, snapshot S1 1706, and snapshot S0 1708, where snapshot S2 1704 depends from snapshot S1 1704, which in turn depends from snapshot S0 1708. Put another way, snapshot S2 1704 is a descendent of snapshot S0 1708 with intervening snapshot S1 1706, snapshot S2 1704 shares data with both snapshot S1 1706 and snapshot S0 1708, and each of snapshot S2 1704 and snapshot S1 1706 stores only new or modified data that overwrites the data that is associated with its immediate ancestor snapshot (snapshot S1 1706 and snapshot S0 1708, respectively). Snapshot S2 1704, snapshot S1 1706, and snapshot S0 1708 may be snapshots of the same file of the same VM at three different points-in-time in reverse chronological order, respectively. As shown in FIG. 17, storage system 1702 stores data at the granularity of 8 KB and as such each of snapshot S2 1704, snapshot S1 1706, and snapshot S0 1708 stores a mapping to a data value at each 8 KB offset (0, 8 KB, 16 KB, 24 KB, etc.). A copy of snapshot S0 1708 already exists at the replication destination, cloud bucket 1710 (e.g., because snapshot S0 1708 had been previously replicated from storage system 1702 to cloud bucket 1710). However, cloud bucket 1710 stores data at a larger granularity than storage system 1602. Cloud bucket 1710 stores data in 1 MB units. As such, the copy of snapshot S0 in cloud bucket 1710, snapshot S0 1712 stores data values at each 1 MB offset (0, 1 MB, 2 MB, 3 MB, etc.). A copy of snapshot S2 does not yet exists at cloud bucket 1610 and has been selected to replicate to cloud bucket 1710.

In initiating the replication of snapshot S2 1704 to cloud bucket 1710, according to various embodiments described herein, it is first determined (e.g., using metadata stored at storage system 1702) whether a snapshot from which snapshot S2 1704 depends already existed in cloud bucket 1710 and can therefore be used as a base snapshot against which to deduplicate the data of snapshot S2 1704. It is determined that snapshot S0 1712 that is already stored at cloud bucket 1710 can be used as such a base snapshot for snapshot S2 1704. Once it is determined that snapshot S0 1712 can be used as a base snapshot, L1 chunk list objects that associated with snapshot S0 1712 (e.g., L1 chunk list objects that include the snapshot ID of snapshot S0 1712) are downloaded from cloud bucket 1710 to storage system 1702. S0 L1 chunk list object 1716 is one of potentially multiple L1 chunk list objects associated with snapshot S0 1712 and shows the chunk name (e.g., a fingerprint such as an SHA1) of each 1 MB data chunk that is associated with snapshot S0 1712 at each corresponding 1 MB offset (0, 1 MB, etc.).

Whereas at storage system 1702, snapshot S0 1706 stores mappings to data at 8 KB offsets and snapshot S2 1704 stores mappings to new or modified data relative to snapshot S1 1706 also at 8 KB, snapshot S0 1712 in cloud bucket 1710 stored data at 1 MB offsets. As such, in deduplicating snapshot S2 1704 against snapshot S0 1712, the difference in data stored between snapshot S1 1704 of storage system 1702 needs to be considered at the 1 MB boundaries that are associated with the granularity/unit at which cloud bucket 1710 stores data. Given that snapshot S2 1704, snapshot S1 1706, and snapshot S0 1708 are stored as delta representations and are adjacent to each other in the same snapshot chain in the example of FIG. 17, any mappings that are stored by either snapshot S2 1704 or snapshot S1 1706 are presumed to be different relative to what is stored in snapshot S0 1708. Therefore, for each 1 MB range of offsets, it is determined whether any mappings are stored by the index (or other data structure) of either of snapshot S2 1704 and snapshot S1 1706. If any mappings are stored by either of snapshot S2 1704 and snapshot S1 1706 for a given 1 MB range of offsets, then the data that was most recently written to that 1 MB range of offsets between snapshot S2 1704 and snapshot S 1706 is read at the physical storage medium at storage system 1702 based on the stored mappings and uploaded to cloud bucket 1710 as an L0 data chunk object, and a corresponding chunk name (e.g., fingerprint such as an SHA1) is computed from the read data. Put another way, if both snapshot S2 1704 and snapshot S1 1706 stored data at the same 1 MB range of offsets, then the data written to that range of snapshot S2 1704 would be uploaded and used to compute a chunk name because it overwrites the data written to the same range of snapshot S1 1706. The computed chunk name is then added to S1 chunk list 1708, which will be uploaded to cloud bucket 1710 as one or more L1 chunk list objects, to the corresponding entry associated with that range of offsets. If no mappings are stored by either snapshot S2 1704 and snapshot S 1706 for a given 1 MB range of offsets, then no data needs to be read from the physical storage medium at storage system 1702 for that 1 MB range of offsets or uploaded to cloud bucket 1710 and instead, a chunk name is copied from the entry associated with that range of offsets from S0 S1 chunk object 1716 that was downloaded from cloud bucket 1710. The copied chunk name is then added to S1 chunk list 1714 to the corresponding entry associated with that range of offsets. In the example of FIG. 17, both snapshot S2 1704 and snapshot S1 1706 did store one or more mappings at 8 KB offsets in the range of offsets from 0 to 1 MB and as such, a new chunk name, T, was computed based on the 1 MB data chunk that was read from snapshot S2 1706 (because it was the most recently written data) at this range and added to S1 chunk list 1714 for the entry associated with offset 0 and furthermore, the data chunk associated with name T was uploaded to cloud bucket 1610 as a new L0 data chunk object. Also in the example of FIG. 17, neither snapshot S2 1704 nor snapshot S1 1706 stored any mappings at 8 KB offsets in the range of offsets from 1 to 2 MB and as such the chunk name, G, was copied from S0 L1 chunk list object 1716's entry associated with offset 1 MB and added to S1 chunk list 1714 for the entry associated with offset 1 MB and moreover, no new data chunk is uploaded to cloud bucket 1710 for this range of offsets.

As shown with the example of FIG. 17, a base snapshot that exists at a replication destination can be leveraged in a snapshot replication process such that as a result of comparing only multiple snapshot indices stored at a storage system for differences in stored data, the amount of data chunks at the replication destination granularity that need to be read and uploaded to the replication destination can be reduced.

Figure 18:
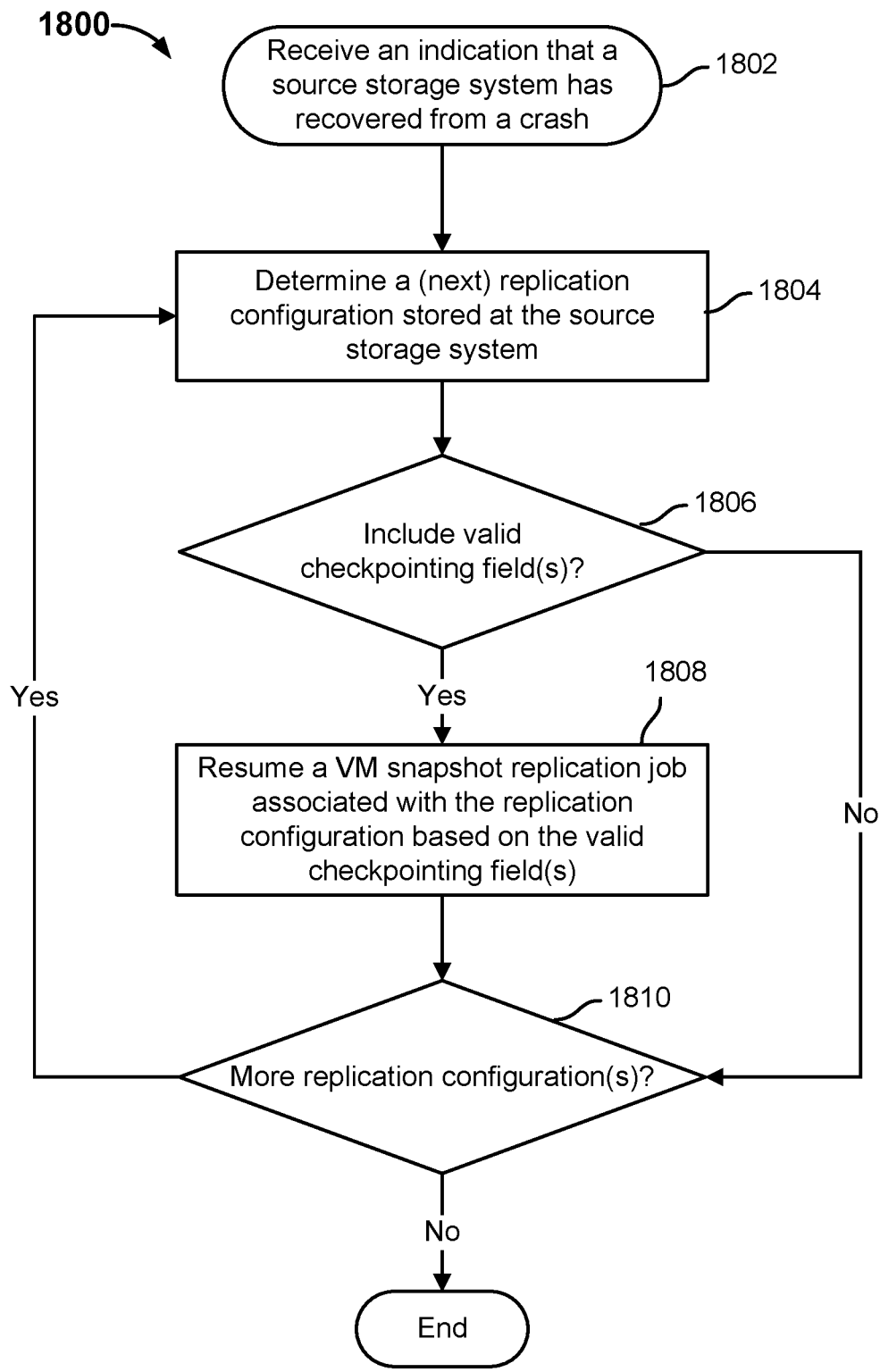
FIG. 18 is a flow diagram showing an embodiment process of resuming a replication of a snapshot to a replication destination after a recovery of a storage system.

FIG. 18 is a flow diagram showing an embodiment process of resuming a replication of a snapshot to a replication destination after a recovery of a storage system. In some embodiments, process 1800 is implemented at a storage system such as one of storage systems 104, 106, and 108 of FIG. 1.

Process 1800 describes an embodiment process of resuming a replication of a snapshot to a replication destination after a storage system recovers from a crash event. For example, process 1800 may be performed in the background by a thread that periodically scans for snapshot replication jobs that were interrupted by a storage system prior to completion.

While a snapshot replication job is in-progress, in some embodiments, metadata is uploaded to the cloud in the following order:
 1. Upload the job object (e.g., L3 jobID object) before replication starts.
 2. Upload all the data chunks (e.g., L0 data chunk objects) in the sub list of a file.
 3. Upload the sub list metadata (e.g., L1 chunk list objects).
 4. After all sub lists are done, upload the file object with attributes, permissions, etc. (e.g., L1 file snapshot object).
 5. After all files are done, upload the top VM level object (e.g., L2 VM snapshot object).

In the event of a crash, it is possible that at least some combination of the above has already completed. Since, in various embodiments, all object names are unique for a given snapshot file combination, simple GET calls may be performed on the cloud to check which objects have already been uploaded to bring the system back to where it was. The highest granularity with this approach is one sub list worth of data as the crash might have occurred in the middle of a sub list upload. In some embodiments, metadata can be stored locally to point to which sub list was last uploaded to save GET requests. Since objects cannot be caused to be overwritten on the cloud, a GET is to be made for every chunk of the first sub list that was uploaded after crashing.

In some embodiments, the following checkpointing fields are stored in each replication configuration at a storage system and are dynamically updated during the execution a VM snapshot replication job for that replication configuration:
 1. The ID of the snapshot in-progress snapshot.
 2. The current file that is in-progress.
 3. The current offset that is in-progress.
 4. Last completed sub list that was uploaded.
 5. Last sub list that was used from the base snapshot.

In various embodiments, files, offsets, and sub list IDs within files are uploaded in a deterministic way (i.e., the same order each time) so that replication of a snapshot may continue from the checkpointed information. Because the ID (e.g., sublistID) of each sub list that is uploaded to the replication destination is checkpointed, the job may be resumed at the granularity of the current sub list that is to be uploaded. In some embodiments, once the job has completed, then all the checkpointing fields are invalidated. Therefore, as will be described below, as a (e.g., background) thread checks replication configurations for unfinished snapshot replication jobs upon recovery of the storage system, those replication configurations with valid checkpointing fields indicates that the replication configuration has an incomplete/interrupted VM snapshot replication job that needs to be requeued for completion.

At 1802, an indication that a source system has recovered from a crash is received.

At 1804, a (next) replication configuration stored at the source storage system is determined. As described above, in various embodiments, a replication configuration is stored for each VM that is to replicate snapshots to a particular replication destination (e.g., a bucket at a cloud object store).

At 1806, it is determined whether the replication configuration includes any valid checkpointing fields. In the event that the replication configuration includes at least one valid checkpointing field, control is transferred to 1808. Otherwise, in the event that the replication configuration does not include at least one valid checkpointing field, control is transferred to 1810. If any of the checkpointing fields (e.g., a ID of the snapshot in-progress snapshot, the current file that is in-progress, the current offset that is in-progress, the last completed sub list that was uploaded, and the last sub list that was used from the base snapshot) is valid, then it means that the replication configuration is associated with a VM snapshot replication job that is incomplete (e.g., because it was interrupted by the crash event).

At 1808, a VM snapshot replication job associated with the replication configuration is resumed based on the valid checkpointing field(s). For example, based on the valid checkpointing fields, the next sub list and its new data chunks of the file snapshot can be uploaded.

At 1810, it is determined whether there is at least one more replication configuration at the source storage system to check. In the event that there is at least one more replication configuration at the source storage system to check, control is returned to 1804. Otherwise, in the event that there is at least one more replication configuration at the source storage system to check, process 1800 ends.

Figure 19:
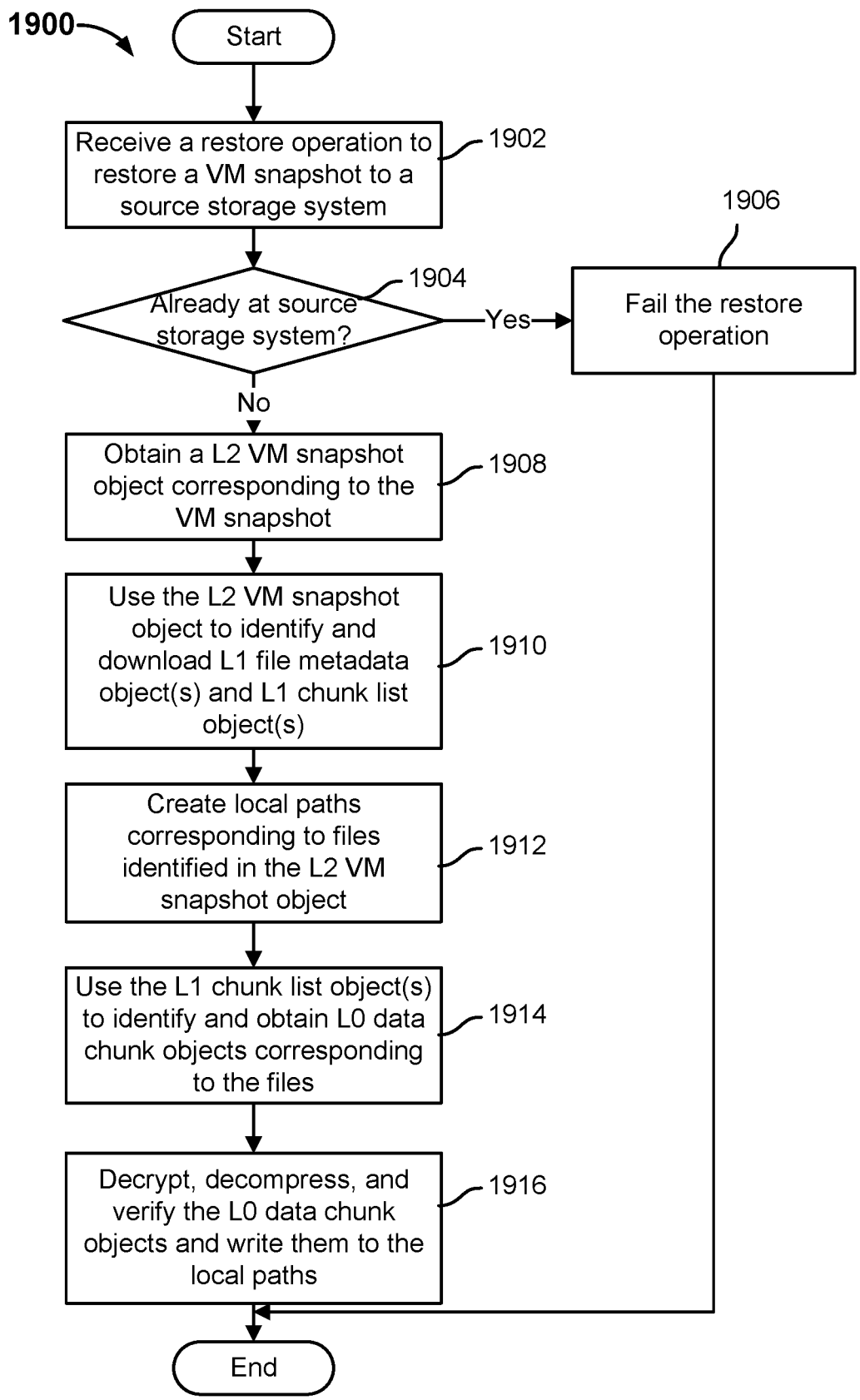
FIG. 19 is a flow diagram showing an embodiment process of performing a restore operation of a replicated VM snapshot.

FIG. 19 is a flow diagram showing an embodiment process of performing a restore operation of a replicated VM snapshot. In some embodiments, process 1900 is implemented at a storage system such as one of storage systems 104, 106, and 108 of FIG. 1.

Process 1900 is an example process of a restoring a VM snapshot that is stored at a replication destination to a storage system. Process 1900 may be performed by any storage system and not just the storage system that had originally replicated the snapshot to that replication destination. As will be described below, in various embodiments, each snapshot is restored as a fully collapsed snapshot. This simplification allows backup and restore to be performed in any order. A snapshot is restored by creating local files to which the file snapshot data will be written.

At 1902, a restore operation to restore a VM snapshot to a source storage system is received. In some embodiments, the restore operation includes the VM ID of the VM with which the snapshot to restore is associated. In some embodiments, the VM ID included in the restore operation is the same VM ID of the VM with which the snapshot that was originally replicated to the cloud was associated. The restore operation includes the snapshot global ID of the snapshot. In some embodiments, the restore operation is issued by a user or a computer program.

At 1904, it is determined whether a copy of the VM snapshot already exists at the source storage system. In the event that a copy of the VM snapshot already exists at the source storage system, control is transferred to 1906, in which the restore operation is failed and process 1900 ends. Otherwise, in the event that a copy of the VM snapshot does not already at the source storage system, control is transferred to 1908. The storage system is first checked for the snapshot to be restored. If the snapshot already exists locally at the storage system, then the restore operation is failed (e.g., because there is no need to download a VM snapshot of which a copy already exists at the storage system).

At 1908, an L2 VM snapshot object corresponding to the VM snapshot is obtained from a replication destination. The L2 VM snapshot object is obtained from the replication destination (e.g., cloud object store) by issuing a GET call that includes the snapshot global ID that was included in the restore operation.

At 1910, the L2 VM snapshot object is used to identify and download L1 file metadata object(s) and L1 chunk list object(s). As described above, in some embodiments, the L2 VM snapshot object includes at least VM-attributes and the file IDs (fileGlobalIDs) of all the files that are included in the VM snapshot and as such, the file IDs are used to obtain (e.g., using GET requests) the L1 objects related to the files from the cloud object store using the file IDs. As described above, in some embodiments, each L1 file metadata object includes at least file-level attributes for a corresponding file. As described above, in some embodiments, each L1 chunk list object includes at least a portion of the offsets (at the cloud object store's granularity, e.g., 1 MB) and corresponding data chunk names of data chunks at the respective offsets. As mentioned above, if there are multiple chunk lists for a particular file, they are referred to as sub lists.

At 1912, local paths corresponding to files identified in the L2 VM snapshot object are created. In some embodiments, a corresponding path (e.g., to the appropriate directory of the file system) is created for each file that is identified to be included in the VM snapshot that is being restored.

At 1914, the L1 chunk list object(s) are used to identify and obtain L0 data chunk objects corresponding to the files. The data chunk names that are identified in the one or more sub lists are used to obtain (e.g., using GET requests) the L0 data chunk objects of data chunks that are included in each file.

At 1916, the L0 data chunk objects are decrypted, decompressed, and verified and written to the local paths. The data chunks are processed at the storage system and written to the respective local paths of the files to which they belong.

In some embodiments, when the files are done populating, an API call (e.g., createSnapshotMetadataUpdate) is used to create the snapshot locally. In some embodiments, the snapshot checksums are compared to verify data integrity. In some embodiment, the internal files are cleaned up after process 1900 is completed.

In various embodiments, each restore job can be associated with a temporary (e.g., one shot replication configuration). The temporary replication configuration which will be deleted after the job is completed. As apart of the call to restore a snapshot, the temporary configuration can be created on the source storage system and a replId can be returned which can be used by a program at the storage system to query statistics and status of the job. Once the filesystem finishes restoring the given snapshot, the temporary replication configuration may be garbage collected. These temporary configurations provide away to remember a restore job persistently.

The snapshotId to be replicated/restored can be stored along with other required metadata as a part of the replication configuration. A background scanner thread can go over replication configurations and keep re-enqueuing restore or replication jobs which have not successfully completed.

Since a restore operation is a read-only operation, in some embodiments, there is no need to obtain a deletion hold on the snapshot being restored. Also, since replication is permitted from any storage system and restore to any other storage system, a central entity is needed for locking to be possible. When a restore operation begins, it checks to see if the snapshot being restored has a deletion marker on the cloud object store in which case the operation is failed. There might be a race in checking this and in some embodiments, a garbage collection is permitted to proceed in parallel with the restore operation. If a GET for any L0 object fails at any time because it was garbage collected on the cloud, the restore operation is failed.

In various embodiments, statistics about snapshots at one or more replication destinations are maintained and optionally, presented at a user interface. The following are examples of different space statistics that are shown (e.g., at a user interface) for cloud snapshots:

Logical Delta Size/logicalWrittenSize

This indicates the amount of logical space taken by chunks in the delta of the snapshot, i.e., chunks that were added newly or overwrote existing data present in older snapshots. This is computed as:

logicalWrittenSize=number of chunks in delta*chunk size used for replication.

Logical Full Size/logicalMappedWrittenSize

This indicates the total logical space taken by the snapshot, i.e., it includes data borrowed from older snapshots. This is computed as:

logicalMappedWrittenSize=total number of chunks in the snapshot*chunk size used for replication This also gives the user a maximum bound on the amount of data that will be downloaded on restore of the cloud snapshot.

Changed MB/physicalWrittenSize physicalWrittenSize of the cloud snapshot is computed as the sum of the compressed sizes of all the chunks present in the delta. It gives a rough estimate of the amount of data sent during backup over the network.

Aggregate Statistics

In some embodiments, statistics will be maintained on a per replication configuration basis and, for reporting purposes, aggregated on a per-VM basis and on a per-Destination basis.

The following are some of the statistics to be maintained:

Logical Bytes Replicated number of logical chunks replicated*CHUNK_SIZE. This can be used for showing logical throughput at the VM/destination level.

Physical Bytes Replicated

Amount of actual bytes sent over the network. This is estimated post deduplication and post compression and includes metadata. This can be used for showing the physical throughput at the VM/destination level.

Logical Bytes Remaining

The amount of logical bytes remaining to be replicated, computed as the sum of the logical written sizes of the unreplicated snapshots.

In some embodiments, most of the filesystem components of the cloud replication techniques will be backend object store protocol agnostic. They will use a set of common API's to interact with the object store backend. The common API will be implemented in a single library, in some embodiments. There will be a backend plug-in for each object store protocol, e.g., S3, Azure, Google cloud etc., that will translate the common API to the object store specific API. This enables the incremental support of newer object stores without needing to change the existing replication techniques. It enables testing and maintenance of the rest of the replication techniques using a common framework.

Embodiments of efficiently restoring a snapshot to a storage system from an object store are described herein. Techniques for finding data, which is associated with a snapshot that is to be restored to a storage system from an object store, that is already present locally on the storage system is described in various embodiments. Various embodiments described herein perform the restore operation by reading the found data locally to avoid downloading such data from the object store, resulting in a faster restore process and reduced costs associated with performing operations at the object store.

In some embodiments, an indication to restore a first snapshot from a replication destination is received at a storage system. For example, the replication destination comprises an object store. In response to the indication, a second snapshot that is related to the first snapshot is identified, where a copy of the second snapshot is stored at the storage system. A subset of data that the first snapshot shares with the second snapshot is determined. The first snapshot is restored to the storage system including by obtaining the subset of data from the copy of the second snapshot at the storage system.

In some embodiments, a deduplication table is stored at the storage system. The deduplication table includes at least signatures corresponding to data that is stored at the storage system. A signature in the deduplication table corresponds to a unit of data at the granularity at which data is stored at the replication destination (e.g., an object store), which is different from the granularity at which data is stored at the storage system. For example, the granularity at which data is stored at the replication destination (e.g., 1 MB) is larger than the granularity at which data is stored at the storage system (e.g., 8 KB). In response to the indication to restore a snapshot from a replication destination, a set of signatures associated with objects associated with the snapshot are obtained from the replication destination. The set of signatures is compared to the deduplication table to determine at least a subset of data from that snapshot that is available at the storage system. The snapshot is restored to the storage system including by obtaining the at least subset of data from the storage system.

As will be described in further detail below, if data that is needed to restore a snapshot from a replication destination (e.g., an object store) is already present in the storage system, then there is no need to download such data from the object store. Instead, such data can be read from the storage system local media (e.g., flash or hard-disk) and written to the snapshot file locally. There are many benefits of performing this optimization of finding local data to complete a restore operation of a snapshot that is stored at an object store. In one aspect, it saves network bandwidth for downloading data from an object store. Saved bandwidth can be used for other operations to the object store. Reading data locally from the storage system is an order of magnitude faster than downloading the same data from an object store over a reliable network connection, which reduces time needed to restore the snapshot. If data is downloaded over unreliable network connections, the time savings increases even more. In another aspect, there are cost savings for an end user. Public cloud providers typically charge per request, and the cost of download requests is highest compared to any other operations supported by an object store. In yet another aspect, the network cost associated with downloading data from the object store is also reduced because of this optimization.

A straight forward way of restoring all the data is downloading all the references in the file snapshot metadata of the snapshot being restored from the object store to the storage system, such as the process described in FIG. 19, above. However, in various embodiments, data that is already present on the storage system can be found so that the same data is not downloaded from an object store during the restore operation.

In a first set of techniques of performing an efficient restore of a snapshot from a replication destination (e.g., object store) to a storage system, an index, such as a deduplication table maintained at the storage system, is not used. Instead, metadata associated with the snapshot to restore is downloaded from the object store to determine if another one or more snapshots to which the snapshot to restore relates are present at the storage system. Then, the restore operation proceeds to find common data between the related snapshot(s) and the snapshot to restore using the downloaded metadata. The restore operation is then performed by locally reading the common data from the storage system and downloading the remaining unique data of the snapshot from the object store. The first set of techniques is described in further detail in FIGS. 20 through 23, below.

Figure 20:
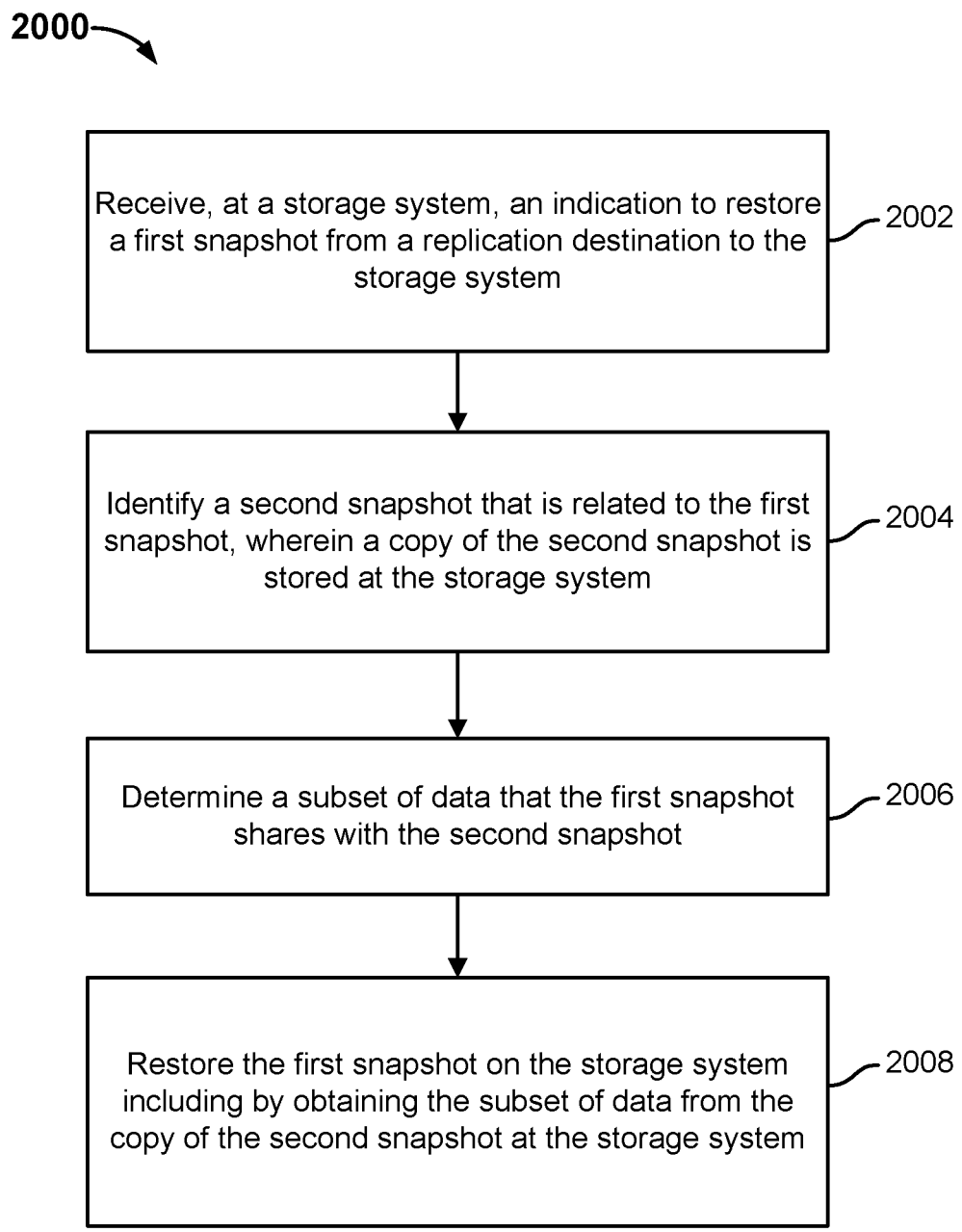
FIG. 20 is a flow diagram showing an embodiment of a process for performing efficient restore of a snapshot to a storage system.

FIG. 20 is a flow diagram showing an embodiment of a process for performing efficient restore of a snapshot to a storage system. In some embodiments, process 2000 is implemented at a storage system such as one of storage systems 104, 106, and 108 of FIG. 1.

At 2002, an indication to restore a first snapshot from a replication destination to the storage system is received at the storage system. In some embodiments, the replication destination is an object store. The first snapshot is currently stored at the object store. In various embodiments, to restore the first snapshot to the storage system comprises to create a local copy of the first snapshot at the storage system. In some embodiments, the storage system that had received the indication to restore the first snapshot had originally been the storage system from which the first snapshot was replicated/uploaded to the object store. In some embodiments, the storage system that had received the indication to restore the first snapshot had not originally been the storage system from which the first snapshot was replicated/uploaded to the object store.

At 2004, a second snapshot that is related to the first snapshot is identified, wherein a copy of the second snapshot is stored at the storage system.

During the restore operation, snapshot metadata associated with the first snapshot can be obtained. In some embodiments, metadata associated with the first snapshot may be obtained from the object store at which the data of the first snapshot is stored. In some embodiments, the downloaded metadata may include the L2 VM snapshot object associated with the first snapshot. The L2 VM snapshot object associated with the first snapshot, in some embodiments, identifies a VM ID and a snapshot global ID associated with a base snapshot, if any, against the first snapshot that was deduplicated when it was replicated/uploaded to the object store. For example, the metadata includes information like an associated VM name, VM ID, globally unique snapshot identifier, etc. Using these fields in the metadata, at least one related snapshot could be found in the storage system. For example, as will be described in FIG. 21, below, the at least one related snapshot could be the base snapshot against which only the new data of the first snapshot was sent to be stored/replicated at the object store. In another example, also as will be described in FIG. 21, if a base snapshot is not available locally at the storage system, the at least one related snapshot could be a younger snapshot and an older snapshot (that is not the base snapshot) relative to the first snapshot (i.e., the first snapshot is in the same snapshot chain as the younger snapshot and the older snapshot). Once the at least one related snapshot is found, the at least one related snapshot could include data that is common to the snapshot being restored, and hence data download from the object store can be avoided for this common data.

As mentioned above, a snapshot contains data trapped in virtual machine files at a point in time. If any two snapshots of the same VM are compared, the amount of delta between them depends on a change rate of the client writing to the VM and time difference between two snapshots. If it is assumed that the change rate of all clients writing to all VMs in the storage system is substantially constant or small, then the delta between two snapshots is directly proportional to the time difference between the snapshots of the same VM. Moreover, the time difference is the delta between those snapshots of the same VM and vice versa. During the restore operation, when finding local snapshots related to the snapshot being restored, in some embodiments, a local related snapshot that is identified is determined to be close in creation time as compared to the snapshot being restored. This way, the delta between the snapshot being restored and the local related snapshot will be reduced, and more data can be read locally instead of downloading from the object store.

Once the at least one related snapshot is found, what data can be read locally versus needs to be downloaded from the object store is identified.

At 2006, a subset of data that the first snapshot shares with the second snapshot is determined. In various embodiments, to determine the difference between the first snapshot (the snapshot being restored) and the at least one related snapshot, additional metadata associated with the first snapshot is determined. In various embodiments, the L1 chunk list object(s) associated with the first snapshot are downloaded from the object store. The L1 chunk list objects associated with the first snapshot are analyzed to determine which, if any, data (e.g., blocks at the granularity associated with the object store) is shared/common between the first snapshot and at least one of the related snapshots. Examples of using the L1 chunk list objects associated with the first snapshot to determine which units of data at the object store granularity that the first snapshot shares with a related snapshot are described with respect to FIG. 21, below.

At 2008, the first snapshot is restored to the storage system including by obtaining the subset of data from the copy of the second snapshot at the storage system. Data (e.g., blocks at the granularity associated with the object store) that was identified to be shared/common between the first snapshot and at least one of the related snapshots is read locally from the storage system and written into a restored copy of the first snapshot at the storage system. The remaining, unique data of the first snapshot is downloaded from the object store and then written into the restored copy of the first snapshot at the storage system to complete the restore operation of the first snapshot.

In summary, in process 2000, at least one related (e.g., older) snapshot relative to the snapshot being restored is determined at the storage system. These determined related snapshot(s) are used to determine data that they share with the snapshot being restored. This shared data is considered as data of the snapshot being restored that has not changed locally. The remaining portion of the snapshot being restored is therefore considered to have locally changed and thus, at units of data associated with the object store granularity, this changed data is downloaded from the object store to restore the snapshot that is being restored in the storage system. In this way, changed data between snapshots is determined using a chain of related descendant snapshots.

Figure 21:
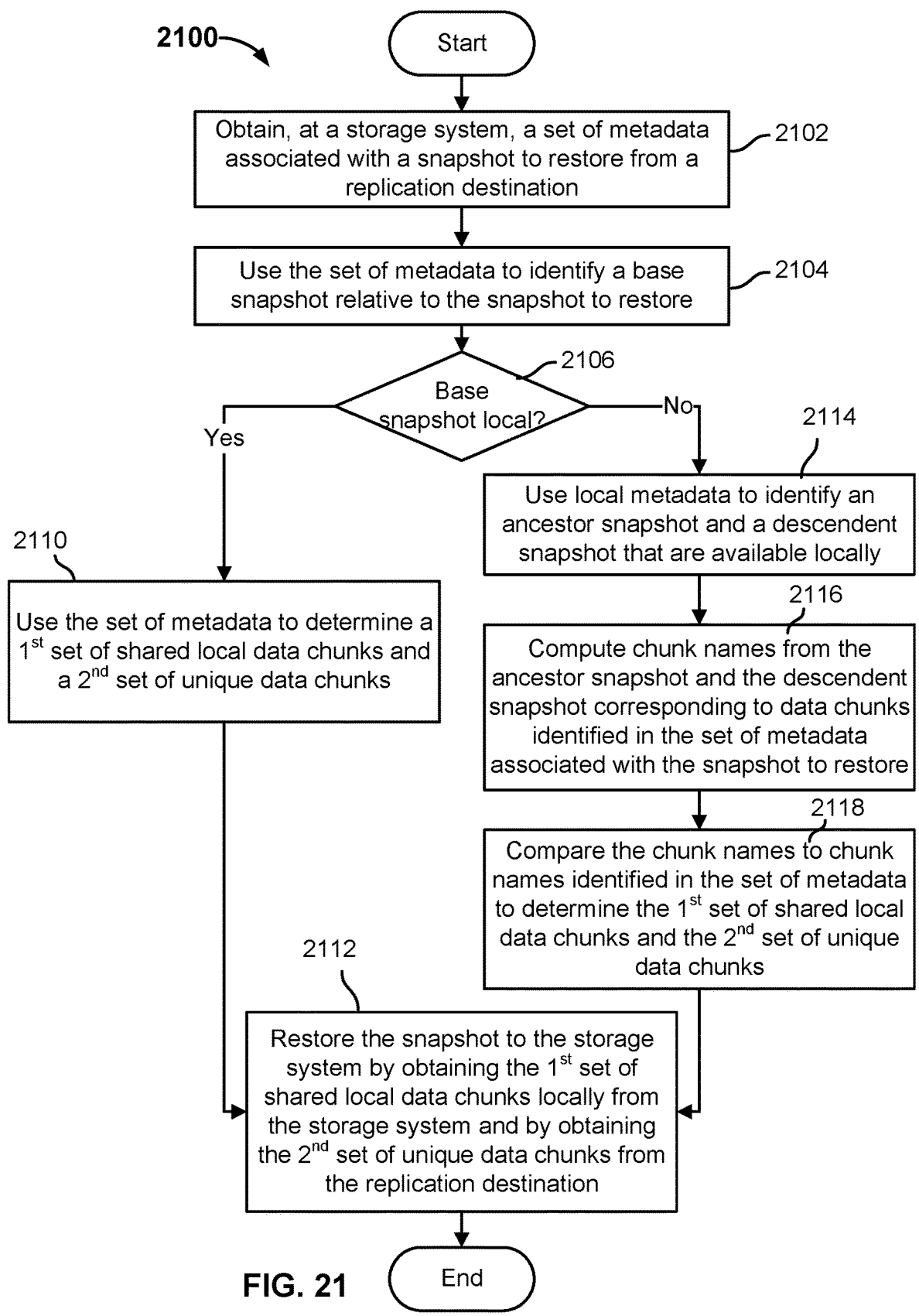
FIG. 21 is a flow diagram showing an example of a process for performing an efficient restore of a snapshot to a storage system.

FIG. 21 is a flow diagram showing an example of a process for performing an efficient restore of a snapshot to a storage system. In some embodiments, process 2100 is implemented at a storage system such as one of storage systems 104, 106, and 108 of FIG. 1. In some embodiments, process 2000 of FIG. 20 may be implemented, at least in part, by process 2100.

At 2102, a set of metadata associated with a snapshot to restore is obtained at a storage system from the replication destination. In various embodiments, the replication destination comprises an object store. In some embodiments, the set of metadata associated with the snapshot being restored that is downloaded from the object store includes an L2 VM snapshot object. The L2 VM snapshot object is obtained from the replication destination (e.g., cloud object store) by issuing a GET call that includes the snapshot global ID that was included in the restore operation. Among other things, the L2 VM snapshot object includes at least VM-attributes and the file IDs (fileGlobalIDs) of all the files that are included in the VM snapshot. As such, the file IDs are used to obtain (e.g., using GET requests) the L1 objects related to the files from the cloud object store using the file IDs. As described above, in some embodiments, each L1 file metadata object includes at least file-level attributes for a corresponding file. As described above, in some embodiments, each L1 chunk list object includes at least a portion of the offsets (at the object store's granularity, e.g., 1 MB) and corresponding data chunk names (e.g., a chunk name is an SHA1 signature that is computed based on the corresponding data chunk) of data chunks at the respective offsets.

At 2104, the set of metadata is used to identify a base snapshot relative to the snapshot to restore. In some embodiments, the L2 VM snapshot object identifies the base snapshot, if any, against which the snapshot being restored was deduplicated when it was replicated to the object store. Put another way, during prior replication of the snapshot being restored, only the changed data between the base snapshot and the snapshot being restored was uploaded to the object store. For example, the L2 VM snapshot object comprises the VM ID (e.g., in variable previousVMIdDiffedAgainst) and the snapshot global ID (e.g., in variable previousSnapshotIdDiffedAgainst) associated with a base snapshot, if any, against which it was deduplicated.

At 2106, it is determined whether a base snapshot associated with the snapshot to restore is present locally at the storage system. In the event that the base snapshot is present locally at the storage system, control is transferred to 2110. Otherwise, in the event that the base snapshot is not present locally at the storage system, control is transferred to 2114. If the L2 VM snapshot object indicated that the snapshot being restored had a base snapshot, then the VM ID and the snapshot global ID of the identified base snapshot are used to search for whether a copy of the base snapshot locally exists at the storage system. Otherwise, if the L2 VM snapshot object indicated that the snapshot being restored did not have a base snapshot, it is presumed that no base snapshot for the snapshot being restored exists at the storage system.

At 2110, the set of metadata is used to determine a first set of shared local data chunks and a second set of unique data chunks. In some embodiments, the downloaded set of metadata associated with the snapshot being restored is sufficient to determine which data chunks at the object store granularity that the snapshot being restored and the base snapshot share and which data chunks at the object store granularity that the two snapshots do not share (i.e., are unique to the snapshot being restored). As mentioned above, the downloaded metadata associated with the snapshot being restored comprises the L2 VM snapshot object, an L1 file metadata object corresponding to each file that is included in the snapshot, and a set of L1 chunk list object(s) corresponding to each file that is included in the snapshot. Due to the naming convention of the objects at the object store as described above for at least some embodiments, each of the L2 VM file metadata object, the L1 file metadata object(s), and the L1 chunk list object(s) includes a unique jobID value that is associated with the replication job of the snapshot being restored. Also, as described above, a snapshot can be deduplicated against a base snapshot during replication from a storage system to the object store by including in the L1 chunk list objects of the snapshot, at the appropriate offsets at which the snapshot shares data chunks with the base snapshot, the jobID of the earlier replication job of the base snapshot to the object store and the corresponding chunk names (e.g., SHA) of the shared data chunks. As such, by analyzing the file offsets and corresponding jobID values and chunk names of a downloaded L1 chunk list object, those data chunks that are associated with a jobID that is different from the jobID that is identified in the L2 VM file metadata object and L1 file metadata object of the snapshot being restored can be identified as being data chunks that are shared between the snapshot being restored and the base snapshot.

For example, assume snapshot S1 were being restored from the object store to a storage system. Based on the downloaded metadata (e.g., L2 VM snapshot object) associated with S1, it is determined that snapshot S0 was the base snapshot against which S1 was deduplicated when S1 was previously replicated/uploaded to the object store. It is determined that a copy of S0 is present at the storage system. Assume that the downloaded L2 VM snapshot object includes jobID=34, which is then the jobID value that is associated with the snapshot being restored. Then at step 2110, an L1 chunk list object associated with File 1 of S1 is analyzed to determine data chunks that the File 1 of S1 shares with File 1 of S0, if any. At offset 3 MB, the L1 chunk list object indicates that the corresponding data chunk at the object store granularity is associated with jobID=34 and SHA1=Signature_A and that at offset 4 MB, the L1 chunk list object indicates that the corresponding data chunk at the object store granularity is associated with jobID=29 and SHA1=Signature_B. It can therefore be inferred that at offset 3 MB of File 1 of S1, S1 stored a unique data chunk (because the jobID listed at that offset was the same as the jobID value that is associated with S) and that at offset 4 MB of File 1 of S1, S1 stored a shared data chunk with base snapshot S0 (because the jobID listed at that offset was different from the jobID value that is associated with S1). Therefore, the L0 data chunk object associated with the offset 3 MB of File 1 belonging to jobID=34 can be queried from the object store and then written to 3 MB of File 1 in the restored copy of S1 and the data chunk associated with offset 4 MB of File 1 belonging to jobID=29 can be read from the storage system's local copy of S0 at offset 4 MB and then written to offset 4 MB of File 1 in the restored copy of S1.

In some other embodiments (not shown in FIG. 21), in order to determine a first set of shared local data chunks between the snapshot being restored and the base snapshot and also a second set of unique data chunks associated with the snapshot being restored, a second set of metadata associated with the base snapshot is obtained from the replication destination. The second set of metadata associated with the base snapshot that is downloaded from the object store includes an L2 VM snapshot object. The L2 VM snapshot object is obtained from the replication destination (e.g., cloud object store) by issuing a GET call that includes the snapshot global ID of the base snapshot that was indicated in the L2 VM snapshot object of the snapshot being restored. Also, the file IDs that were identified in the L2 VM snapshot object are used to obtain (e.g., using GET requests) the L1 objects related to the files from the cloud object store using the file IDs. For each file of the base snapshot, a corresponding L1 file metadata object and one or more corresponding L1 chunk list objects are obtained from the object store. For the same file (as determined by the file ID), the corresponding L1 chunk list(s) of the snapshot being restored and those of the base snapshot are compared to identify a set of data chunks at the object store granularity (e.g., 1 MB) that are shared/common to both the snapshot being restored and the base snapshot. As mentioned above, each L1 chunk list object includes at least a portion of the offsets (at the object store's granularity, e.g., 1 MB) and corresponding data chunk names of data chunks at the respective offsets. Therefore, for the same file at the same offset, the chunk name of the L1 chunk list object associated with the snapshot being restored is compared to the chunk name of the L1 chunk list object associated with the base snapshot. If the chunk names match, then the data chunk at the object store granularity at that offset for that file is shared by the snapshot being restored and the base snapshot and therefore could be read locally at the storage system by the restore operation. If the chunk names do not match, then the data chunk at the object store granularity at that offset for that file is not shared by the snapshot being restored and the base snapshot and is unique. These unique data chunks are to be obtained (e.g., by GET requests) from the object store by the restore operation.

The shared data chunks, at the object store granularity, that are shared between the snapshot being restored and the base snapshot across all the files of the snapshot to be restored are identified. Furthermore, the data chunks that are unique to the snapshot, which is requested to be restored, are identified.

At 2112, the snapshot is restored on the storage system by obtaining the first set of shared local data chunks locally from the storage system and the second set of unique data chunks from the replication destination. The shared data chunks, at the object store granularity, that are shared between the snapshot being restored and the base snapshot are read locally from the storage system and written to the local copy (e.g., at their respective offsets that were identified in the L1 chunk list objects), or references are updated in metadata, of the snapshot being restored. The remaining unique data chunks at the object store granularity of the snapshot being restored are queried (e.g., via GET requests) from the object store and written to the local copy of the snapshot being restored at their respective offsets that were identified in the L1 chunk list objects. For example, the unique data chunks (e.g., L0 data chunk objects) at the object store granularity are queried from the object store using GET requests with at least the corresponding file ID, offset, jobID, and chunk name (e.g., an SHA1 signature that is computed based on the corresponding data chunk).

At 2114, local metadata is used to identify an ancestor snapshot and a descendent snapshot that are available locally. A snapshot can be restored from the object store to any storage system in a cluster of storage systems. Hence, finding the exact same base snapshot on a particular storage system might be difficult. If an exact base snapshot is not present, but some other snapshots of the same VM (e.g., chain of snapshots) are present locally on the storage system, then two snapshots closest in the creation time to the snapshot being restored are found. It is expected that related snapshots close in creation time to the snapshot being restored are desirable because it is expected that they share more data with the snapshot being restored as more data is likely to change over time since the creation of the snapshot being restored.

In various embodiments, two snapshots identified to be closest in creation time satisfy the following criteria: one snapshot is older than the snapshot being restored and another snapshot is younger than the snapshot being restored. In some embodiments, the ancestor and the descendent snapshots were determined using local metadata stored at the storage system that identifies the snapshots that are in a same chain of snapshots (e.g., that belong to the same VM ID). The snapshot that is older than the snapshot being restored is sometimes referred to as an "ancestor" snapshot and the snapshot that is younger than the snapshot being restored is sometimes referred to as a "descendent" snapshot. In some embodiments, only one of the ancestor and the descendent snapshots is found but two (or more) of such related snapshots may help increase the probability of finding data locally.

At 2116, chunk names from the ancestor snapshot and the descendent snapshot corresponding to data chunks identified in the set of metadata associated with the snapshot to restore are computed.

At 2118, the chunk names are compared to chunk names identified in the set of metadata to determine the first set of shared local data chunks and the second set of unique data chunks.

In some embodiments, for each data chunk at the object store granularity that is identified by its corresponding offset (or range of offsets) in an L1 chunk list object belonging to a file of the snapshot to restore, the corresponding data is read locally from the storage system from the same file of both the ancestor snapshot and the descendent snapshot and a corresponding chunk name is computed for the read data chunk for the ancestor snapshot and for the read data chunk for the descendent snapshot. If the chunk name at the same offset of the L1 chunk list object belonging to the file of the snapshot to restore matches either the computed chunk name of the read data from the ancestor snapshot or the descendent snapshot, then that data chunk is shared by the snapshot being restored and the corresponding ancestor or descendent snapshot and therefore could be read locally at the storage system by the restore operation. If the chunk name at the same offset of the L1 chunk list object belonging to the file of the snapshot to restore does not match either the computed chunk name of the read data from the ancestor snapshot or the descendent snapshot, then that data chunk is unique. These unique data chunks (L0 data chunk objects) are to be obtained (e.g., by GET requests) from the object store by the restore operation.

As shown in process 2100, in some embodiments, the identification of a subset of shared data between the snapshot being restored and a found related snapshot (a base snapshot, a descendent snapshot, and/or an ancestor snapshot) can be performed based on metadata that is downloaded from the object store, thereby avoiding the need to actually read data at the storage system for this identification. In some embodiments, the snapshot being restored may be restored only by updating the metadata of the snapshot at the storage system. For example, only the metadata of the snapshot being restored may be updated in the event that all of the data of the snapshot being restored is already present at the storage system such that the restore operation can just add references, to the metadata of the snapshot being restored, to the existing locations of the data at the storage system.

Figure 22:
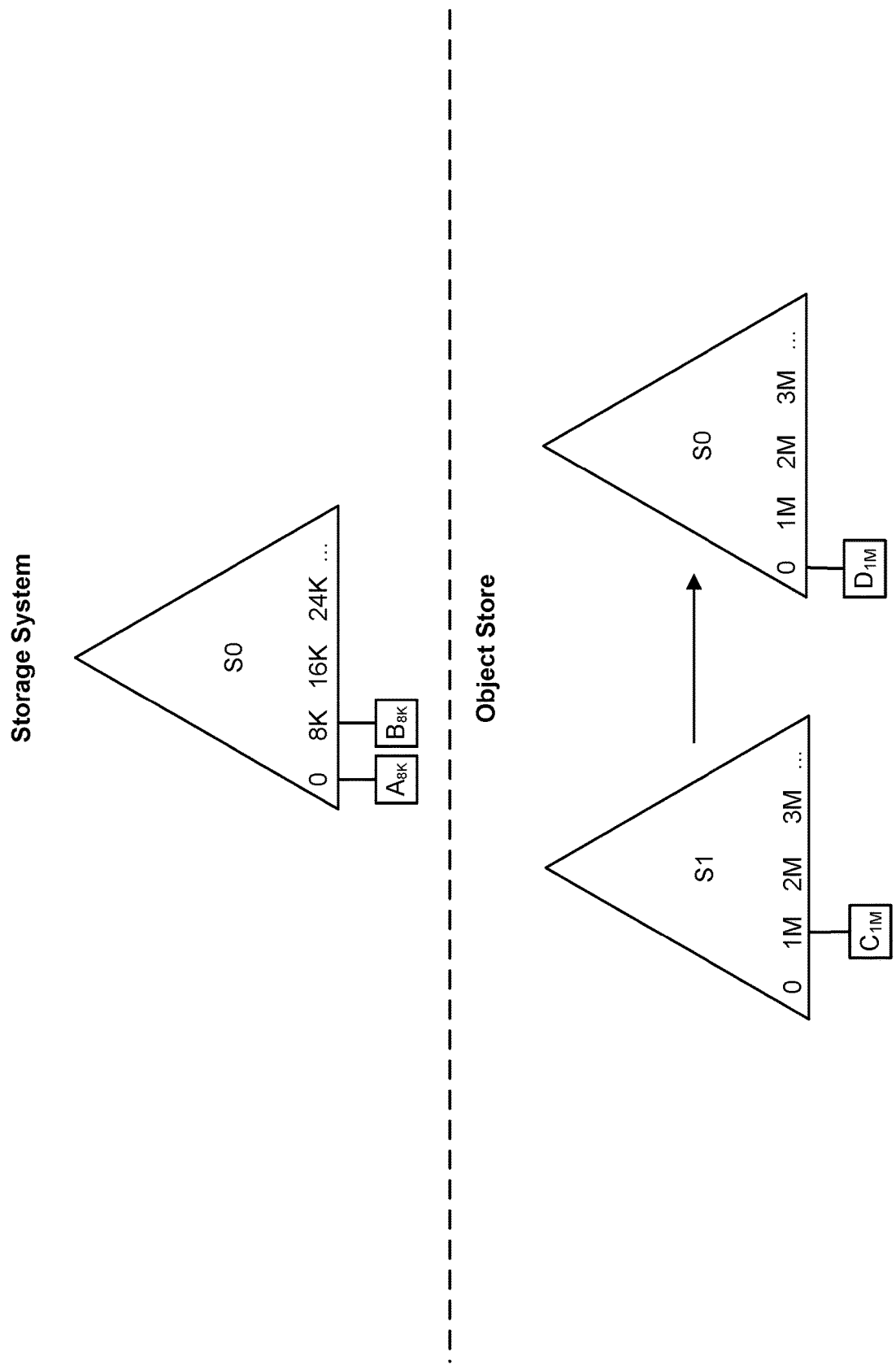
FIG. 22 is a diagram showing an example of a snapshot to restore from a replication destination to a storage system for which a base snapshot is locally present at the storage system.

FIG. 22 is a diagram showing an example of a snapshot to restore from a replication destination to a storage system for which a base snapshot is locally present at the storage system. In the example of FIG. 22, snapshot S1 is requested to be restored from (e.g., a bucket of) an object store to a storage system. It should be noted that the storage system stores data at one granularity (e.g., 8 KB) while the object store stores data at another granularity (e.g., 1 MB). Each unit of data that is referenced at an offset of a snapshot stored at the storage system is denoted with an 8 KB subscript to indicate the storage system block size and each unit of data that is referenced at an offset of a snapshot stored at the object store is denoted with a 1 MB subscript to indicate the object store block size. As described in a process such as process 2000 of FIG. 20 or process 2100 of FIG. 21, by using metadata associated with S1 that is downloaded from the object store, it can be determined at the storage system that snapshot S0 is a base snapshot against which S1 was deduplicated when S1 had been replicated/uploaded to the object store. It is then determined that a copy of S0 is present at the storage system. The metadata associated with S1 can be used to determine which data chunks at the object store granularity (e.g., 1 MB) S1 share with S0 and which data chunks at the object store granularity the two snapshots do not share. The shared data chunks at the object store granularity can be read from the local copy of S0 at the storage system in restoring S1 at the storage system while the unique data chunks at the object store granularity can be downloaded from the object store in restoring S1 at the storage system.

Figure 23:
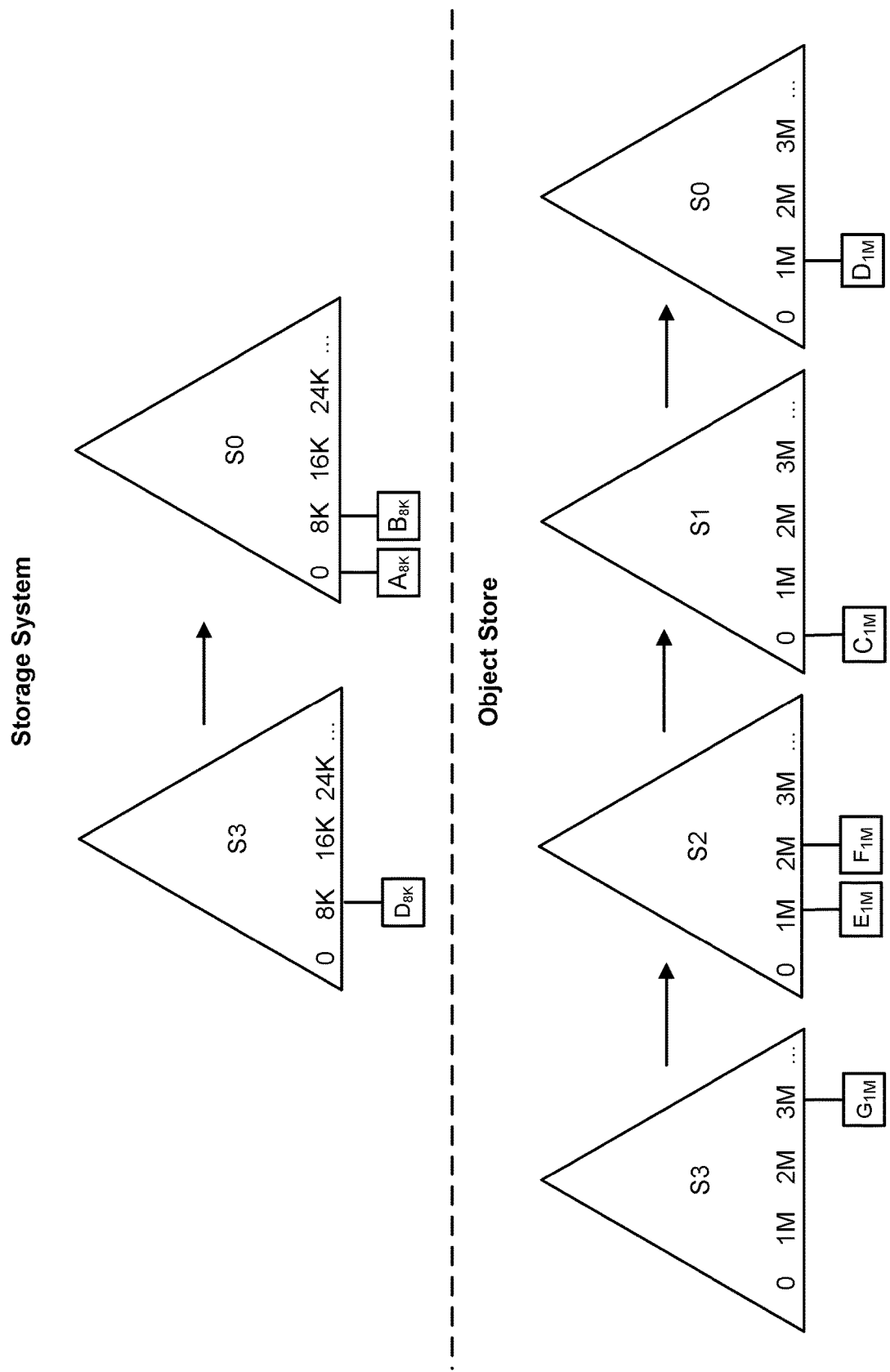
FIG. 23 is a diagram showing an example of a snapshot to restore from a replication destination to a storage system for which a base snapshot is not locally present at the storage system but other related snapshots are locally present at the storage system.

FIG. 23 is a diagram showing an example of a snapshot to restore from a replication destination to a storage system for which a base snapshot is not locally present at the storage system but other related snapshots are locally present at the storage system. In the example of FIG. 23, snapshot S2 is requested to be restored from (e.g., a bucket of) an object store to a storage system. It should be noted that the storage system stores data at one granularity (e.g., 8 KB) while the object store stores data at another granularity (e.g., 1 MB). Each unit of data that is referenced at an offset of a snapshot stored at the storage system is denoted with an 8 KB subscript to indicate the storage system block size and each unit of data that is referenced at an offset of a snapshot stored at the object store is denoted with a 1 MB subscript to indicate the object store block size. As described in a process such as process 2000 of FIG. 20 or process 2100 of FIG. 21, by using metadata associated with S2 that is downloaded from the object store, it can be determined at the storage system that snapshot S1 is a base snapshot against which S2 was deduplicated when S2 had been replicated/uploaded to the object store. It is then determined that a copy of S1 is not present at the storage system. As such, local metadata that is stored at the storage system is used to identify snapshots that belong to the same VM as S2 and are created close in time to S2. The two identified snapshots at the storage system include ancestor snapshot, S0, and descendent snapshot, S3. For each data chunk at the object store granularity of S2 that is identified in the downloaded metadata, a check is performed to see if the data is present in the ancestor (S0) or the descendent (S3) snapshot locally by reading the data chunk at the same offset in the older and the younger snapshot. Then, the chunk name (e.g., SHA1) of each of the two read data chunks is calculated and matched with the chunk name in S2's metadata. If it is a match, the data chunk is read locally from the matching one of the ancestor snapshot or the descendent snapshot and download of that data chunk from the object store is avoided. The unique data chunks at the object store granularity can be downloaded from the object store in restoring S2 at the storage system.

In a second set of techniques for performing an efficient restore of a snapshot from a replication destination to a storage system, an index, such as a deduplication table maintained at the storage system, is used. A deduplication table comprising signatures corresponding to data that is stored at the storage system is maintained. In the deduplication table, each signature corresponds to a block of data at an object store (e.g., cloud) granularity, which is different (e.g., larger) than the granularity of data that is used by the storage system to store data. For example, the object store granularity is 1 MB and the storage system granularity is 8 KB. When a snapshot is to be restored from the object store to the storage system, metadata associated with the snapshot is downloaded from the object store and compared to the deduplication table at the storage system. From the comparison, at least a subset of data of the snapshot that is indicated by the deduplication table as being already at the storage system is read locally by the restore operation. The remaining data of the snapshot that is not already present at the storage system is downloaded from the object store to complete the restore operation. The second set of techniques is described in further detail in FIGS. 24 through 27, below.

Figure 24:
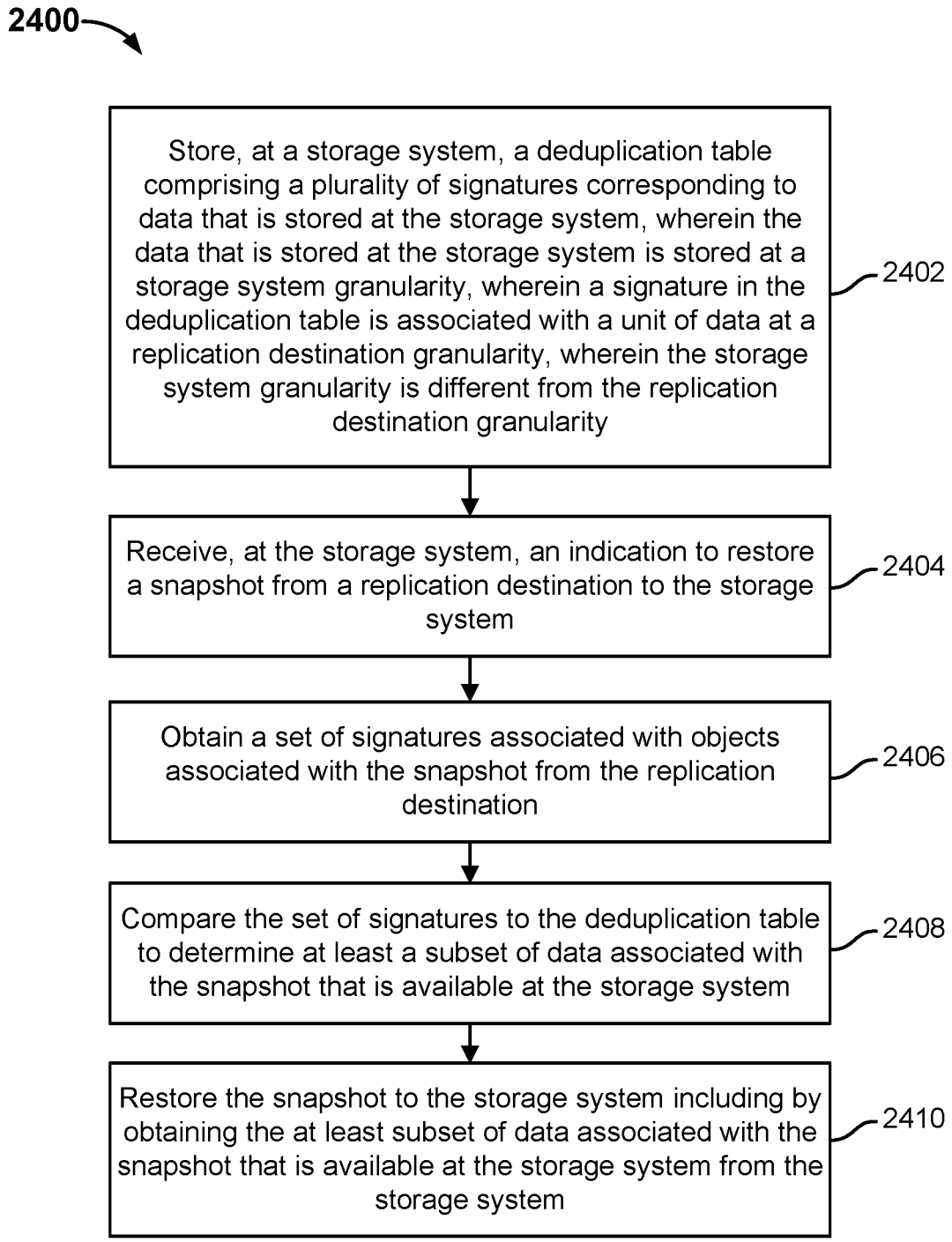
FIG. 24 is a flow diagram showing an embodiment of a process for performing an efficient restore of a snapshot to a storage system.

FIG. 24 is a flow diagram showing an embodiment of a process for performing an efficient restore of a snapshot to a storage system. In some embodiments, process 2400 is implemented at a storage system such as one of storage systems 104, 106, and 108 of FIG. 1.

At 2402, a deduplication table comprising a plurality of signatures corresponding to data that is stored at a storage system is stored at the storage system, wherein the data that is stored at the storage system is stored at a storage system granularity, wherein a signature in the deduplication table is associated with a unit of data at a replication destination granularity, wherein the storage system granularity is different from the replication destination granularity. In some embodiments, the replication destination is an object store.

In various embodiments, the storage system stores data at a granularity that is different from the granularity at which the object store stores data. In some embodiments, the storage system stores data at an 8 KB block size and the object store stores data at a 1 MB block size. One reason for why the storage system stores data at a smaller block size than the object store is that by using a smaller granularity at the storage system, the storage system can take greater advantage of deduplication while storing data at a larger granularity at the object store reduces the number of operations that need to be performed at the object store, which in turn reduces the cost to store data at the object store.

A deduplication table (e.g., an index) is maintained at the storage system. The deduplication table stores a signature (e.g., an SHA1 value and is sometimes referred to as a "chunk name") that is derived from a corresponding data chunk stored at the storage system, where the data chunk is at the object store granularity. Each chunk name in the deduplication table is also stored with the physical location of the storage media (e.g., hard disk or flash) of the storage system at which the corresponding data chunk at the object store granularity is stored. For example, if the object store granularity were 1 MB, then an entry in the deduplication table may include a signature (e.g., an SHA1 or other signature) corresponding to a unit of data that is stored at offset range 1 MB to 2 MB and potentially other additional information that identifies where the data is stored at the storage system (e.g., the name of a particular drive or the name of a particular tier of storage).

One reason that the units of data for which chunk names/signatures are maintained at the storage system at the object store granularity rather than the storage system granularity is because, as will be described below, the entries of the deduplication table are to be compared to the metadata associated with the snapshot that will be downloaded from the object store and such metadata includes signatures associated with data chunks at the object store granularity that belong to the snapshot. Because signatures computed on units of data of different granularities cannot be compared, the signatures of units of data in the deduplication table at the storage system are maintained over the same data granularity at which signatures of units of data are stored at the object store so that the signatures in the deduplication table and those downloaded from the object store can be compared.

At 2404, an indication to restore a snapshot from a replication destination to the storage system is received at the storage system. The snapshot to restore is currently stored at the object store. In various embodiments, to restore the snapshot to the storage system comprises to create a local copy of the snapshot at the storage system. In some embodiments, the storage system that had received the indication to restore the snapshot had originally been the storage system from which the snapshot was replicated to the object store. In some embodiments, the storage system that had received the indication to restore the snapshot had not originally been the storage system from which the snapshot was replicated to the object store.

At 2406, a set of signatures associated with objects associated with the snapshot is obtained from the replication destination. Metadata associated with the snapshot being restored is downloaded from the object store. The metadata includes signatures associated with each data chunk (which is stored as an object) at the object store granularity that are stored in the object store for the snapshot being restored.

At 2408, the set of signatures is compared to the deduplication table to determine at least a subset of data associated with the snapshot that is available at the storage system. The signatures associated with data chunk objects that belong to the snapshot being restored are compared to the signatures in the deduplication table.

At 2410, the snapshot is restored to the storage system including by obtaining the at least subset of data associated with the snapshot that is available at the storage system from the storage system. In the restore operation, the snapshot's data chunks at the object store granularity whose signatures match those in the deduplication table are locally read from the storage system at the physical locations that are indicated in the deduplication table and then written to the restored copy of the snapshot. The remaining data chunks of the snapshot for which signatures do not match any in the deduplication table are downloaded from the object store and then written to the restored copy of the snapshot.

Figure 25:
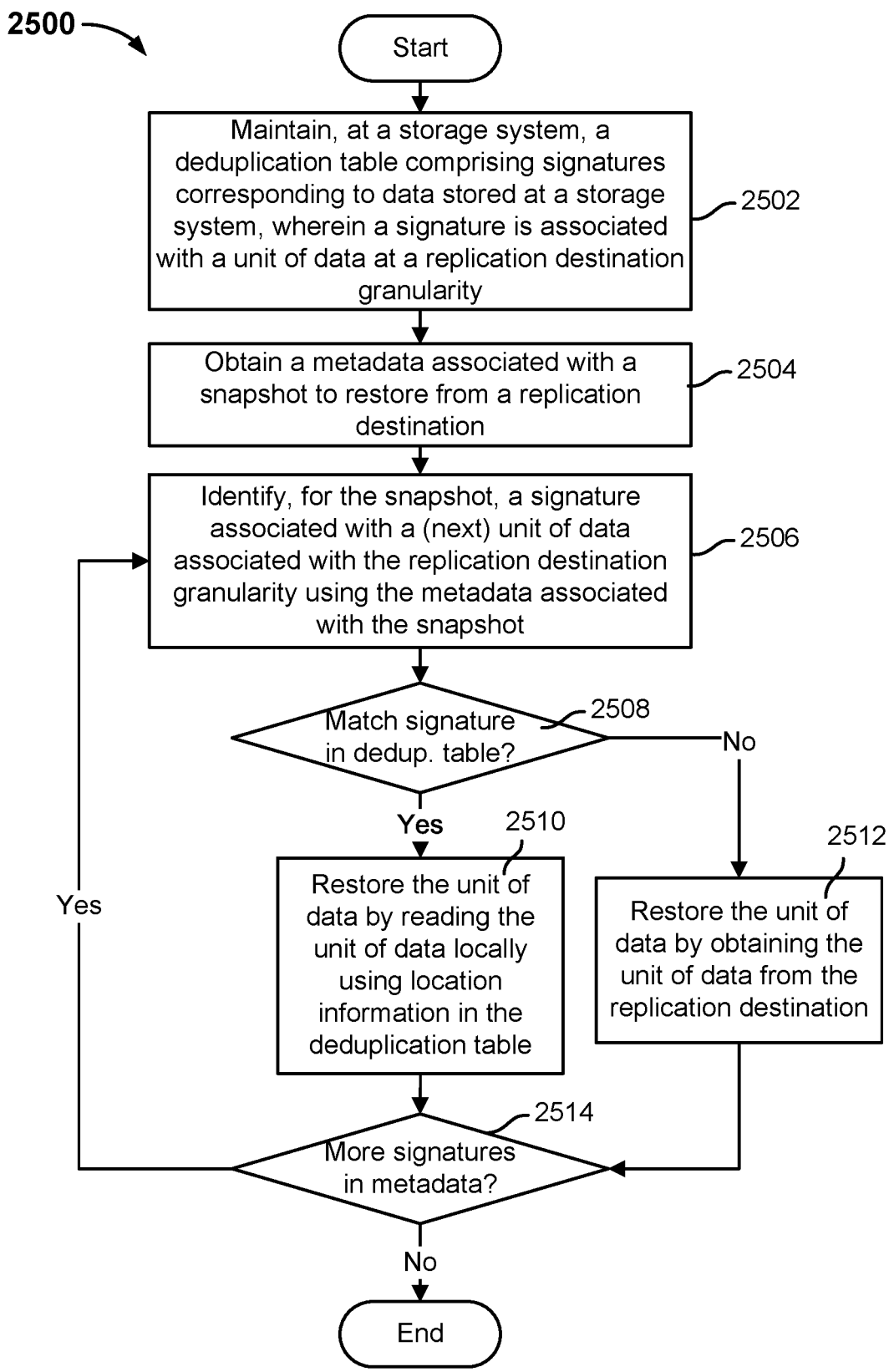
FIG. 25 is a flow diagram showing an example of a process for performing an efficient restore of a snapshot to a storage system.

FIG. 25 is a flow diagram showing an example of a process for performing an efficient restore of a snapshot to a storage system. In some embodiments, process 2500 is implemented at a storage system such as one of storage systems 104, 106, and 108 of FIG. 1. In some embodiments, process 2400 of FIG. 24 may be implemented, at least in part, by process 2500.

At 2502, a deduplication table comprising signatures corresponding to data stored in a storage system is maintained at the storage system, wherein a signature in the deduplication table is associated with a unit of data at a replication destination granularity. In some embodiments, the replication destination is an object store. While the storage system may store data at a different granularity than the granularity at which the object store stores data, the storage system maintains a deduplication table that stores signatures computed over the object store granularity of data that is stored at the storage system. For example, the storage system stores data at 8 KB units while the object store stores data at 1 MB units. In order to maintain the deduplication table, any time data is changed at the storage system within a 1 MB offset range of over which a signature had been computed and stored in the deduplication table, a new signature is computed over the updated data over that 1 MB offset range. The new signature then replaces the old signature corresponding to that 1 MB range of offsets in the deduplication table.

Figure 26:
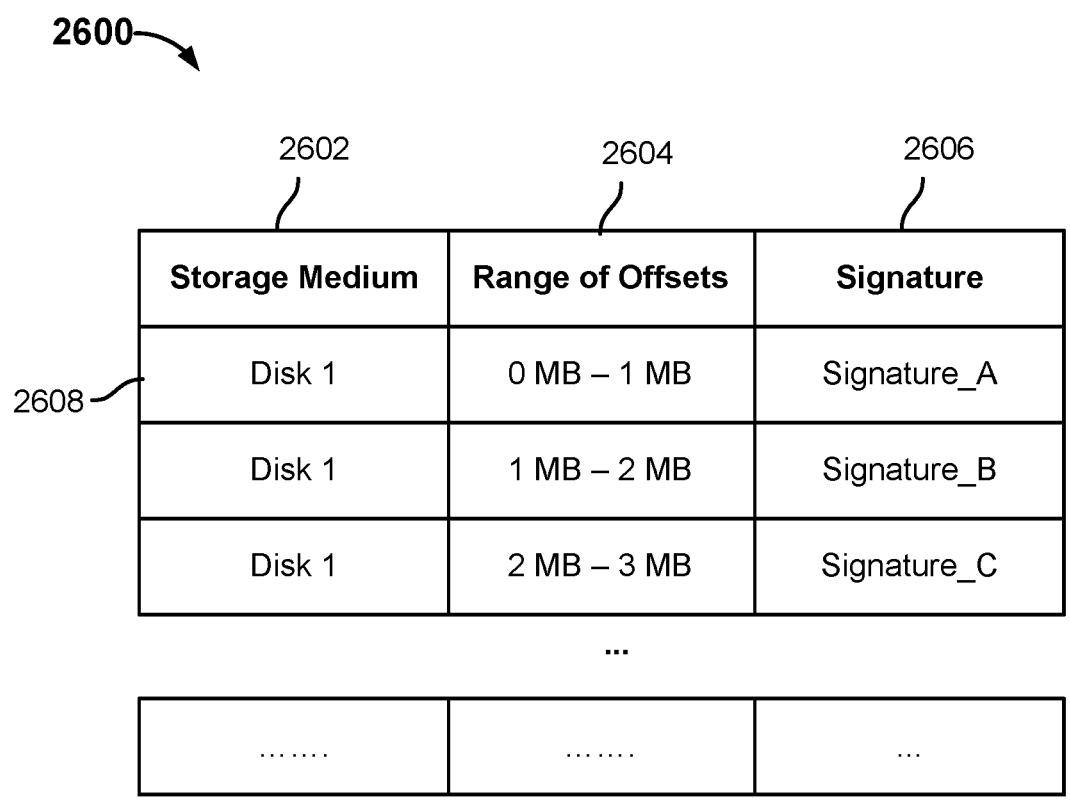
FIG. 26 is a diagram showing an example of a deduplication table.
Figure 27:
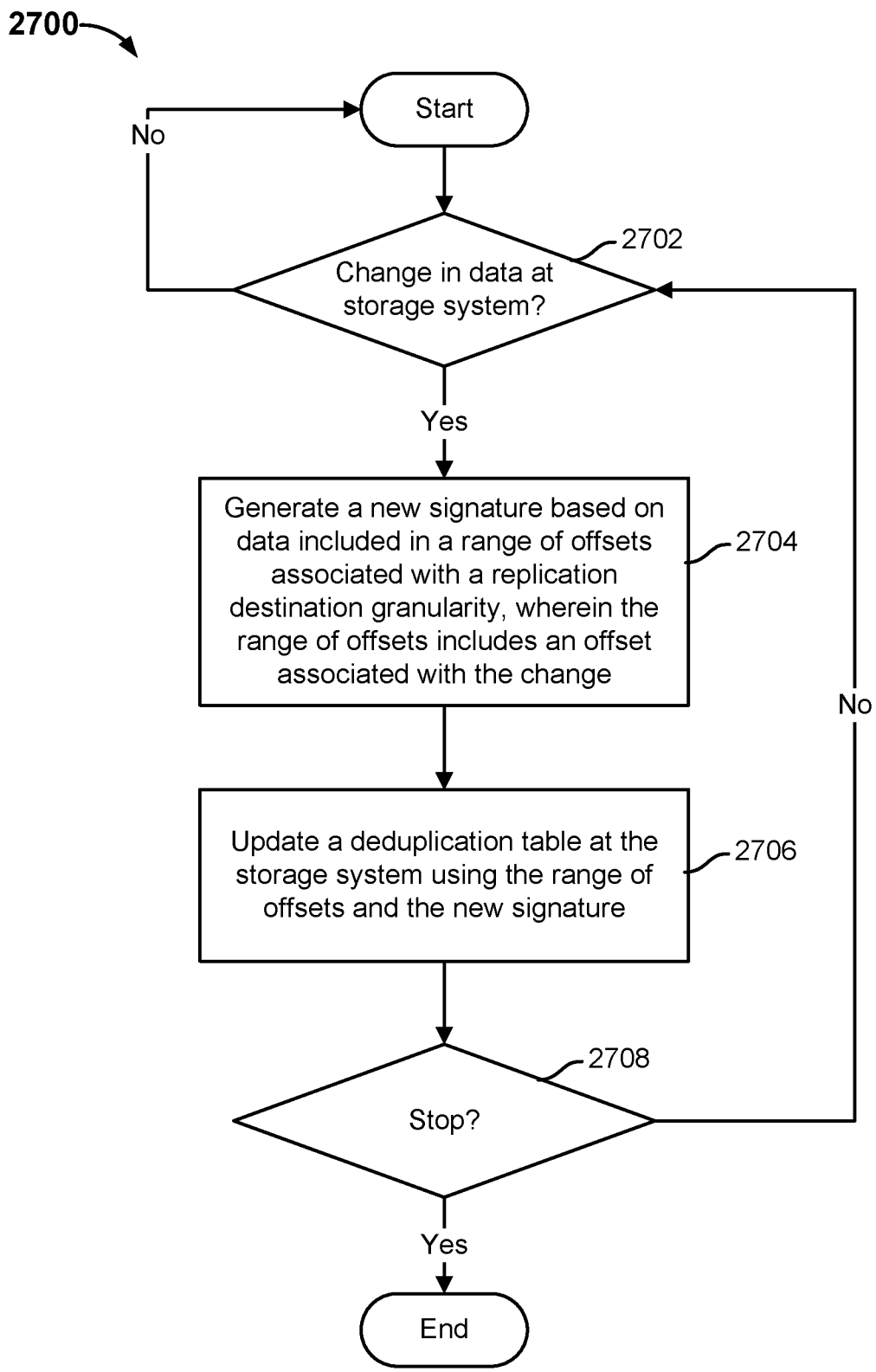
FIG. 27 is a flow diagram showing an example process of updating a deduplication table that is maintained at the storage system.

An example deduplication table is shown in FIG. 26, below, and an example process for updating the deduplication table is shown in FIG. 27, below.

At 2504, a metadata associated with a snapshot to restore is obtained from a replication destination. In some embodiments, the set of metadata associated with the snapshot being restored that is downloaded from the object store includes an L2 VM snapshot object. The L2 VM snapshot object is obtained from the replication destination (e.g., cloud object store) by issuing a GET call that includes the snapshot global ID that was included in the restore operation. As mentioned above, the L2 VM snapshot object includes at least VM-attributes and the file IDs (fileGlobalIDs) of all the files that are included in the VM snapshot. As such, the file IDs are used to obtain (e.g., using GET requests) the L1 objects related to the files from the cloud object store using the file IDs. As described above, in some embodiments, each L1 file metadata object includes at least file-level attributes for a corresponding file. As described above, in some embodiments, each L1 chunk list object includes at least a portion of the offsets (at the object store's granularity, e.g., 1 MB) and corresponding data signatures (e.g., SHA1 signatures that are computed based on the corresponding data chunk at the object store's granularity) of data chunks at the respective offsets in a file that is included in the snapshot.

At 2506, a signature associated with a (next) unit of data associated with the replication destination granularity is identified using the metadata associated with the snapshot. Each signature (chunk name) corresponding to a data chunk that is associated with a file within the snapshot being restored is identified in the downloaded metadata and compared against the signatures within the deduplication table. For example, each signature/chunk name within each of the L1 chunk list objects associated with any file ID that is associated with the VM snapshot being restored is checked against the signatures of the deduplication table for a match.

At 2508, it is determined whether the identified signature matches a signature in the deduplication table. In the event that the identified signature matches a signature in the deduplication table, control is transferred to 2510. Otherwise, in the event that the identified signature does not match any signatures in the deduplication table, control is transferred to 2512.

At 2510, the unit of data is restored to the snapshot by reading the unit of data locally using location information in the deduplication table. In the event that the signature identified in the metadata matches a signature in the deduplication table, the corresponding data chunk at the object store granularity is read from the location information (e.g., offset range and/or other location information) corresponding to the matching signature in the deduplication table.

At 2512, the unit of data is restored by obtaining the unit of data from the replication destination. In the event that the signature identified in the metadata does not match any signatures in the deduplication table, the corresponding data chunk (e.g., an L0 data chunk object) at the object store granularity is downloaded from the object store using a GET request with at least the file ID, the corresponding offset, the corresponding jobID, and the corresponding signature/chunk name (e.g., an SHA1 signature that is computed based on the corresponding data chunk).

At 2514, it is determined whether there is at least one more signature in the metadata. In the event that there is at least one more signature, control is returned to 2506. Otherwise, in the event that there is not at least one more signature, process 2500 ends. If there is at least one more signature in the downloaded metadata for the snapshot being restored that has yet to be compared to the deduplication table, control is returned to 2506.

FIG. 26 is a diagram showing an example of a deduplication table. For example, the deduplication table described in FIG. 24 and FIG. 25 may be implemented using the example shown in FIG. 26. Deduplication table 2600 is stored at the storage system for which a snapshot is to be restored from a replication destination. Deduplication table 2600 includes three columns: storage medium 2602, range of offsets 2604, and signature 2606. Each row of deduplication table 2600 corresponds to a unit of data at the replication destination (e.g., object store) granularity (a data chunk). In the example of FIG. 26, the object store granularity is 1 MB. As such, each unit of data at the object store granularity is identified in deduplication table 2600 by the storage medium (e.g., Disk 1) at the storage system at which it is stored, the range of offsets that it's stored at that storage medium, and also the signature (e.g., SHA1) (chunk name) that was computed based on that unit of data. For example, row 2608 stores information pertaining to a unit of data at the object store granularity that is stored on Disk 1 at offset range 0 MB to 1 MB and is associated with the signature of "Signature_A."

FIG. 27 is a flow diagram showing an example process of updating a deduplication table that is maintained at the storage system. As will described in further below, the deduplication table serves as an effective mechanism for tracking changed units of data at the object store granularity. In some embodiments, process 2700 is implemented at a storage system such as one of storage systems 104, 106, and 108 of FIG. 1. As data is updated on each object store granularity at the storage system, the deduplication table stored at the storage system (e.g., deduplication table 2600 of FIG. 26) needs to be updated as well. This is required to ensure the accuracy of using process 2700.

At 2702, it is determined whether a change in data has been detected at a storage system. In the event that a change in data has been detected at the storage system, control is transferred to 2704. Otherwise, in the event that a change in data has not been detected at the storage system, 2702 is returned to at a later time. A change in data at the storage system may include the writing of new data, the modification of existing data, and/or the deletion of existing data.

At 2704, a new signature is generated based on data included in a range of offsets associated with a replication destination granularity, wherein the range of offsets includes an offset associated with the change. Data within the range of offsets at the replication destination (e.g., object store) granularity in which the change was detected is read and a new signature (chunk name) (e.g., an SHA1 value) is determined based on the read data.

At 2706, a deduplication table at the storage system is updated using the range of offsets and the new signature. If the deduplication table stored an old signature corresponding to the range of offsets in which the change in data was detected, then the old signature is replaced by the new signature generated at 2706. Otherwise, if the deduplication table did not store a signature corresponding to the range of offsets in which the change in data was detected, then a new entry is created in the deduplication table to include at least the range of offsets that includes the offset associated with the change in data and the new signature.

At 2708, it is determined whether the updating of the deduplication table should be stopped. In the event that the updating of the deduplication table should be stopped, process 2700 ends. Otherwise, in the event that the updating of the deduplication table should not be stopped, control is returned to 2702. For example, the deduplication table should not be updated if the storage system is shut down or loses power, and the consistency of the signatures cannot be assured.

While embodiments described above for the second set of techniques for performing an efficient restore of a snapshot to a storage system indicate that the deduplication table stores signatures computed over units of data at the replication destination granularity, in some other embodiments, the deduplication table at the storage system may store signatures computed over units of data at the storage system granularity. If the replication destination granularity is different from the storage system granularity, then the signatures corresponding to units of data at the storage system granularity can be uploaded to the object store during a replication of a snapshot. As such, when the snapshot is requested to be restored at a storage system, the metadata comprising at least the signatures computed over units of data at the storage system granularity that are included in the snapshot can be downloaded and compared with the signatures that are also computed over units of data at the storage system granularity that are stored in the deduplication table at the storage system to determine which units of data at the storage system can be read locally versus downloaded from the object store.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage system, comprising:
   a memory; and
   a processor coupled to the memory and configured to:
   receive an indication to restore a first snapshot stored at a replication destination from the replication destination to the storage system;
   identify a second snapshot that is related to the first snapshot;
   determine that a storage system copy of the second snapshot is stored locally at the storage system;
   determine a first subset of data that the first snapshot shares with the storage system copy of the second snapshot and is stored locally at the storage system;
   determine a second subset of data that the first snapshot does not share with the storage system copy of the second snapshot and is not stored locally at the storage system;
   restore the first snapshot to the storage system including by:
   reading the first subset of data from the storage system copy of the second snapshot locally from the storage system;
   obtaining the second subset of data from the replication destination; and
   writing the first subset of data and the second subset of data into a restored copy of the first snapshot at the storage system; and
   store the indication in the memory.

2. The storage system of claim 1, wherein to identify the second snapshot that is related to the first snapshot and to determine that the storage system copy of the second snapshot is stored locally at the storage system comprises to:
obtain a set of metadata associated with the first snapshot from the replication destination;
use the set of metadata to identify a base snapshot against which the first snapshot was deduplicated at the replication destination; and
determine that the base snapshot is available at the storage system, wherein the second snapshot comprises the base snapshot.

3. The storage system of claim 2, wherein to determine the first subset of data that the first snapshot shares with the storage system copy of the second snapshot comprises to use the set of metadata to determine a first set of shared local data chunks between the first snapshot and the base snapshot and a second set of unique data chunks associated with the first snapshot, wherein the first subset of data comprises the first set of shared local data chunks and wherein the second subset of data comprises the second set of unique data chunks; and
wherein to restore the first snapshot to the storage system comprises to:
restore the restored copy of the first snapshot including by obtaining the first set of shared local data chunks locally from the storage system and obtaining the second set of unique data chunks associated with the first snapshot from the replication destination.

4. The storage system of claim 1, wherein to identify the second snapshot that is related to the first snapshot comprises to:
obtain a set of metadata associated with the first snapshot from the replication destination;
use the set of metadata to identify that a base snapshot against which the first snapshot was deduplicated at the replication destination is not available at the storage system; and
use local metadata to identify an ancestor snapshot and a descendent snapshot relative to the first snapshot that are available at the storage system, wherein the second snapshot comprises the ancestor snapshot and the descendent snapshot.

5. The storage system of claim 4, wherein the first snapshot, the ancestor snapshot, and the descendent snapshot are part of a same chain of snapshots.

6. The storage system of claim 4, wherein to determine the first subset of data that the first snapshot shares with the storage system copy of the second snapshot comprises to:
compute chunk names from the ancestor snapshot and the descendent snapshot corresponding to data chunks identified in the set of metadata;
compare the chunk names to chunk names identified in the set of metadata to determine the first subset of data comprising a first set of shared local data chunks and the second subset of data comprising a second set of unique data chunks; and
wherein to restore the first snapshot to the storage system comprises to:
restore the first snapshot including by obtaining the first set of shared local data chunks locally from the storage system and obtaining the second set of unique data chunks associated with the first snapshot from the replication destination.

7. A method, comprising:
receiving an indication to restore a first snapshot stored at a replication destination from the replication destination to a storage system;
identifying a second snapshot that is related to the first snapshot;
determining that a storage system copy of the second snapshot is stored locally at the storage system;
determining a first subset of data that the first snapshot shares with the storage system copy of the second snapshot and is stored locally at the storage system;
determining a second subset of data that the first snapshot does not share with the storage system copy of the second snapshot and is not stored locally at the storage system; and
restoring the first snapshot to the storage system including by:
reading the first subset of data from the storage system copy of the second snapshot locally from the storage system,
obtaining the second subset of data from the replication destination; and
writing the first subset of data and the second subset of data into a restored copy of the first snapshot at the storage system.

8. The method of claim 7, wherein identifying the second snapshot that is related to the first snapshot and determining that the storage system copy of the second snapshot is stored locally at the storage system comprises:
obtaining a set of metadata associated with the first snapshot from the replication destination;
using the set of metadata to identify a base snapshot against which the first snapshot was deduplicated at the replication destination; and
determining that the base snapshot is available at the storage system, wherein the second snapshot comprises the base snapshot.

9. The method of claim 8, wherein determining the first subset of data that the first snapshot shares with the storage system copy of the second snapshot comprises using the set of metadata to determine a first set of shared local data chunks between the first snapshot and the base snapshot and a second set of unique data chunks associated with the first snapshot, wherein the first subset of data comprises the first set of shared local data chunks and wherein the second subset of data comprises the second set of unique data chunks; and
wherein restoring the first snapshot to the storage system comprises:
restoring the restored copy of the first snapshot including by obtaining the first set of shared local data chunks locally from the storage system and obtaining the second set of unique data chunks associated with the first snapshot from the replication destination.

10. The method of claim 7, wherein identifying the second snapshot that is related to the first snapshot comprises:
obtaining a set of metadata associated with the first snapshot from the replication destination;
using the set of metadata to identify that a base snapshot against which the first snapshot was deduplicated at the replication destination is not available at the storage system; and
using local metadata to identify an ancestor snapshot and a descendent snapshot relative to the first snapshot that are available at the storage system, wherein the second snapshot comprises the ancestor snapshot and the descendent snapshot.

11. The method of claim 10, wherein the first snapshot, the ancestor snapshot, and the descendent snapshot are part of a same chain of snapshots.

12. The method of claim 10, wherein determining the first subset of data that the first snapshot shares with the storage system copy of the second snapshot comprises:
  computing chunk names from the ancestor snapshot and the descendent snapshot corresponding to data chunks identified in the set of metadata;
  comparing the chunk names to chunk names identified in the set of metadata to determine the first subset of data comprising a first set of shared local data chunks and the second subset of data comprising a second set of unique data chunks; and
  wherein restoring the first snapshot to the storage system comprises:
    restoring the first snapshot including by obtaining the first set of shared local data chunks locally from the storage system and obtaining the second set of unique data chunks associated with the first snapshot from the replication destination.

13. The method of claim 7, wherein the second subset of data is obtained from the replication destination in units of data associated with a replication destination granularity, wherein the replication destination granularity is greater than a storage system granularity.

14. A storage system, comprising:
  a processor configured to:
    store a deduplication table comprising a plurality of signatures corresponding to data that is stored at the storage system, wherein the data that is stored at the storage system is stored at a storage system granularity, wherein a signature in the deduplication table is associated with a unit of data at a replication destination granularity, wherein the storage system granularity is different from the replication destination granularity;
    receive an indication to restore a snapshot from a replication destination to the storage system;
    obtain a set of signatures associated with objects associated with the snapshot from the replication destination;
    compare the set of signatures to the deduplication table to determine at least a subset of data associated with the snapshot that is available at the storage system, including to identify an identified signature in the set of signatures that does not match any signatures in the deduplication table; and
    restore the snapshot to the storage system including by obtaining the at least subset of data associated with the snapshot that is available at the storage system from the storage system, including to restore the snapshot to the storage system by obtaining an object corresponding to the identified signature from the replication destination, wherein the object comprises a data chunk associated with the snapshot; and
  a memory coupled to the processor and configured to store the indication.

15. The storage system of claim 14, wherein the replication destination granularity is greater than the storage system granularity.

16. The storage system of claim 14, wherein the deduplication table stores for the signature, corresponding location information associated with where the associated unit of data at the replication destination granularity is stored at the storage system.

17. The storage system of claim 14, wherein the processor is further configured to:
  detect a change in data;
  generate a new signature corresponding to data included in a range of offsets associated with the replication destination granularity, wherein the range of offsets includes an offset associated with the change in data; and
  update the deduplication table using the range of offsets and the new signature.

18. A method, comprising:
  storing a deduplication table comprising a plurality of signatures corresponding to data that is stored at a storage system, wherein the data that is stored at the storage system is stored at a storage system granularity, wherein a signature in the deduplication table is associated with a unit of data at a replication destination granularity, wherein the storage system granularity is different from the replication destination granularity;
  receiving an indication to restore a snapshot from a replication destination to the storage system;
  obtaining a set of signatures associated with objects associated with the snapshot from the replication destination;
  comparing the set of signatures to the deduplication table to determine at least a subset of data associated with the snapshot that is available at the storage system, including by identifying an identified signature in the set of signatures that does not match any signatures in the deduplication table; and
  restoring the snapshot to the storage system including by obtaining the at least subset of data associated with the snapshot that is available at the storage system from the storage system, including by restoring the snapshot to the storage system by obtaining an object corresponding to the identified signature from the replication destination, wherein the object comprises a data chunk associated with the snapshot.

19. The method of claim 18, wherein the replication destination granularity is greater than the storage system granularity.

20. The method of claim 18, wherein the deduplication table stores for the signature, corresponding location information associated with where the associated unit of data at the replication destination granularity is stored at the storage system.

21. The method of claim 18, further comprising:
  detecting a change in data;
  generating a new signature corresponding to data included in a range of offsets associated with the replication destination granularity, wherein the range of offsets includes an offset associated with the change in data; and
  updating the deduplication table using the range of offsets and the new signature.

22. A computer program product, the computer program product being embodied in a computer readable storage medium and comprising computer instructions for:
  receiving an indication to restore a first snapshot stored at a replication destination from the replication destination to a storage system;
  identifying a second snapshot that is related to the first snapshot;
  determining that a storage system copy of the second snapshot is stored locally at the storage system;
  determining a first subset of data that the first snapshot shares with the storage system copy of the second snapshot and is stored locally at the storage system;
  determining a second subset of data that the first snapshot does not share with the storage system copy of the second snapshot and is not stored locally at the storage system; and restoring the first snapshot to the storage system including by:
   reading the first subset of data from the storage system copy of the second snapshot locally from the storage system;
   obtaining the second subset of data from the replication destination; and
   writing the first subset of data and the second subset of data into a restored copy of the first snapshot at the storage system.

23. A computer program product, the computer program product being embodied in a computer readable storage medium and comprising computer instructions for:
   storing a deduplication table comprising a plurality of signatures corresponding to data that is stored at a storage system, wherein the data that is stored at the storage system is stored at a storage system granularity, wherein a signature in the deduplication table is associated with a unit of data at a replication destination granularity, wherein the storage system granularity is different from the replication destination granularity;
   receiving an indication to restore a snapshot from a replication destination to the storage system;
   obtaining a set of signatures associated with objects associated with the snapshot from the replication destination;
   comparing the set of signatures to the deduplication table to determine at least a subset of data associated with the snapshot that is available at the storage system, including by identifying an identified signature in the set of signatures that does not match any signatures in the deduplication table; and
   restoring the snapshot to the storage system including by obtaining the at least subset of data associated with the snapshot that is available at the storage system from the storage system, including by restoring the snapshot to the storage system by obtaining an object corresponding to the identified signature from the replication destination, wherein the object comprises a data chunk associated with the snapshot.

* * * * *

UNITED STATES PATENT AND TRADEMARK OFFICE
CERTIFICATE OF CORRECTION

PATENT NO. : 11,086,545 B1
APPLICATION NO. : 16/361014
DATED : August 10, 2021
INVENTOR(S) : Shobhit Dayal et al.

Page 1 of 1

It is certified that error appears in the above-identified patent and that said Letters Patent is hereby corrected as shown below:

In the Specification

In Column 44, Line(s) 29, delete "apart" and insert --a part--, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*